US006748994B2

(12) United States Patent
Wien et al.

(10) Patent No.: US 6,748,994 B2
(45) Date of Patent: Jun. 15, 2004

(54) LABEL APPLICATOR, METHOD AND LABEL THEREFOR

(75) Inventors: Thomas Wien, Newport Beach, CA (US); James R. Yurchenco, Palo Alto, CA (US); Joseph Li-Hsing Hei, Mountain View, CA (US); Christopher M. Flink, Los Altos, CA (US); Kocheng Michael Wu, Rowland Heights, CA (US); Anthony Piazza, IV, Redwood City, CA (US); Chase Tyler Thompson, East Palo Alto, CA (US); Donald E. Banks, Huntington Beach, CA (US); Charles Richard Lewis, Jr., Palo Alto, CA (US); Dana Robert Nicholson, San Francisco, CA (US); Jerry G. Hodsdon, Forestdale, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/121,446

(22) Filed: Apr. 11, 2002

(65) Prior Publication Data

US 2002/0162631 A1 Nov. 7, 2002

Related U.S. Application Data

(63) Continuation of application No. PCT/US01/43854, filed on Nov. 13, 2001, and a continuation of application No. PCT/US01/16648, filed on May 22, 2001.
(60) Provisional application No. 60/283,062, filed on Apr. 11, 2001.

(51) Int. Cl.[7] .............................. B65C 1/00; B65C 1/02; B65C 9/26
(52) U.S. Cl. .................... 156/391; 156/556; 156/580; 156/DIG. 1; 156/DIG. 2; 156/DIG. 37
(58) Field of Search .................................. 156/391, 556, 156/580, 574, DIG. 1, DIG. 2, DIG. 24, DIG. 27, DIG. 37, DIG. 42

(56) References Cited

U.S. PATENT DOCUMENTS

| 5,783,031 A | 7/1998 | Sievers |
| 5,799,982 A | 9/1998 | McClure et al. |

(List continued on next page.)

FOREIGN PATENT DOCUMENTS

| FR | 2763913 A1 | * 12/1998 | ............. B65C/9/26 |
| GB | 2351273 A | * 12/2000 | ............. B65C/9/26 |
| WO | WO 9826986 A1 | * 6/1998 | ............. B65C/9/26 |
| WO | WO 9829313 A1 | * 7/1998 | ............ B65C/11/00 |
| WO | WO 01/17860 A1 | 3/2001 | |
| WO | WO 02/038371 A1 | * 11/2001 | ............. B32B/3/02 |
| WO | WO 01/089821 A1 | * 5/2002 | ............. B32B/3/02 |

*Primary Examiner*—Sue A. Purvis
(74) *Attorney, Agent, or Firm*—Squire, Sanders & Dempsey LLP

(57) ABSTRACT

A label applicator including a support surface having a central area and curving downwardly from the central area. A post assembly extends up from the central area such that a label having a label through-hole can be positioned in a support position generally on the support surface with the post assembly extending up through the label through-hole and an adhesive face of the label facing up. Thereby an article having an article through-hole can be positioned over the post assembly so that a flat surface of the article can be pressed and guided against the adhesive face of the positioned label. The curved surface flattens out as the article is pressed down, allowing the label to be smoothly applied to the article. Pins extending up adjacent to the support surface engage in notches on the label and help hold the label in place.

62 Claims, 45 Drawing Sheets

U.S. PATENT DOCUMENTS

| | | |
|---|---|---|
| 5,925,200 A | 7/1999 | Grossman |
| 5,951,819 A | 9/1999 | Hummell et al. |
| 5,958,177 A | 9/1999 | Claussnitzer |
| D421,057 S | 2/2000 | Hummell et al. |
| 6,054,009 A | 4/2000 | Cote et al. |
| 6,148,891 A | 11/2000 | Lee |
| 6,196,290 B1 | 3/2001 | Tracy et al. |
| 6,227,273 B1 | 5/2001 | McClure |
| 6,240,990 B1 | 6/2001 | Claussnitzer |
| 6,273,167 B1 | 8/2001 | Miller |
| 6,279,960 B1 | 8/2001 | Claussnitzer |
| 6,302,176 B1 * | 10/2001 | Chen .......................... 156/391 |
| 6,315,021 B1 | 11/2001 | Lee et al. |
| 6,321,814 B1 * | 11/2001 | Tracy et al. ................. 156/556 |
| 6,347,654 B1 * | 2/2002 | Koch .......................... 156/391 |
| 6,484,777 B1 * | 11/2002 | Quinteros et al. .......... 156/391 |
| 6,508,914 B1 * | 1/2003 | Schwaller et al. .......... 156/391 |
| 6,612,355 B1 * | 9/2003 | Cook et al. ................. 156/391 |
| 2001/0025689 A1 | 10/2001 | Barnet |
| 2002/0005255 A1 * | 1/2002 | Leonardi ..................... 156/391 |
| 2002/0139489 A1 * | 10/2002 | Grogg ......................... 156/582 |

* cited by examiner

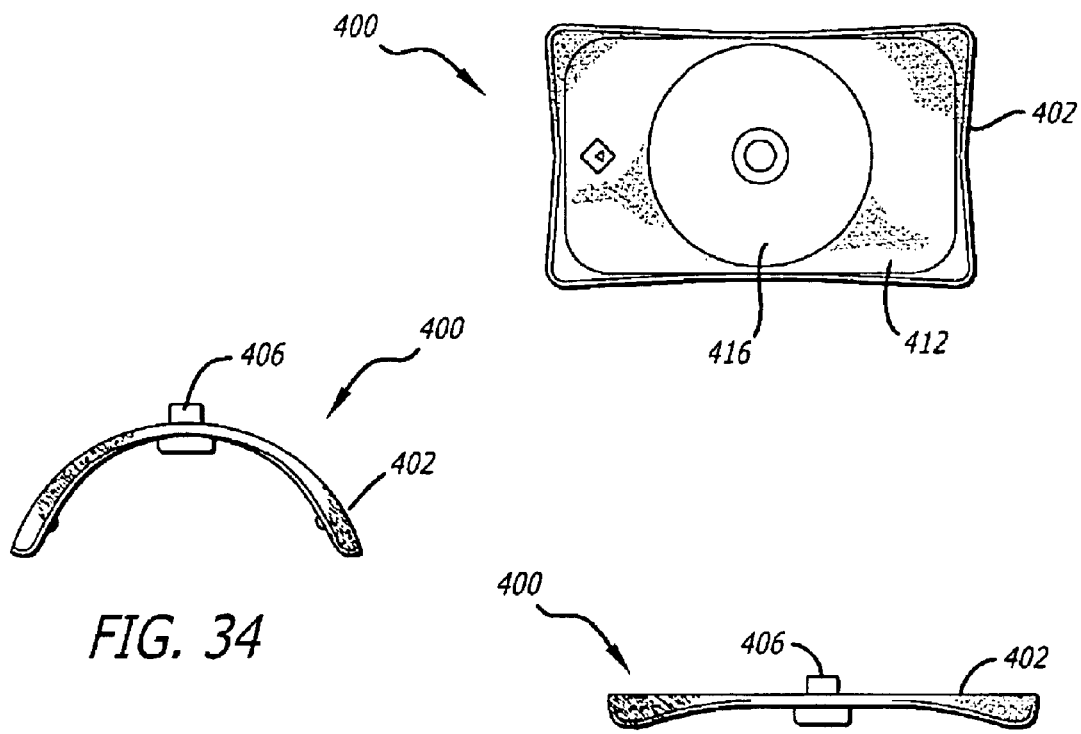
FIG. 32
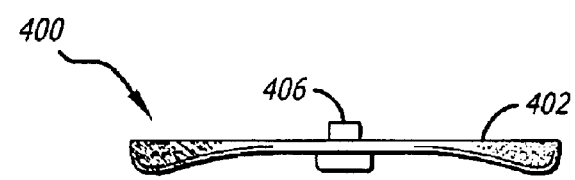
FIG. 34
FIG. 33
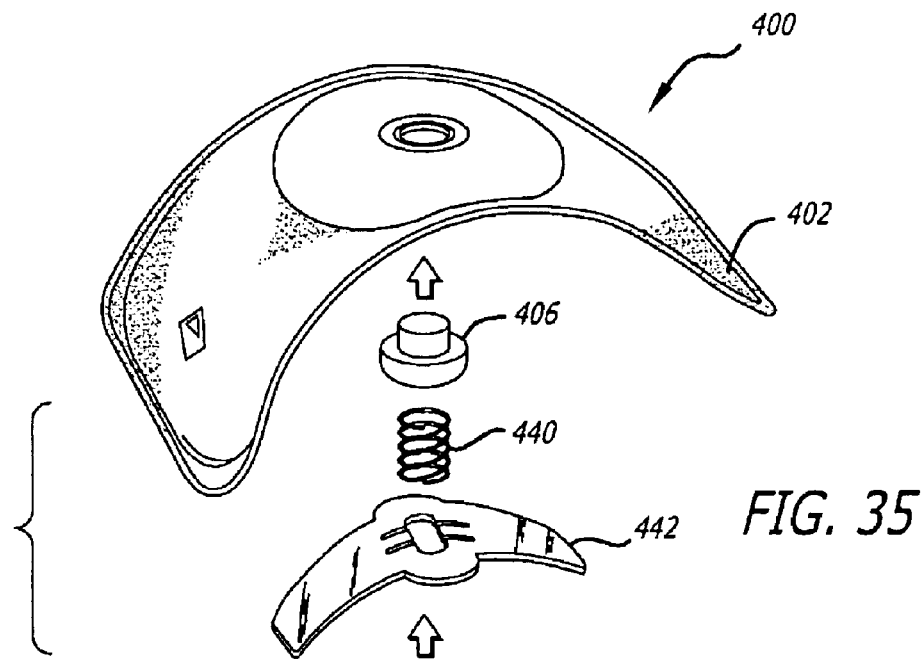
FIG. 35

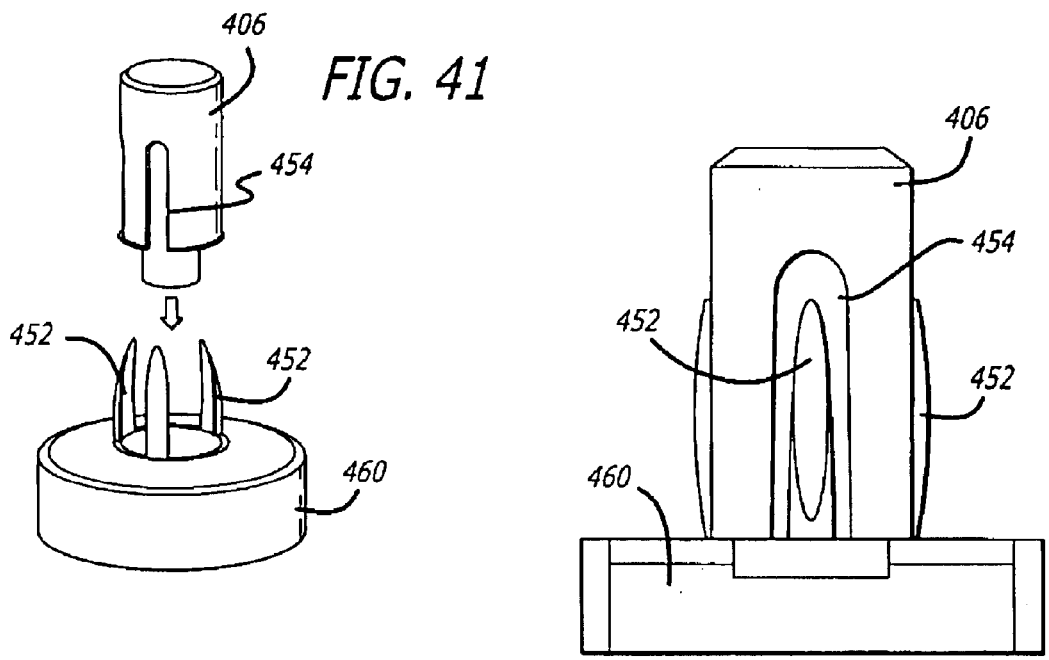
FIG. 41
FIG. 42
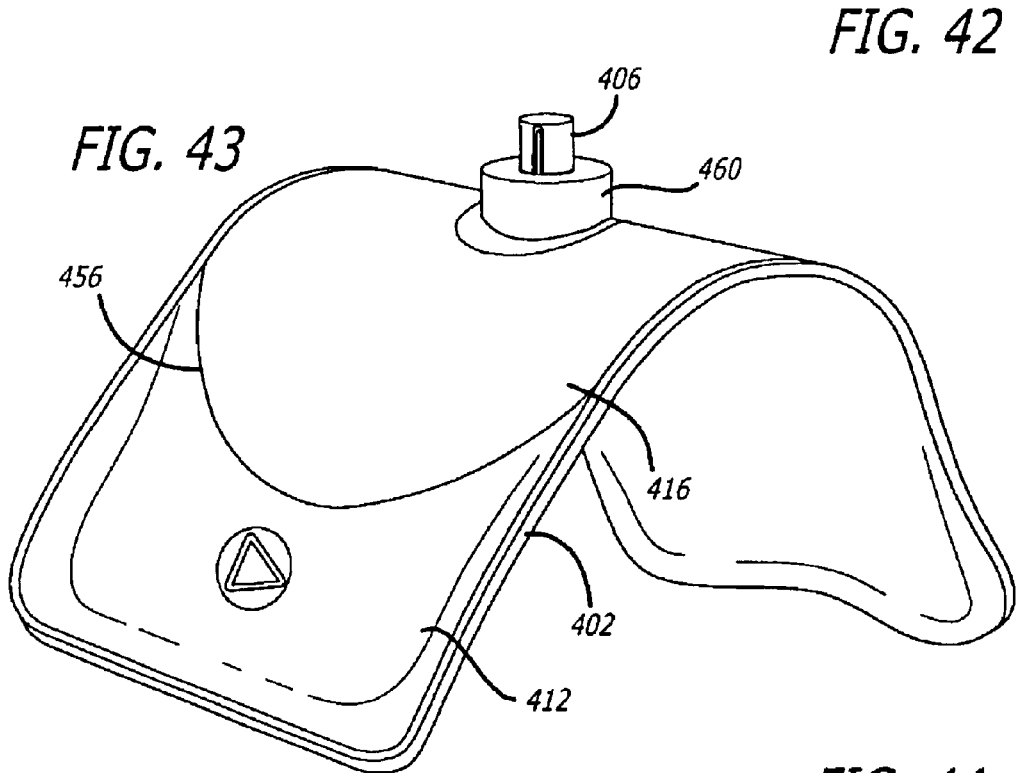
FIG. 43
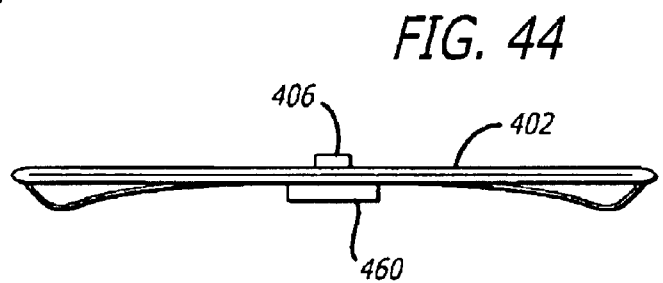
FIG. 44

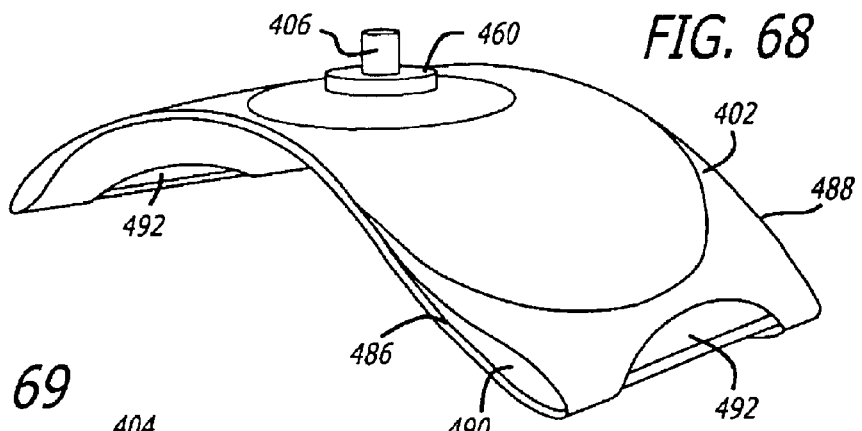
FIG. 68
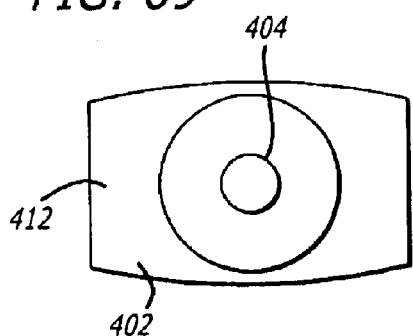
FIG. 69
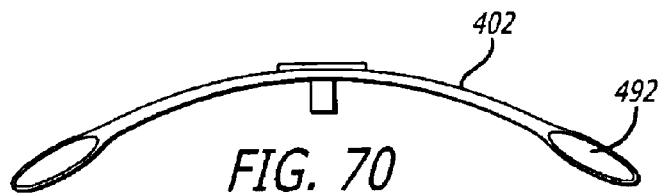
FIG. 70
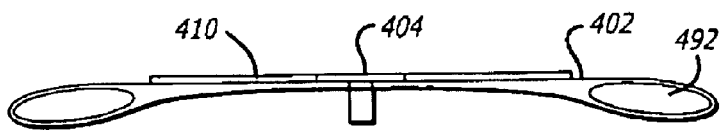
FIG. 71
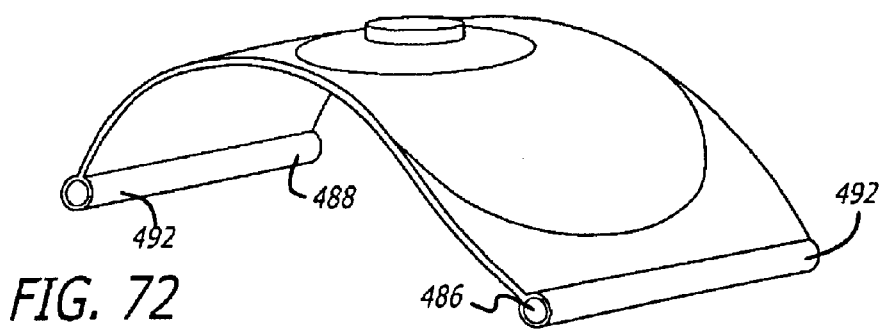
FIG. 73
FIG. 72

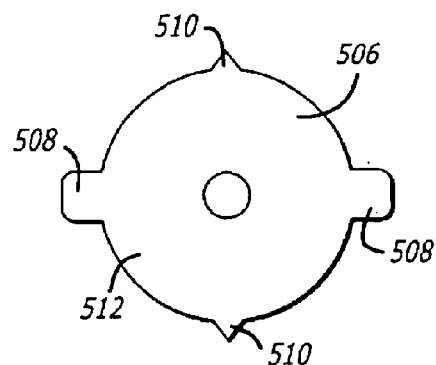
FIG. 82
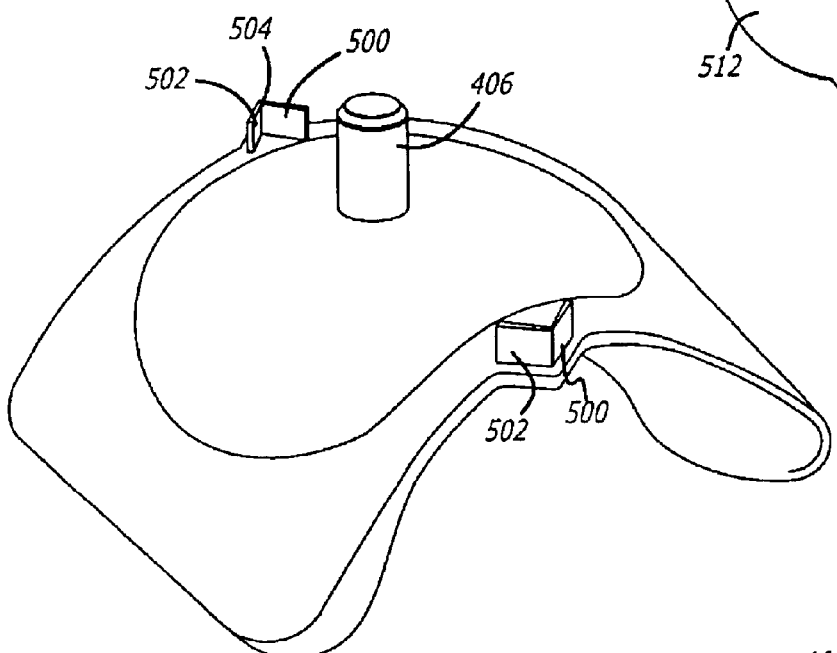
FIG. 81
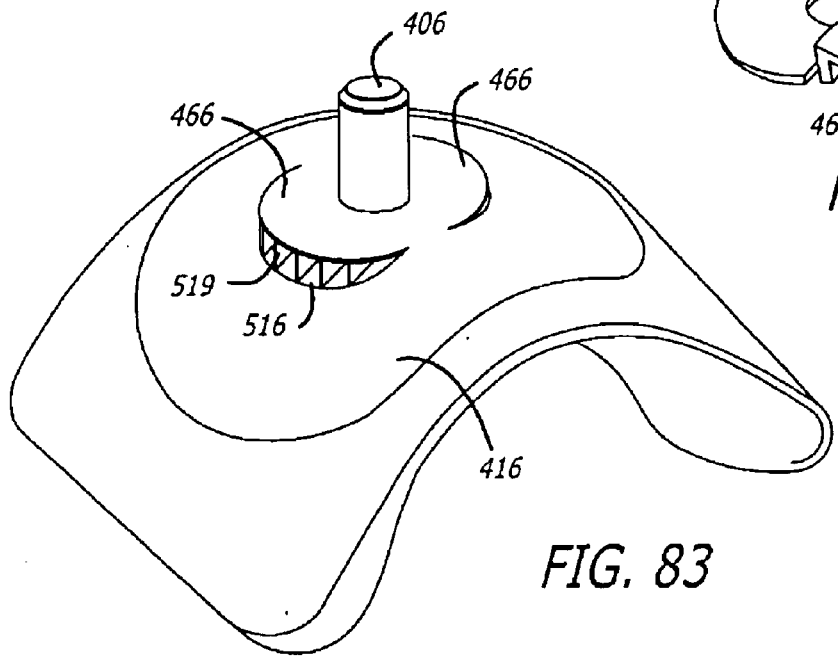
FIG. 84
FIG. 83

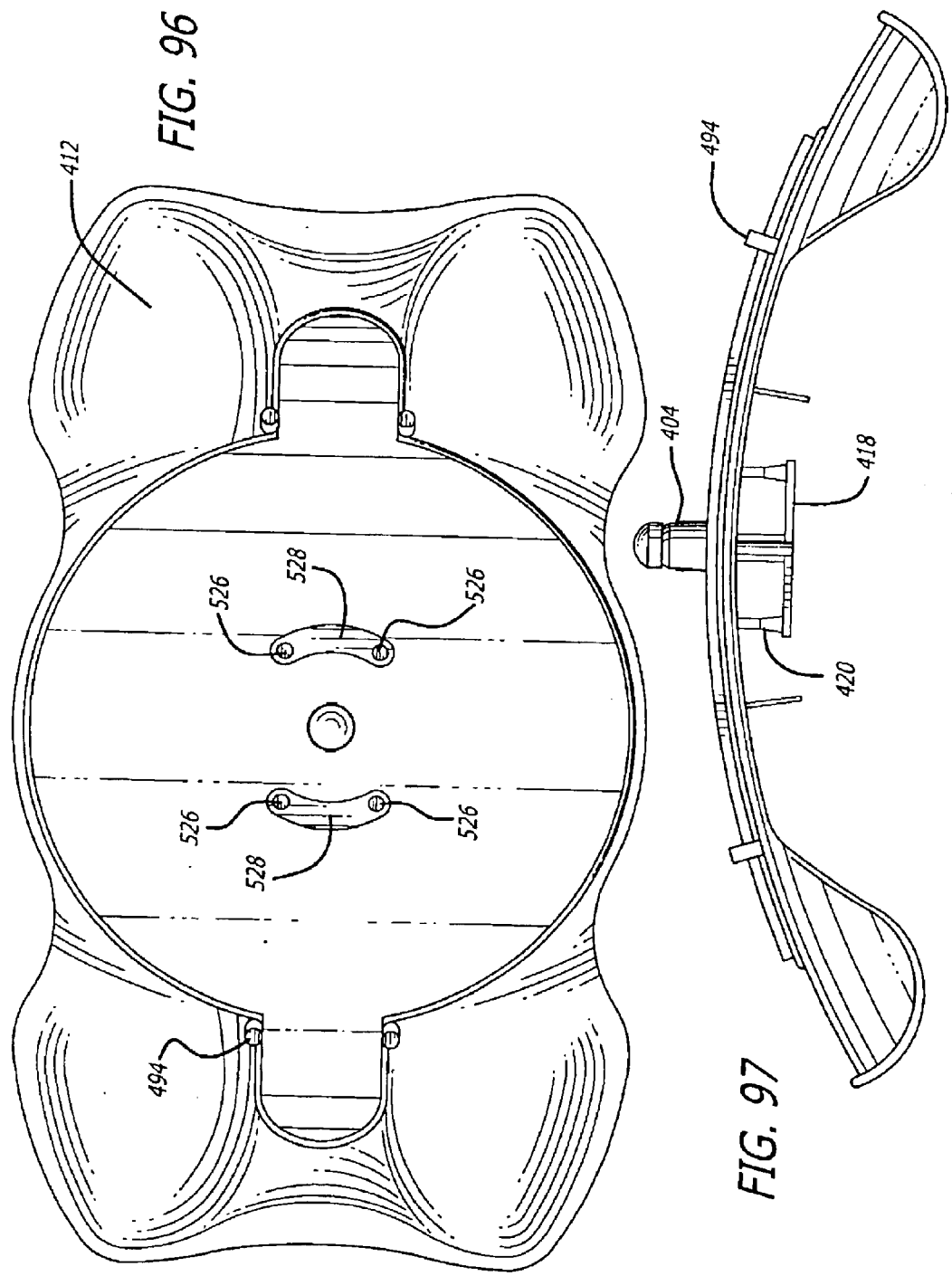

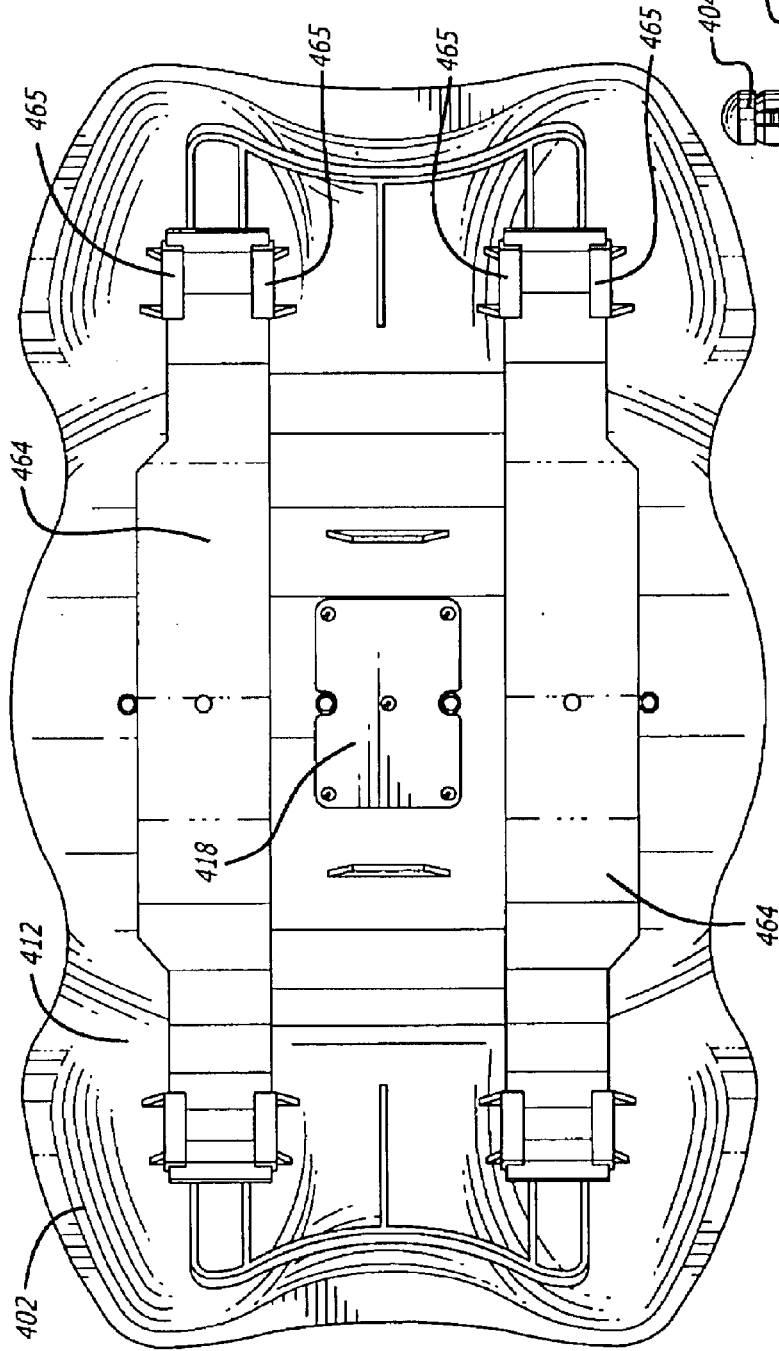
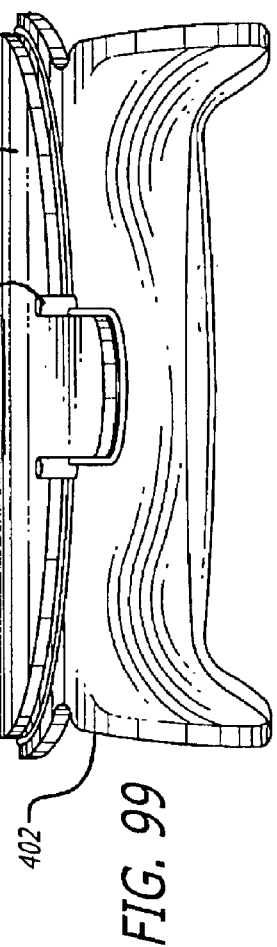

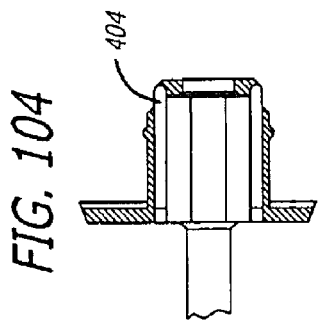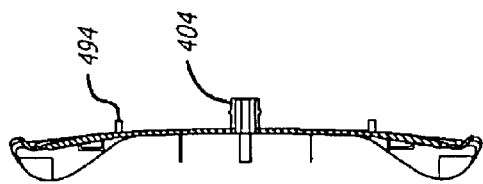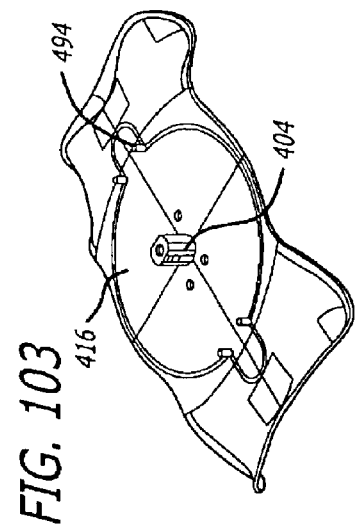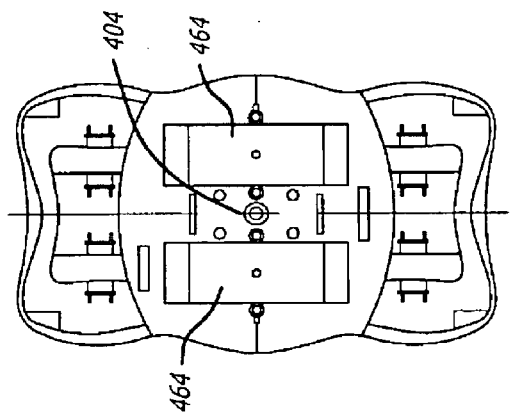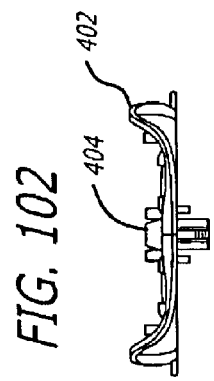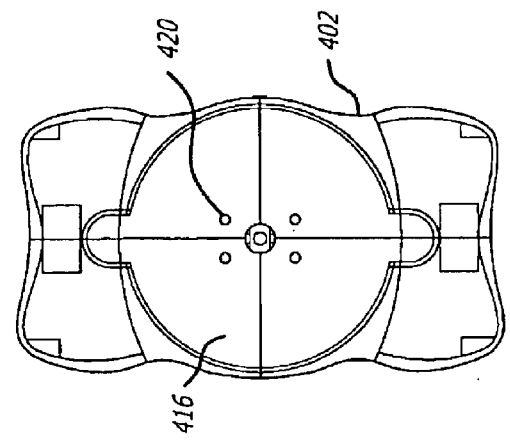

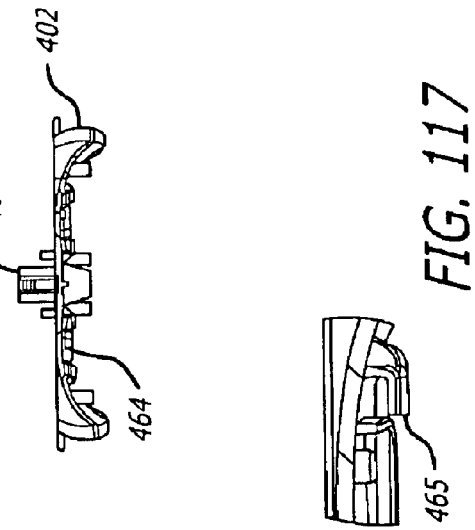
FIG. 115
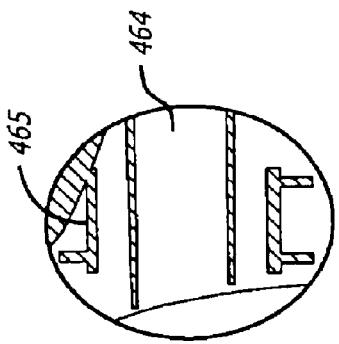
FIG. 117
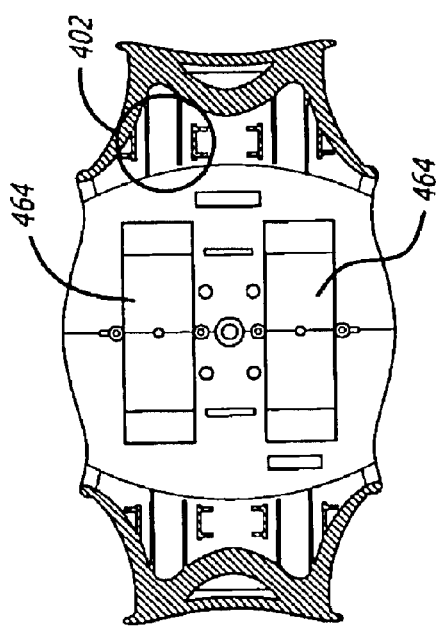
FIG. 118
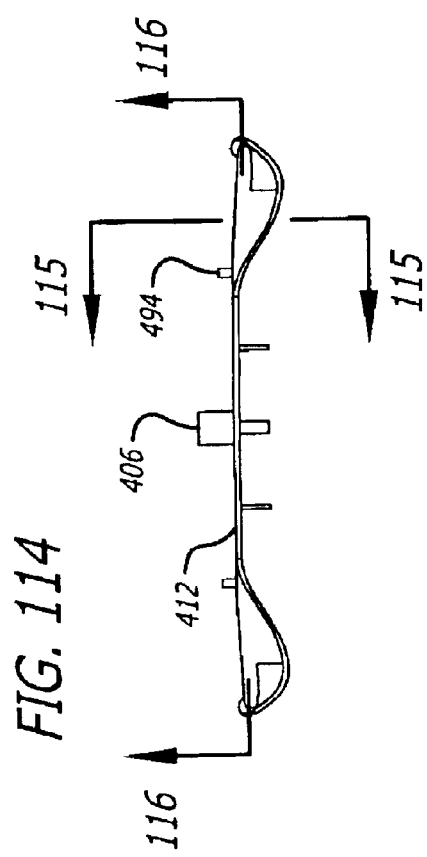
FIG. 114
FIG. 116

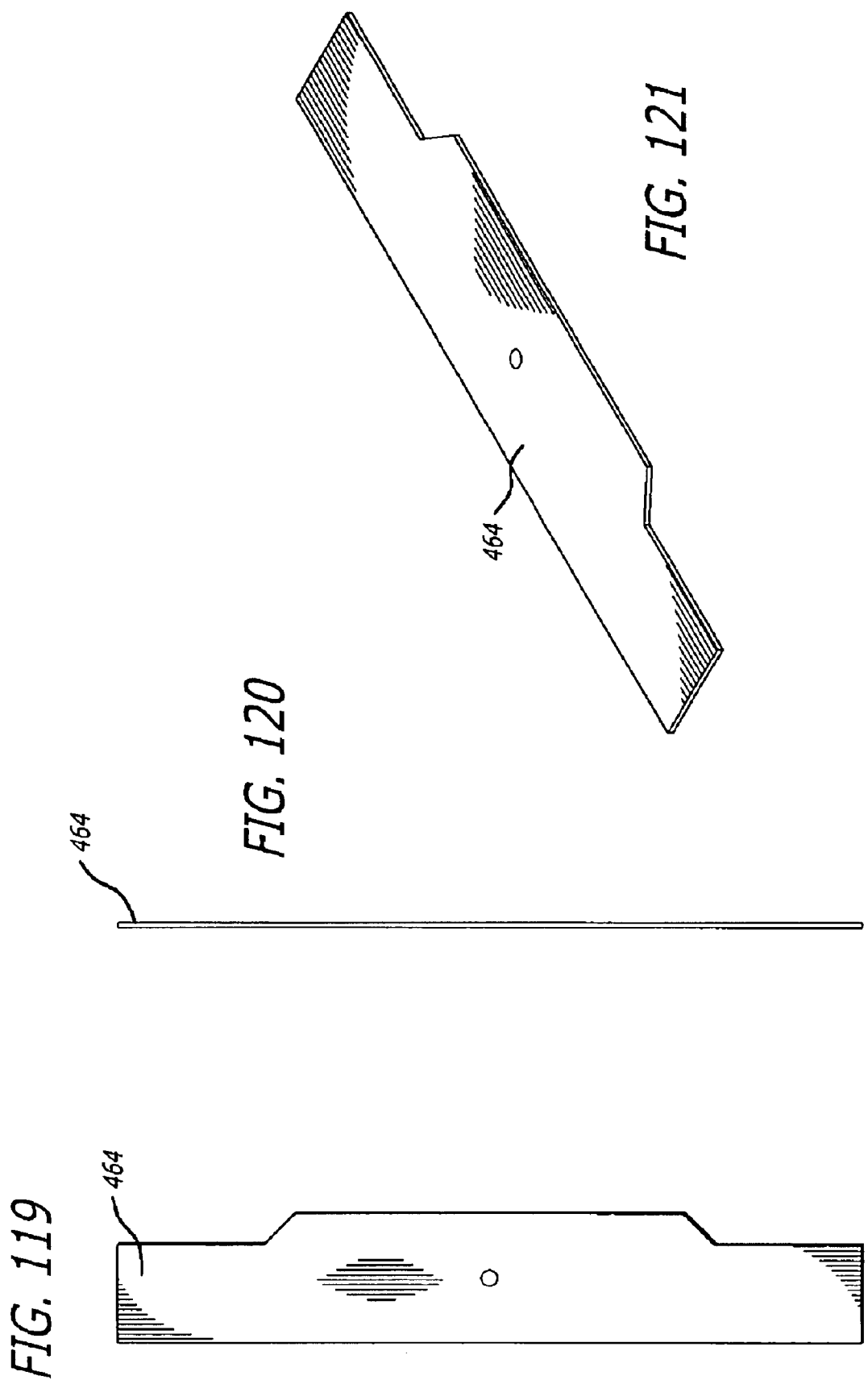

LABEL APPLICATOR, METHOD AND LABEL THEREFOR

CROSS-REFERENCE TO RELATED APPLICATIONS

This application claims the benefit of provisional application Ser. No. 60/283,062, filed Apr. 11, 2001, and is a continuation of International application Ser. No. PCT/US01/16648, filed May 22, 2001 and International application No. PCT/US01/43854, filed Nov. 13, 2001. The entire contents of these applications are incorporated herein by reference.

BACKGROUND OF THE INVENTION

The present invention relates to devices for applying labels to objects, and more particularly to applicators for accurately positioning and affixing annular labels on electro-optical storage devices (optical discs) such as CDs and DVDs. It is further concerned with methods for applying labels to such objects. It additionally relates to the labels themselves and to sheets of the labels, the sheets being adapted to be passed through a printer or copier for a printing operation on the labels.

A number of devices are known which allow a consumer to apply labels to CDs and the like. Examples thereof are disclosed in U.S. Pat. No. 5,951,819 (Hummell et al.) and U.S. Pat. No. 5,958,177 (Claussnitzer). (The entire contents of these patents and all other patents and all other publications mentioned anywhere in this disclosure are hereby incorporated by reference.) These devices have the common problem in that the labels when peeled off of their support sheets tend to curl and thus may not lie flat on the applicator surface. They thereby may crease, fold, have bubbles or otherwise not lie flat on the object surface when adhesively applied thereto.

Another example of a labeling system is disclosed in U.S. Publication No. US 2001/0025689 A1, published Oct. 4, 2001. This publication discloses an applicator used to apply a label to a shaped CD-ROM. The applicator includes a central projection, peripheral locator pins, and a well in which to received the CD-ROM. Locator tabs on a label are placed over the locator pins to correlate the location of the label and the CD-ROM.

SUMMARY OF THE INVENTION

Directed to remedying the problems in the prior art, disclosed herein is an improved label applicator having a curved label support surface to improve label burnishing. The label can have gripping tabs which have side notches that engage on pins extending up from the label support surface to locate and hold the label. A post assembly extends up from the support surface. A CD, DVD or other flat object is positioned over the post assembly and pressed and guided down against the adhesive face of a label on the surface. As the object is pressed down against the label the support surface flattens out and against the bias of return leaf springs, for example. The label thereby is smoothly and gradually applied to the object surface. After the label is adhered to the object the tabs are torn off along perforated lines. The post assembly has a diameter corresponding to that of a center hole of a CD disc. To position a large hole label concentrically about the post assembly a guide pin structure, for example, is lifted to a raised position with the pins extending up from the support surface and about the post assembly to define the centering guide for the large hole.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 32 is a top view of an applicator according to the present invention;

FIG. 33 is a side view of the applicator of FIG. 32 in a molded flat condition;

FIG. 34 is another side view of the applicator of FIG. 32 with the springs attached;

FIG. 35 is an exploded perspective view of the applicator of FIG. 32; the coil spring can be fit up into the spindle and the one-piece flat spring can be clipped in place.

FIG. 41 is an exploded perspective view of a post assembly according to a further embodiment of the present invention;

FIG. 42 is an enlarged side elevational view of the post assembly of FIG. 41 with the post snap fit onto the fingers; the CD can initially rest about midway on the fingers which flex inwardly;

FIG. 43 is a perspective view of an applicator including a prior art post assembly (see U.S. Pat. Nos. 5,951,819 and 5,958,177) for wide hole labels;

FIG. 44 is a side of the applicator of FIG. 43 in a flattened position;

FIG. 68 is a perspective view of another embodiment of an applicator of the present invention with inserted cylindrical feet;

FIG. 69 is a top view of the applicator of FIG. 68;

FIG. 70 is a side view of the applicator of FIG. 68;

FIG. 71 is a side view of the applicator of FIG. 68 in a compressed position;

FIG. 72 is an additional perspective view of the applicator of FIG. 68;

FIG. 73 is close-up perspective view of a component of the applicator of FIG. 68;

FIG. 81 is a perspective view of yet another applicator according to the present invention;

FIG. 82 is a view of a label for use with an applicator according to FIG. 81;

FIG. 83 is a perspective view of an applicator according to another embodiment of the present invention; it has a disappearing locator for centering a large hole label;

FIG. 84 is a view of an alternate flap assembly to that of FIG. 83; more particularly it shows a "crushable" locator for holding the disc away from the label before application;

FIG. 96 is a top view of the applicator of FIG. 95;

FIG. 97 is a side view of the applicator of FIG. 95;

FIG. 98 is a bottom view of the applicator of FIG. 95;

FIG. 99 is an end elevational view of the applicator of FIG. 95;

FIG. 102 is a end view of the plate of the applicator of FIG. 95 in isolation;

FIG. 103 is a top perspective view of the plate;

FIG. 104 is an enlarged cross-sectional view of the post of the plate;

FIG. 105 is a top plan view of the plate;

FIG. 106 is a side view of the plate;

FIG. 107 is a bottom plan view of the plate;

FIG. 108 is a cross-sectional side view similar to that of FIG. 106;

FIG. 114 is a side view similar to FIG. 108;

FIG. 115 is a cross-sectional view taken on line 115—115 of FIG. 114;

FIG. 116 is a cross-sectional view taken on line 116—116 of FIG. 114;

FIG. 117 is a close-up view of a portion of FIG. 114;

FIG. 118 is an enlarged view taken on circle 118 of FIG. 116;

FIG. 119 is a top view of a spring of the applicator of FIG. 95 shown in isolation;

FIG. 120 is a side view of the spring of FIG. 119;

FIG. 121 is a perspective view of the spring;

FIG. 122 is a top plan view of a (paper) label sheet construction for use with the applicators of the present invention; and FIG. 123 is a bottom plan view thereof.

DETAILED DESCRIPTION OF PREFERRED EMBODIMENTS OF THE INVENTION

Referring to FIGS. 1–7, an embodiment of a label applicator of the present invention is illustrated generally at 100. Applicator 100 includes a flexible body member 106 formed of polypropylene, polyethylene or other flexible plastic compounds. The applicator body member 106 has "feet" 110 at both ends thereof and an arched central portion 116 extending between the feet. A post assembly shown generally at 120 extends up from the center of the top of the body member and is preferably integrally formed therewith. The applicator body member 106 slopes in longitudinal directions away from the post assembly 120 and can be shaped similar to a top portion of a bridge. (Less preferably, the body member can be shaped so that its top label support surface has a dome shape). The top sloping surface of the body member 106 forms a support surface for a label 130.

Figure 1:
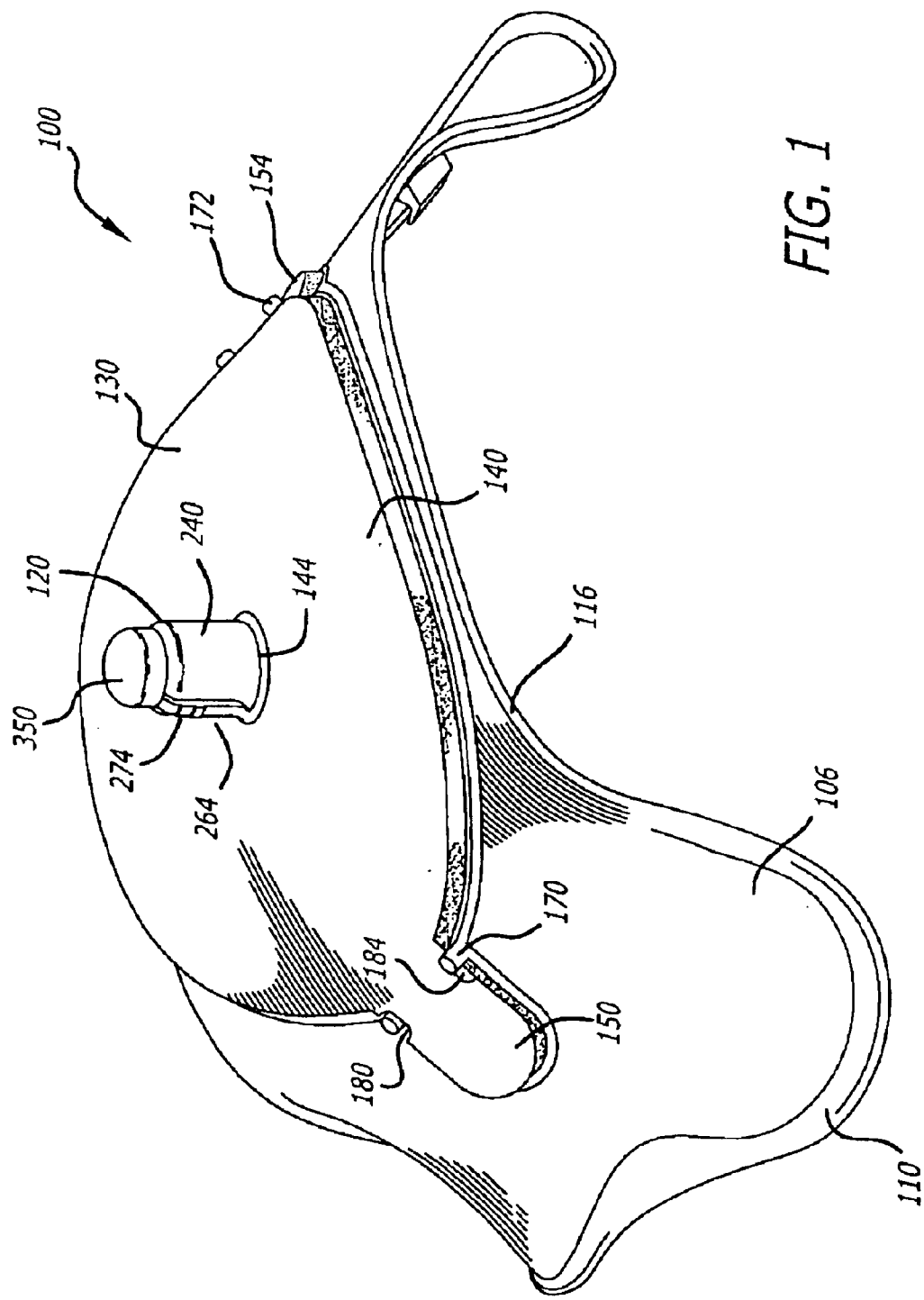
FIG. 1 is a top perspective view of a label applicator of the present invention with a small-hole no-touch label of the present invention in place.
Figure 5:
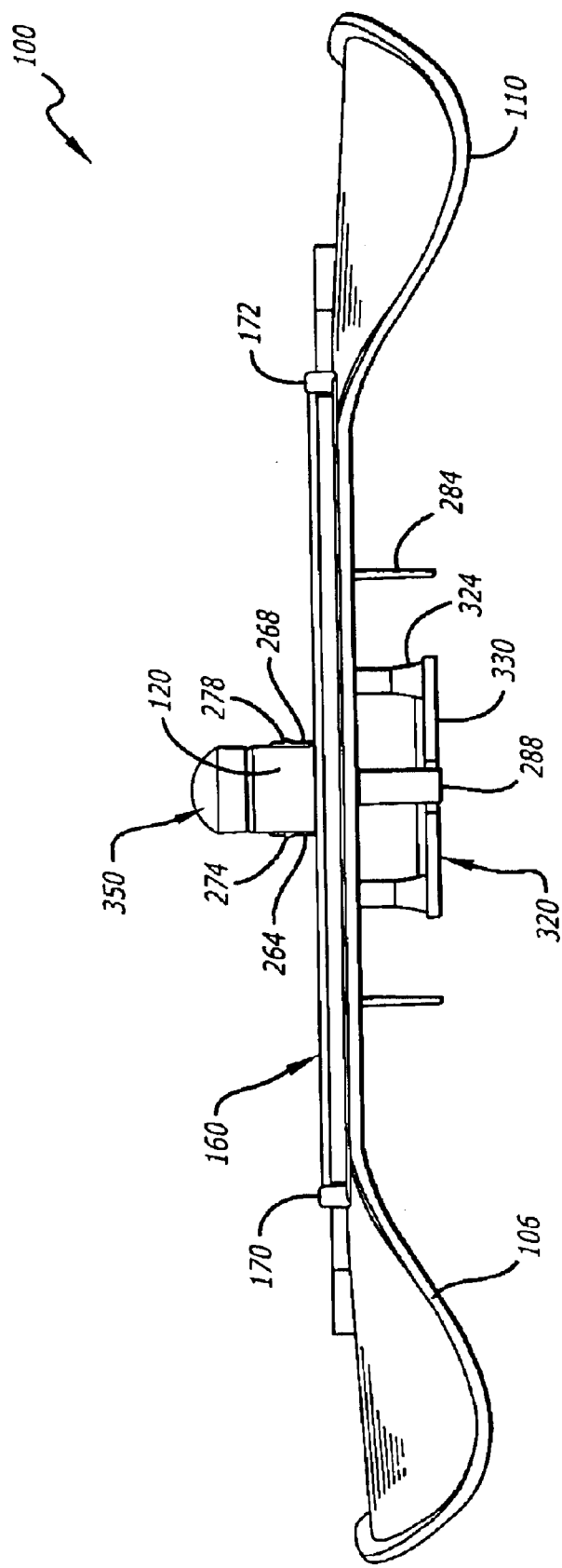
FIG. 5 is a side elevational view showing the disc in a label-applied condition.

A soft pad 136 (FIG. 2) is preferably disposed on the surface and defines the contact surface for the label. The pad 136 can be a urethane foam, rubber or other compound. It preferably has a bottom pressure-sensitive adhesive layer to adhere to the support surface of the applicator body 106 (FIG. 1). The label 130 preferably has a circular central portion 140 with a central hole 144 and a pair of diametrically-positioned ears or tabs 150, 154. The tabs 150, 154 are adapted to be grasped and handled by the user so that the user does not touch the (adhesive) circular portion 140 of the label. The tabs 150, 154 can then be torn off along perforated or weakened lines from the circular portion after the circular portion has been adhered with its adhesive layer to the article 160 (FIG. 5). The article 160 will preferably be a disc, such as a CD or a DVD. The label 130 is pre-cut on a sheet having a backing layer, an adhesive layer and a top layer. The sheet is adapted to be passed through a printer or copier (not shown) and the desired indicia printed on the label 130 in the user's personal desktop printer, for example. The label 130 then is grasped by the two tabs 150, 154 with liner portions (patches) remaining adhered to the back of the tabs so that the user does not touch the adhesive layer on the back of the circular portion 140, and the label 130 is then peeled off of the sheet. The label 130 is placed with the adhesive side of the label facing upward over the post assembly 120, as depicted in FIG. 1.

Figure 2:
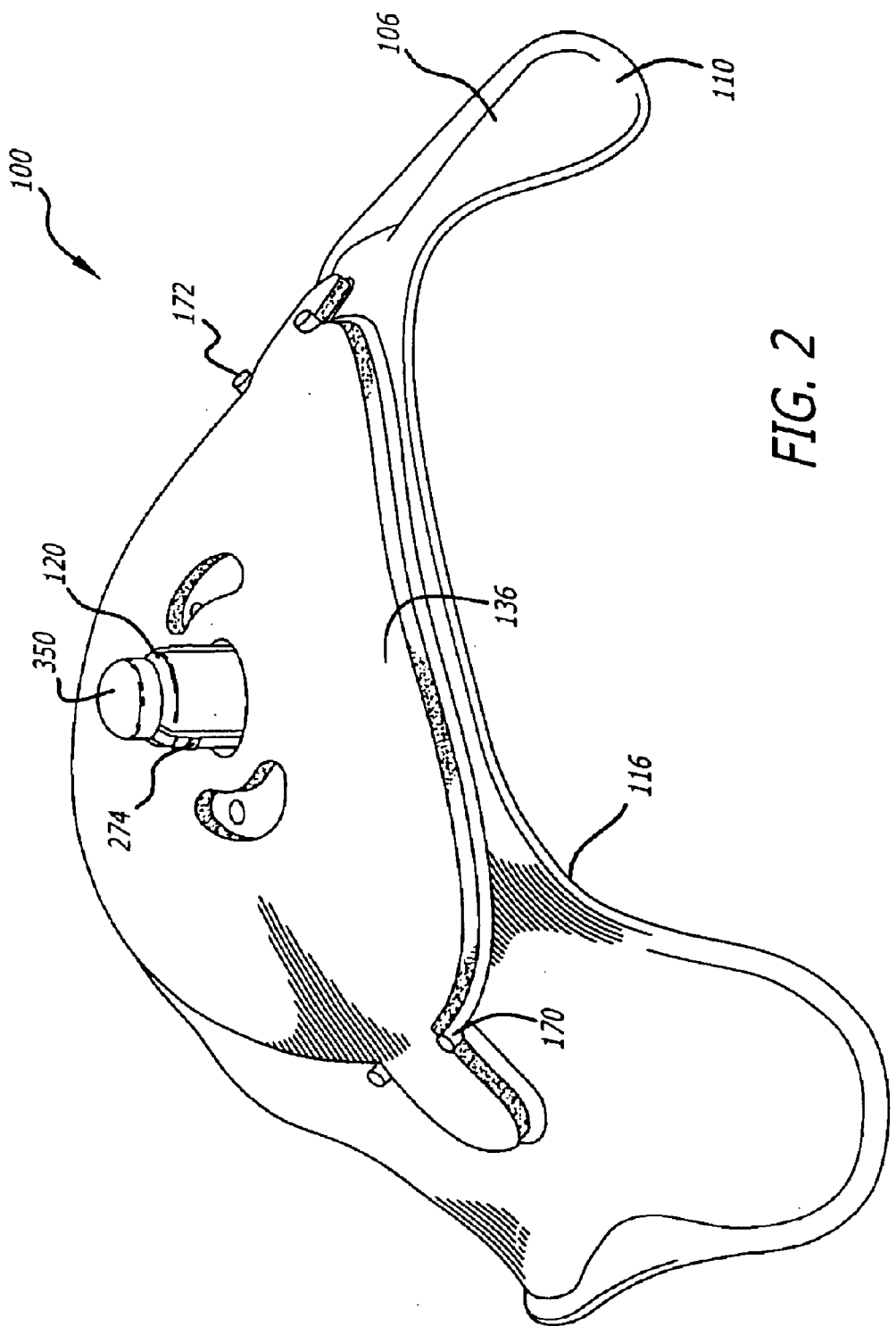
FIG. 2 is a top perspective view similar to FIG. 1 but without the label in position.

The label 130 is centered and held in position ready for an application process by a series of pins or pegs 170, 172. These are shown in FIGS. 1 and 2, for example, with a pair of pins provided for each tab 150, 154, and each tab including a pair of side notches 180, 184 in which the pins are disposed. Alternatively, and less preferably the tabs can have central through-holes through which respective central pins are inserted to hold the label in place during the application procedures.

The label 130 depicted in FIG. 1 is a full-face or small-hole label which is adapted to cover the entire face of the CD 160 except for the small hole. In contrast, a large or standard opening label 190, which will not cover the transparent, uncoated central portion of the CD 160, is shown and described later. An alternative embodiment of label 190 includes (notched) tabs.

Figure 6:
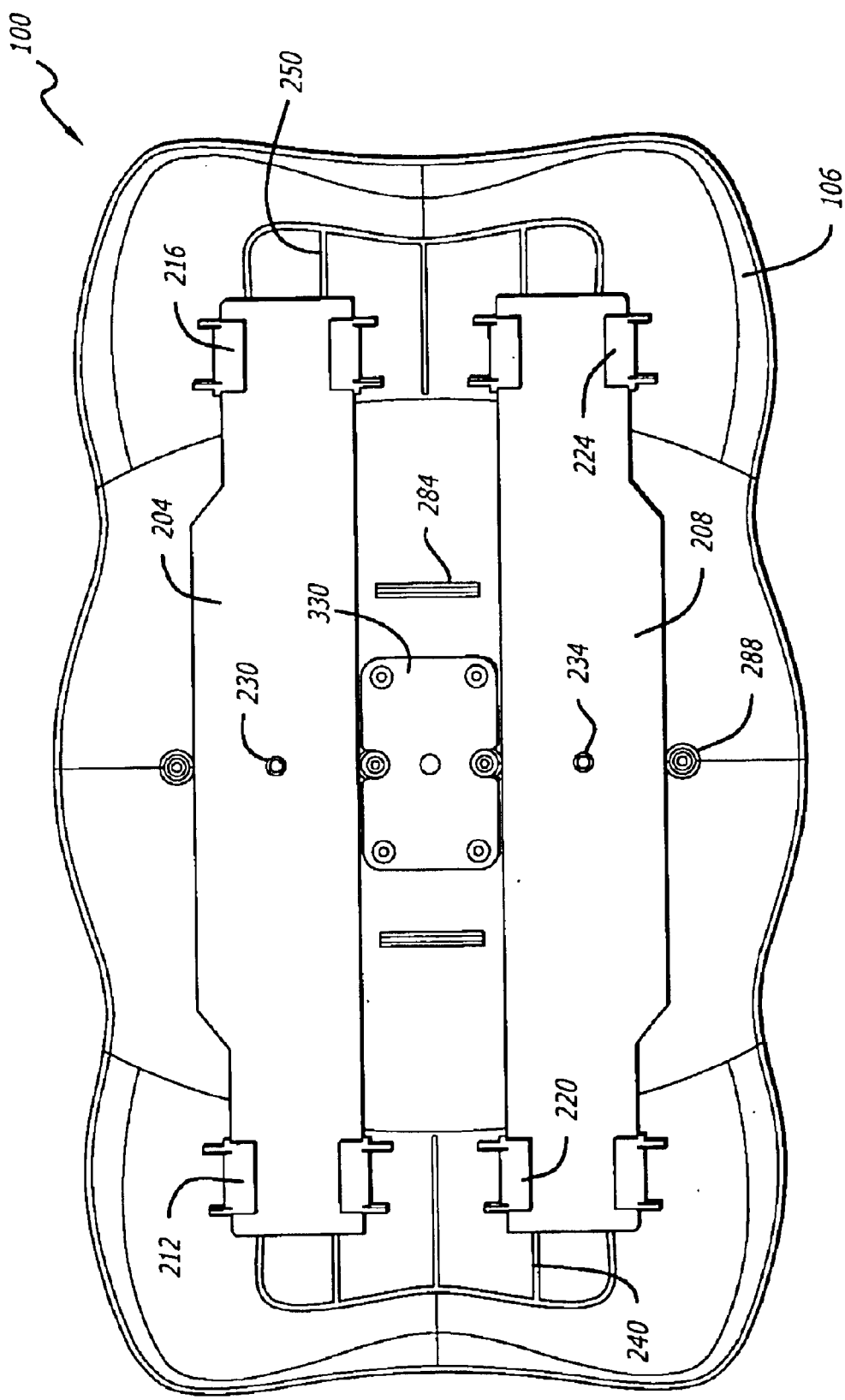
FIG. 6 is a bottom plan view of the applicator of FIG. 1.

The flexible plastic member 106 has an arch shape as can be seen in FIGS. 1 and 2, for example; and a pair of elongate leaf springs 204, 208 are attached to the bottom surface of the body member 106 using a pair of clips 212, 216, 220, 224 at both ends and a central locator pin 230, 234 in the center, as illustrated in FIG. 6. The clips and the pins are integrally formed with the body member 106 and extend downwardly from the lower surface thereof. Further, ribs 240, 250 are provided to reduce friction between the leaf springs 204, 208 and the bottom surface of the body member 106. The leaf springs 204, 208 are formed preferably from stainless steel or other type of spring steel. Instead of providing two leaf springs, a larger leaf spring with a central hole can be used (See FIGS. 35 and 56). Further, instead of using one or more separate springs, the body member itself can provide the spring return action, such as by making the body member out of an engineered plastic.

Figure 3:
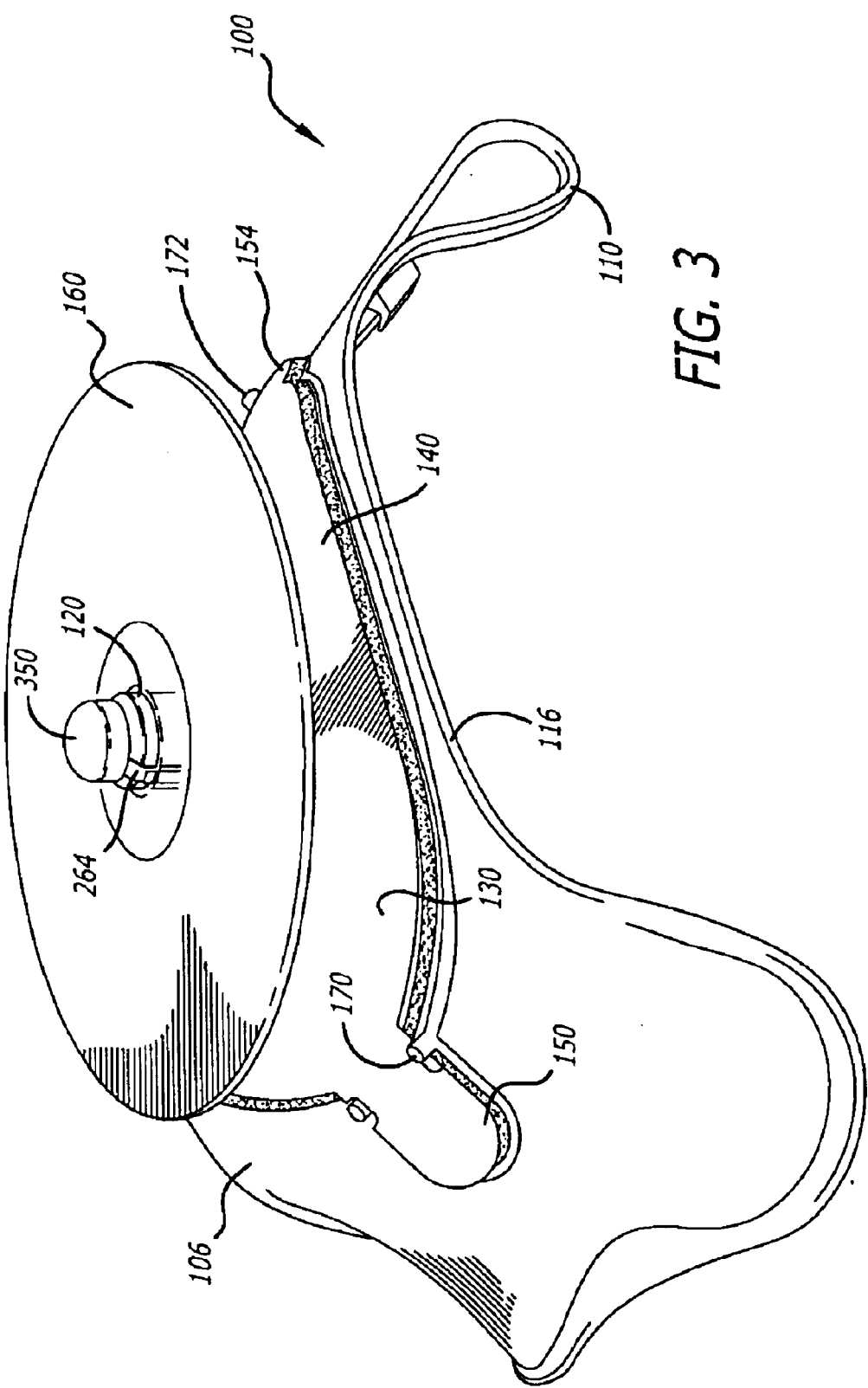
FIG. 3 is a top perspective view of the applicator of FIG. 1 with a disc in a rest position thereon.
Figure 4:
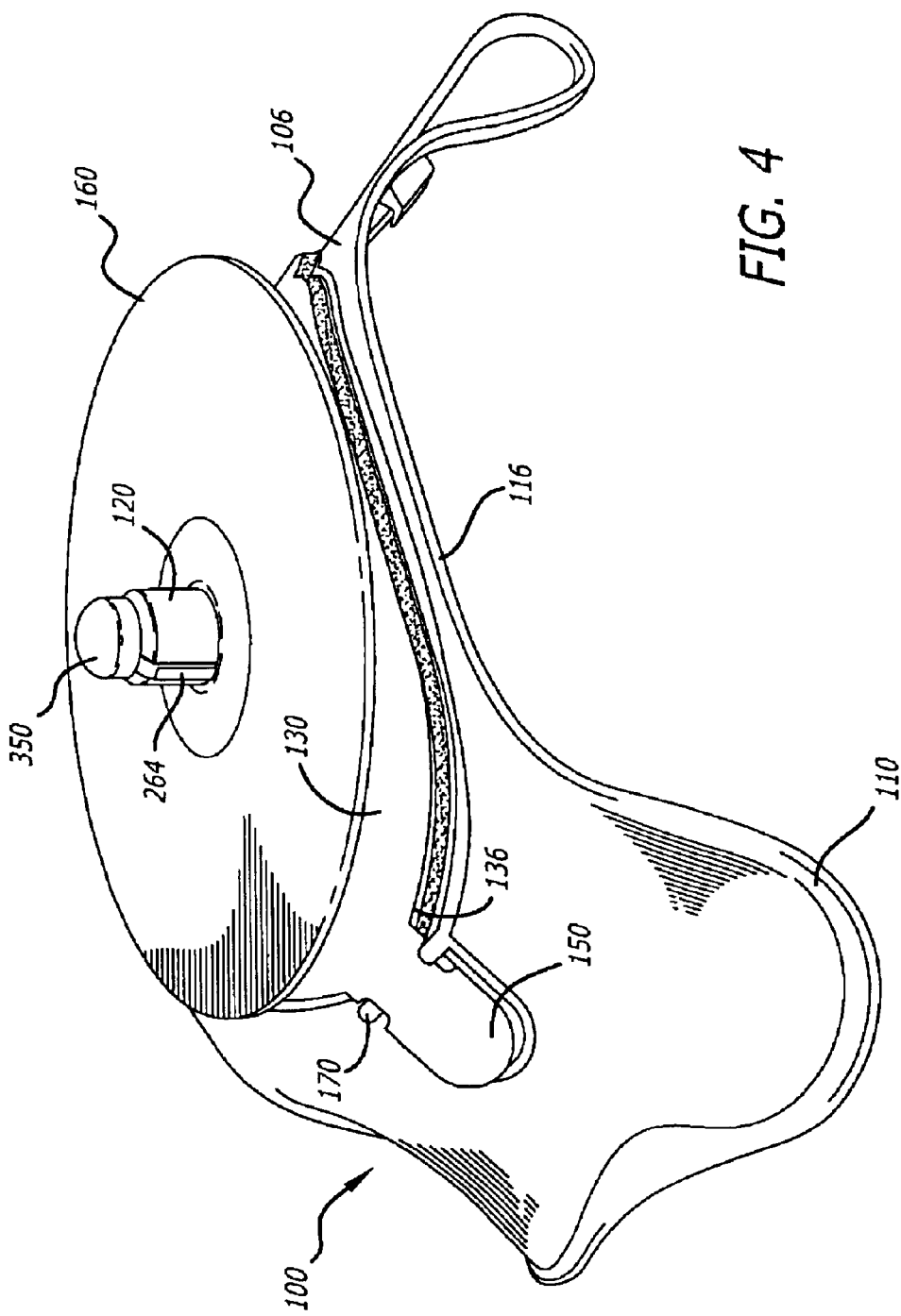
FIG. 4 is a view similar to FIG. 3 showing the disc being pressed down in a label application procedure.

The post assembly 120 includes a generally cylindrical member 240 having a flat top edge and a hollow interior. Formed on opposite sides thereof are elongate flexing ribs 264, 268 attached at their tops and bottoms but flexible in the center portions. These ribs 264, 268 have nibs 274, 278 at central locations extending outwardly as shown in FIG. 5, for example. These nibs 274, 278 define a disc support surface when a disc 160 is placed in an initial rest position on the post assembly 120 as shown in FIG. 3. When the user then pushes down on the disc 160, these ribs 264, 268 and especially the nibs 274, 278 thereof are pushed and flexed inwardly generally beyond the circumference of the cylindrical portion thereby allowing the disc to be pressed down as shown in FIG. 4 against the adhesive face of a label 130 on the foam pad or support surface 136. As the disc 160 initially contacts an adjacent portion of the label 130 and is further pressed down manually by the user, the disc 160 is pressed towards the support surface of the applicator 100 and the disc gradually contacts further outwardly disposed portions of the label 130, providing for a smooth and crease and bubble free adherence of the label to the disc. The fully pressed-down condition of the applicator 100 is shown in FIG. 5. And referring thereto it is seen that the fin and post stopper members 284, 288 will engage the surface on which the applicator 100 rests to define a fully pressed position of the applicator.

The present applicator 100 can also be uniquely and readily adapted for use with the larger opening labels 190. For those labels 190, a centering means for centering the larger hole 304 concentrically about the narrower post assembly 120 is needed. The present invention provides such a unique structure (a four-prong locator assembly shown generally at 320) which is movable by the user from an inoperative out-of-the-way position wherein the small hole opening labels 130 can be used (as previously described with respect to FIG. 1, for example) to an operative position wherein the structure is in place to define the large hole (304) label locator system. This is shown in FIG. 7.

Figure 7:
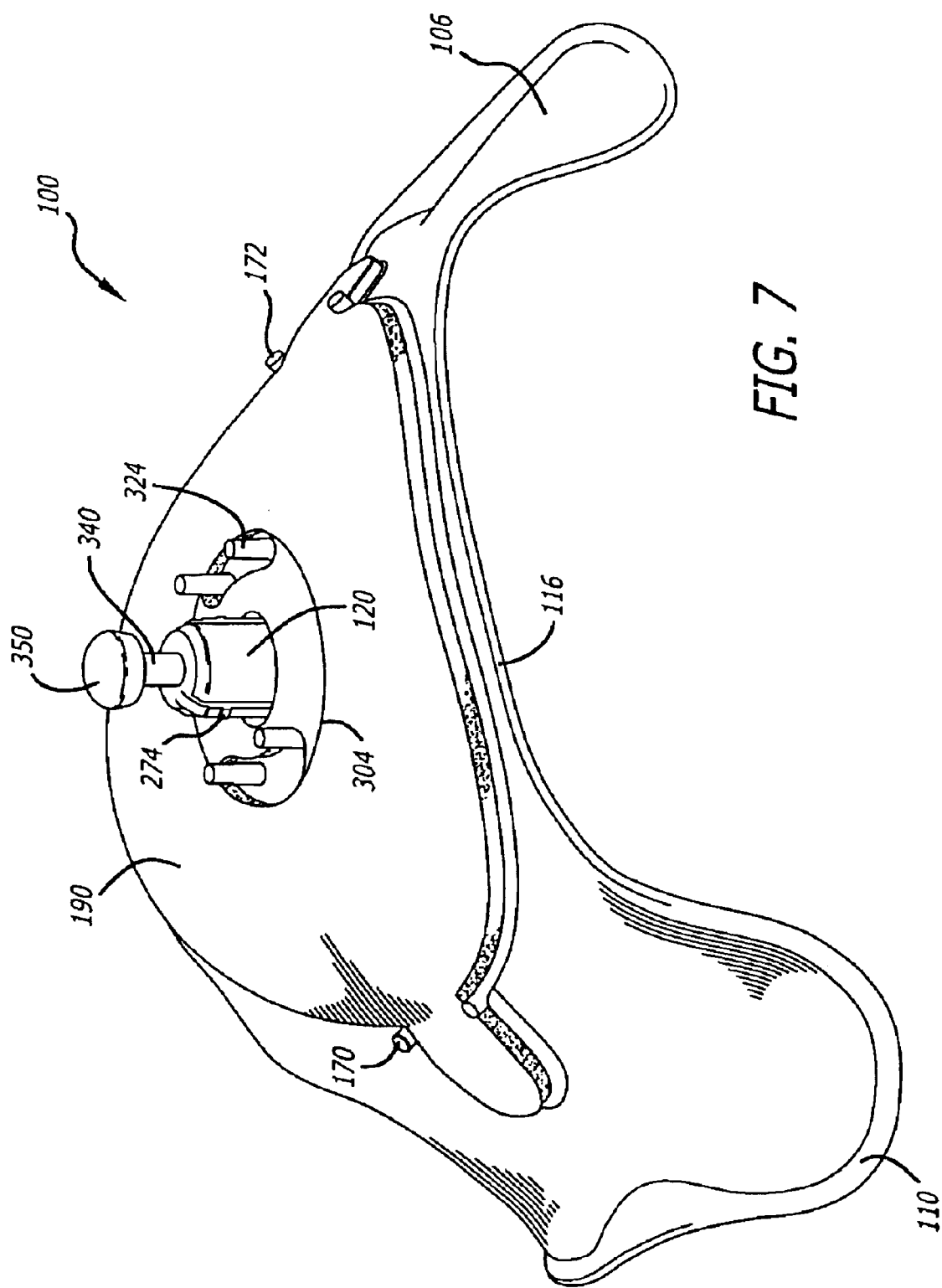
FIG. 7 is a top perspective view similar to FIG. 1 showing the applicator with the locator pegs thereof in a raised position and a large-hole label in place.
Figure 8:
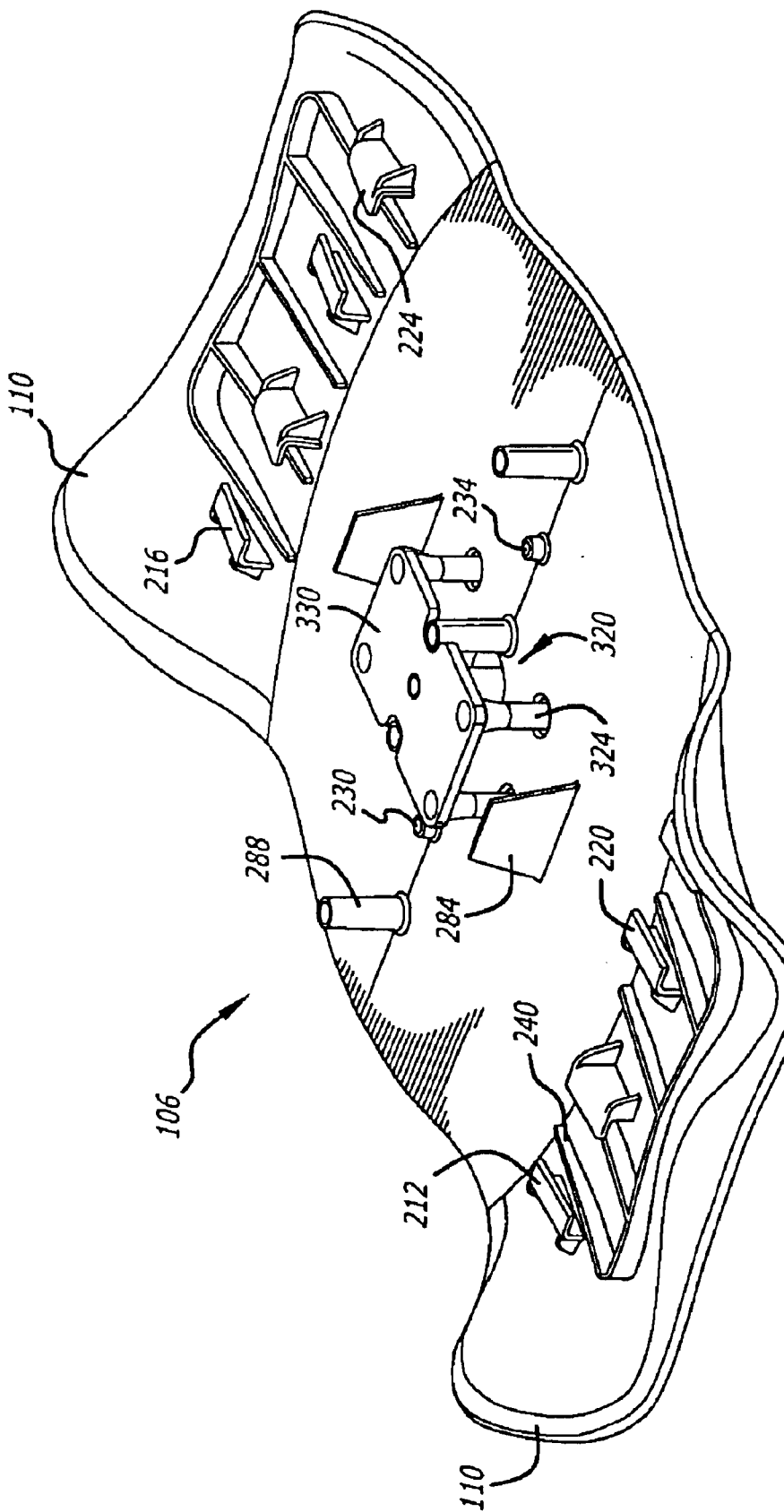
FIG. 8 is a bottom perspective view of the applicator in a flat condition and without the springs attached.
Figure 9:
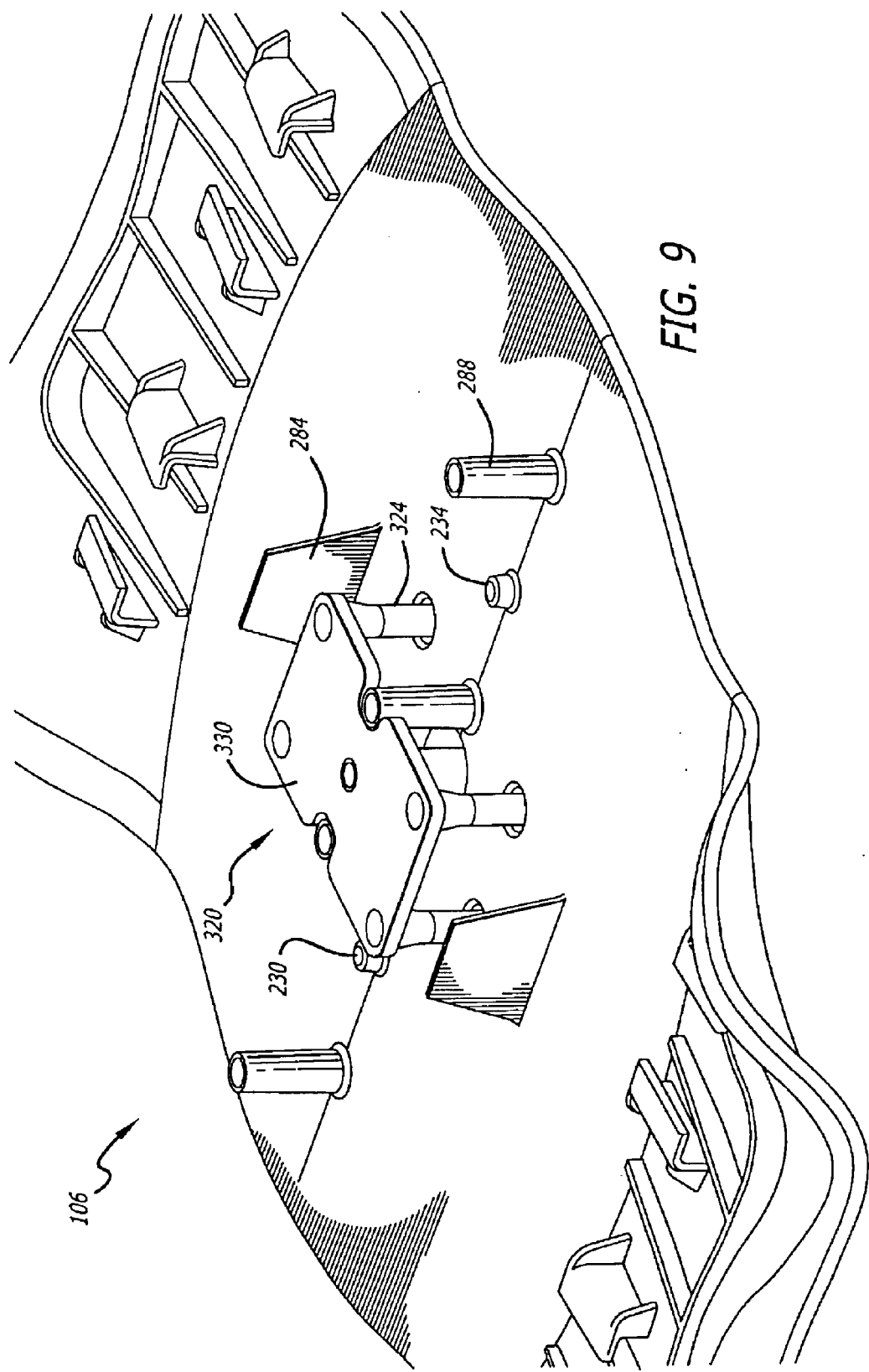
FIG. 9 is an enlarged view showing a central portion of FIG. 8.
Figure 10:
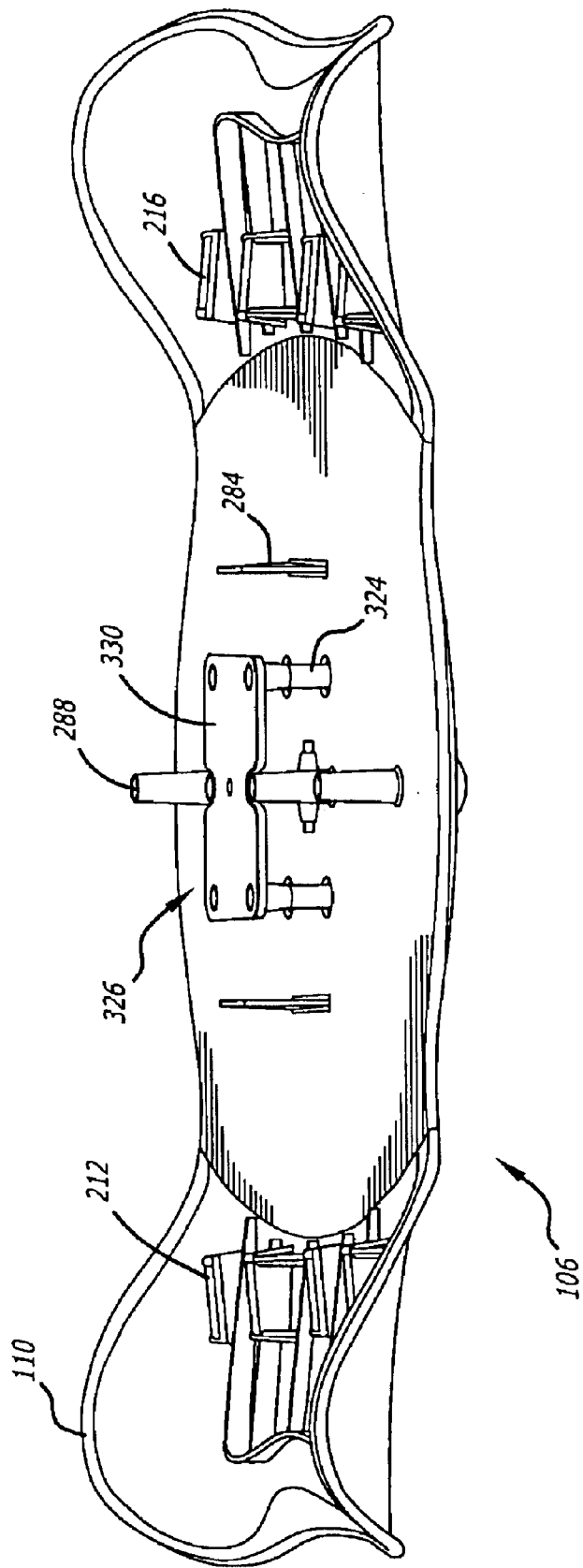
FIG. 10 is a perspective view similar to FIG. 8 but from a different angle.
Figure 11:
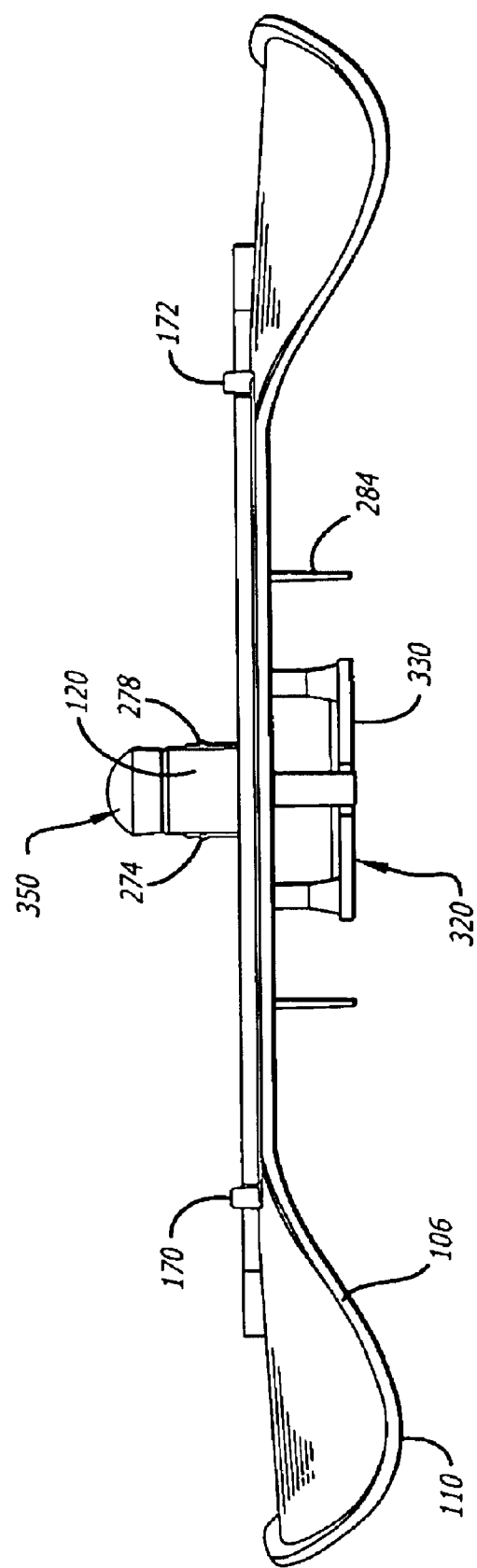
FIG. 11 is a side elevational view of the applicator of FIG. 8.

The locator assembly 320 includes a plurality of posts 324, as shown in FIG. 7. Although the preferred number of posts 324 is four, three, less preferably two, or more than four can be used, or other structures aside from posts, such as arcuate members, can be used. These posts 324 are interconnected together with a bottom plate 330 as shown in FIGS. 8–11, for example. In other words, the four posts 324, connected together by the bottom plate 330, move together up and down through respective openings in the body member 106. A post 340 is connected to the top surface of the plate 330 and extends through a central opening in the body member 106 and up through the center of the post assembly 120. And a knob 350 is attached to the top of the post 340 (FIG. 7). The knob 350 provides a handle by which the user can pull the post 340 up and thereby the four locator posts 324 as shown in FIG. 7. The four raised locator posts 324 allow the applicator 100 to center and accommodate a larger opening label 190 as shown in FIG. 7. Alternatively, this label can also be provided with the no-touch tabs as described for the small hole label. The label, if it has tabs, can similarly be held in place by the four pins 170, 172, engaged in the tab side notches.

Figure 12:
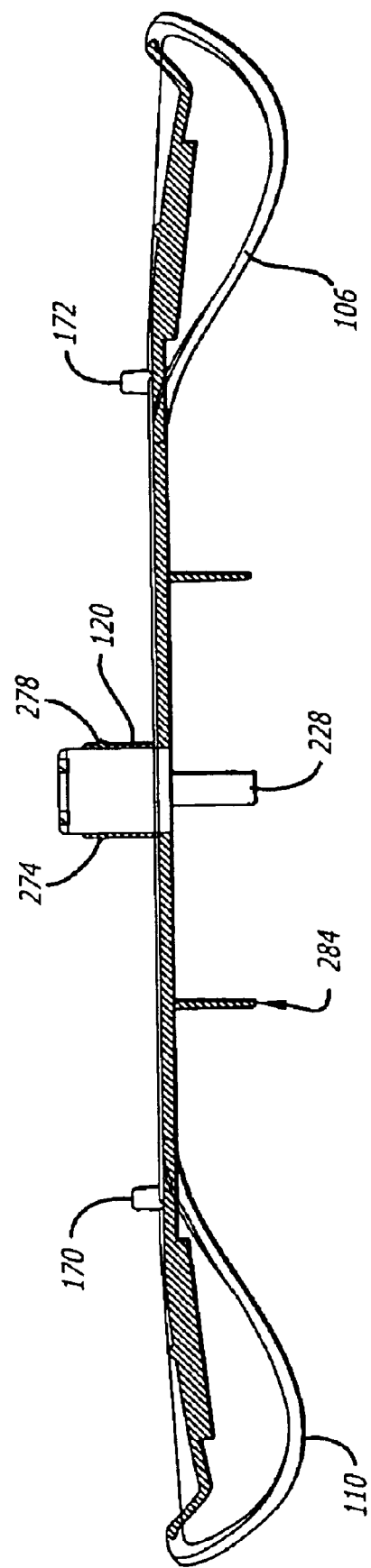
FIG. 12 is a longitudinal cross-sectional view of the applicator of FIG. 8.
Figure 13:
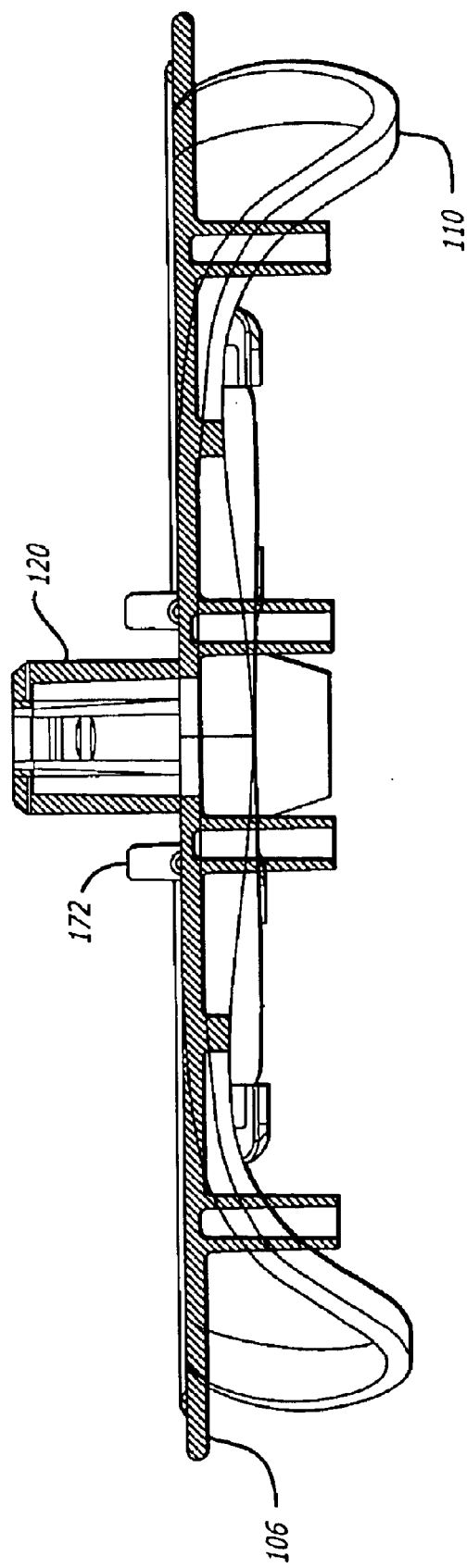
FIG. 13 is a lateral cross-sectional view of the applicator of FIG. 8.

The label applicator 100 as preferably assembled by the manufacturer will now be described. The following components are delivered to or made by the manufacturer: the applicator body member 106 (see FIG. 12), the four prong locator assembly 320 (FIGS. 5 and 8), the knob 350 (FIG. 7), the two leaf springs 204, 208 (FIG. 6), and the foam pad 136 (FIG. 2). The springs 204, 208 are delivered pre-cut and shaped to a curve. And the foam pad 136 is preferably delivered in sheets with pads pre-cut and the logo printed on them and an adhesive layer having a protective silicone liner. The springs 204, 208 are slid under their respective clips 212, 220 at one end thereof until they can be pushed no further. The applicator body member 106 is then bent, and the springs 204, 208 are slid back under the clips 216, 224 at the other end of the body member. The springs 204, 208 are pushed in until the locator pins 230, 234 engage in the respective holes in the springs. The four-prong locator assembly 320 is then pushed up through the holes in the applicator body member 106. The knob 350 is snapped on the top of the post 340 of the prong locator assembly 320. The liner is peeled from the foam pad 136, and the foam pad is positioned in place, adhered on top of the applicator body member 106. An embossed outline on the applicator body member 106 acts as a guide for correctly positioning the foam pad 136.

The consumer removes the assembled applicator 100 as provided by the manufacturer from its box or other packaging (not shown). The small hole and/or large or regular size hole labels 130, 190 preferably with the no-touch tabs can be provided in sheets (see FIGS. 122–124) in the packaging and/or in separate packages. The user will design, using software on his computer, the desired indicia to be printed on the labels. The label sheets are then passed through the user's (desktop) printer or copier and the desired indicia printed on the labels. The printed labels will then be peeled off of the sheet by the user using the no-touch tabs. The labels 130, 190, will have a natural curl to them when peeled off of their sheets, and the present invention takes advantage of that curl by providing the curved support surface on the applicator 100 for the labels. The present invention also provides the advantage in that the pins 170, 172 grip the notches 180, 184 in the no-touch tabs and hold the label snugly against the support surface of the applicator. The label 130 is placed adhesive or sticky side up on the curved foam pad 136 of the applicator 100 using the locator pins 170, 172 to locate and hold it in position, with the post assembly 120 passing through the label hole. This step is shown in FIG. 1 for the full face or small-hole label 130.

The next step is to place the flat articles 160 such as a disc, and more particularly a CD or a DVD, data side up, on the post assembly 120 or locator as shown in FIG. 3. The user then manually presses the disc 160 down, biasing the nibs 274, 278 inward until the disc touches the label 130, as shown in FIG. 4. He continues to press the disc 160 down until the applicator 100 is substantially flat, as shown in FIG. 5, with the stop fins and posts contacting the support surface on which the applicator rests. The curved support surface for the label 130 smoothes the label onto the disc 160 from the center outwards as the disc is pressed down onto the label. The labeled disc is then lifted off of the post assembly 120. The tabs of the label 130 are then torn off from the affixed label by the user. The applicator 100 returns to its normal arched or curved configuration due to the return action of its leaf springs 204, 208, for example.

For standard CD labels 190, that is, ones with standard size holes that are larger than the holes of the full face label, a first application step is for the user to grasp the knob 350 on the top of the post 340 and pull up on the knob, thereby pulling the four-prong locator assembly 320 up so that the four locator prongs or posts 324 extend up above the surface of the foam pad 136, approximately one-half inch. After designing the indicia to be printed on the label 190 and printing that indicia on the sheeted label, the label is peeled off from the sheet liner. The printed label 190 is placed sticky or adhesive side up on the applicator 100 over the post assembly 120 and using the four raised locator posts 324 as a centering guide and onto the foam pad (FIG. 7). The label 190 can also be positioned with the locator pins 170, 172, if tabs and notches are provided in the label. As mentioned previously, the curved label support surface allows the labels to be burnished (or applied) more smoothly by taking advantage of the natural curl of the printed labels when removed from their support sheets. The disc 160 is positioned in the rest position on the nibs 274, 278 and then pressed down similar to the full face labels; the disc is pressed down until the applicator 100 is flat or substantially flat. The curved applicator 100 will smooth the adhesive label onto the disc from the center outwards as the disc is pressed down to the applicator pressed-down position. The labeled disc is then removed from the applicator 100.

The body member 106 when in a rest position preferably has a height of 2.875 inches and has a footprint with a width of 5.25 inches and a length of 8.125 inches, and when in a compressed label application position has a height of 1.5 inches and a footprint of the same width as when in the rest position but a longer length of 9.125 inches. While small hole labels can have a central hole diameter of 0.604 inch, the large hole labels can have a central hole diameter of 1.625 inches. Dimensions other than those set forth above as would be apparent to those skilled in the art are within the scope of this invention, as are different configurations and materials.

Figure 15:
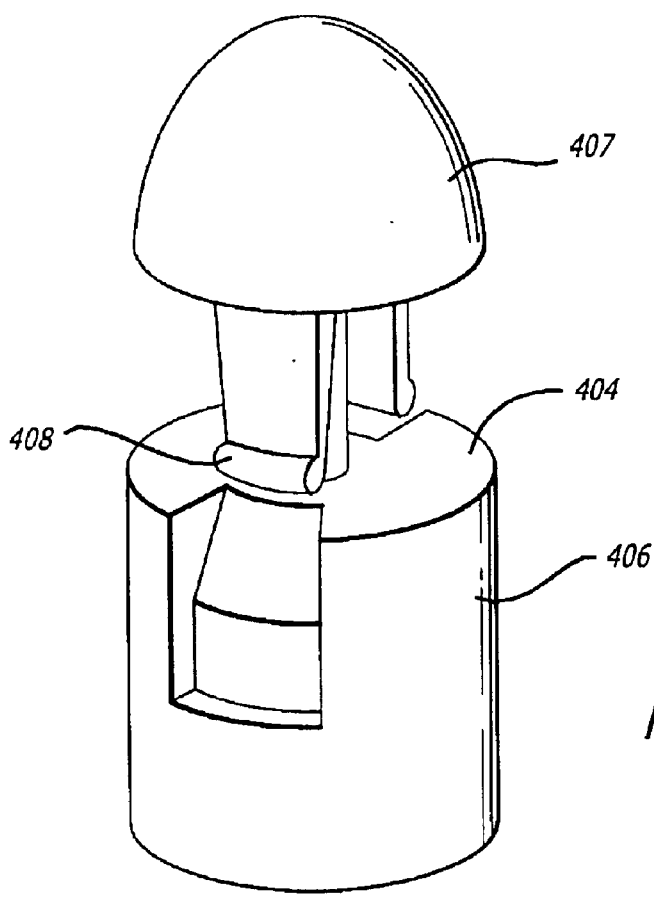
FIG. 15 is a perspective view of one embodiment showing a post assembly for a label applicator.
Figure 16:
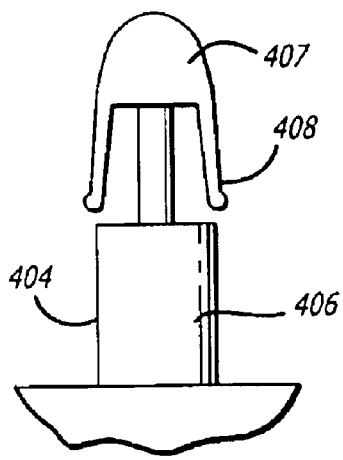
FIG. 16 is a side view of the embodiment of FIG. 15.
Figure 17:
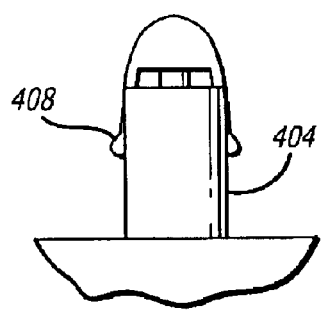
FIG. 17 is a side view of the embodiment of FIG. 15 in a down position.
Figure 18:
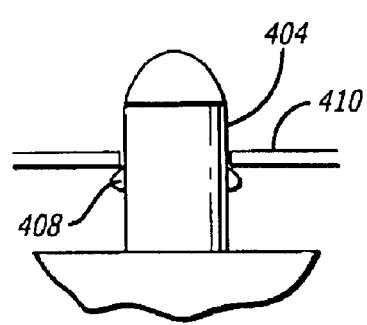
FIG. 18 is another side view of the embodiment of FIG. 15 showing an optical disc in position for a label application procedure.

FIG. 15 is a perspective view of another embodiment of the present invention showing a post assembly 404 having a spindle 406 coupled thereto. The knob 407 is movable up and down within the post assembly by physically pushing and pulling the spindle. The spindle 406 includes at least one ridge 408. The ridge 408 acts as a stop for an article 410 placed on the post assembly. When the article 410 is placed on the post assembly 404, the article meets the at least one ridge 408 for accurately positioning on the post assembly. FIGS. 16–18 show side views of the spindle 406 of FIG. 15, in varying positions relative to the post assembly. FIG. 16 shows the spindle 406 in an upright position, fully pulled up from the post assembly. FIG. 17 shows the spindle 406 partially pulled up from the post assembly, or alternatively partially pushed down on the post assembly. FIG. 18 shows the spindle 406 pushed all the way down on the post assembly, or in the alternative, in a position in which it has not been pulled up from the post assembly.

Figure 19:
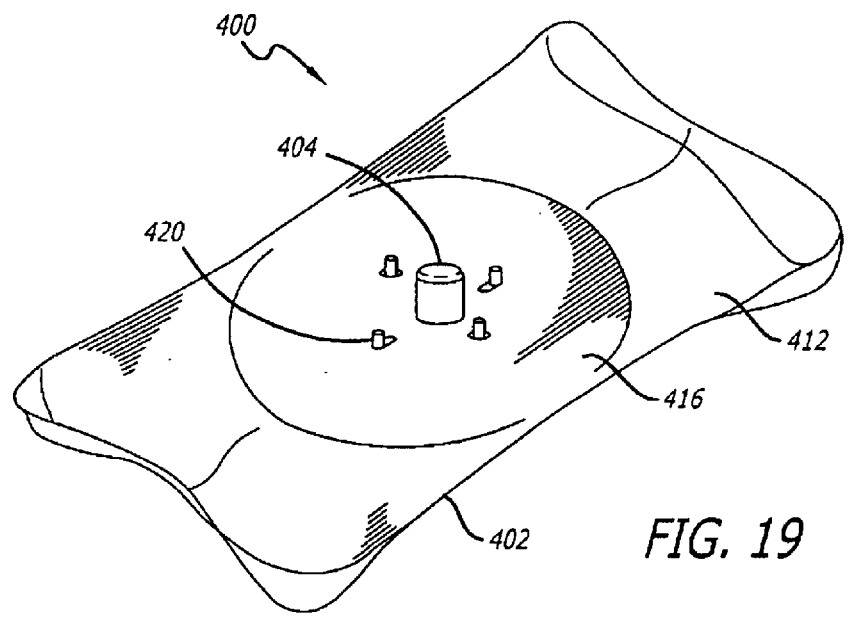
FIG. 19 is a perspective view of an applicator according to one embodiment of the present invention, with the pegs thereof raised as illustrated a large hole label can be centered thereon.
Figure 20:
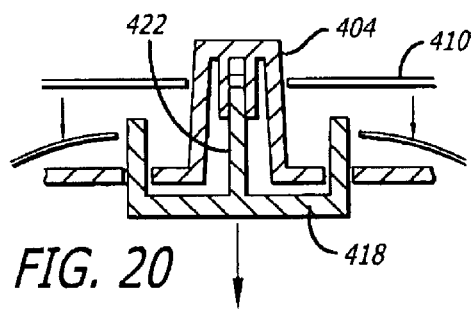
FIG. 20 is a cross-sectional view of a post assembly of the applicator of FIG. 19 with a disc in position for application to an adhesive label; the locator thereof being a separate (removable) piece.
Figure 21:
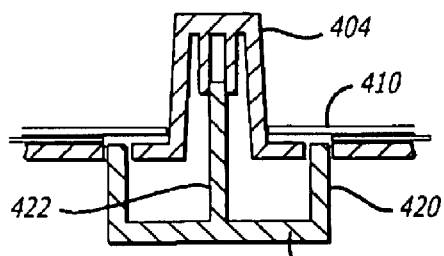
FIG. 21 is another cross-sectional view of a post assembly FIG. 20 with the label applied to the disc.

FIG. 19 is a perspective view of an applicator 400 having a support surface 412 and central area 416 of the support surface. The applicator 400 includes the post assembly 404. The post assembly 404 may be positioned beneath the support surface 412 and may include a base portion 418 and a plurality of pegs 420 that extend from beneath the support surface 412 through to the upward-facing side of the support surface 412. The plurality of pegs 420 provide positioning support for an article 410 placed on the post assembly 404. The base portion 418 also includes a vertical post 422. FIGS. 20 and 21 are cross-sectional views of the post assembly 404 of FIG. 19 in different stages of compression by the article 410. In FIG. 20, the plurality of ends are positioned above the support surface 412, and the article 410 is in the process of being placed on the post assembly 404. In FIG. 21, the article 410 has been pushed down on the post assembly 404, such that the plurality of pegs 420 are beneath the top surface of the support surface 412. In both FIG. 20 and FIG. 21, the vertical post 418 of the post assembly 404 is coupled to the post assembly at an upper end of the vertical post such that the base portion 418 and plurality of ends do not separate from the post assembly when the article 410 compresses the plurality of pegs 420 below the top of the support surface 412 (inwardly-disposed catches).

Figure 22:
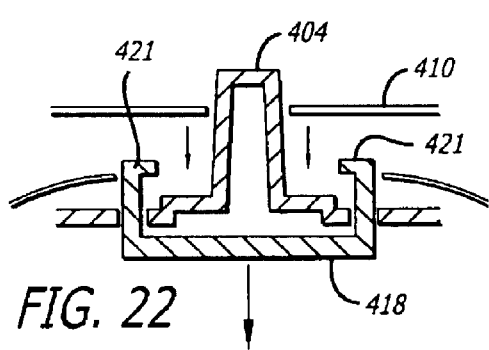
FIG. 22 is a cross-sectional view of another embodiment of the post assembly of FIG. 19.
Figure 23:
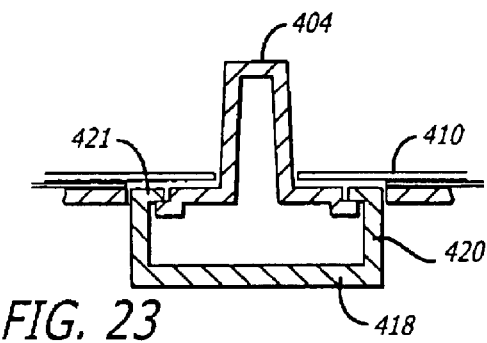
FIG. 23 is another cross-sectional view of the post assembly of FIG. 22 with the label applied to the disc.

FIGS. 22 and 23 are cross-sectional views of another embodiment of the present invention showing the post assembly 404 of FIG. 19 in different stages of compression by the article 410. In this embodiment, the plurality of pegs 420 have curved edges 421 that catch the post assembly as an article 410 pushes the plurality of pegs 420 down when the article 410 is being pushed down on the post assembly. This prevents the plurality of ends and the base portion 418 from separating from the post assembly when the article 410 compresses the plurality of ends below the top of the support surface 412.

Figure 24:
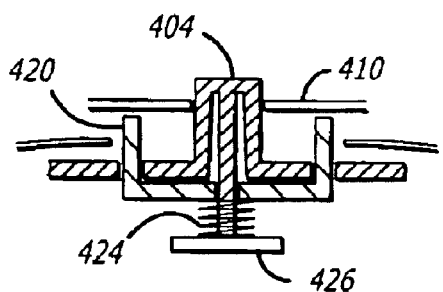
FIG. 24 is a cross-sectional view of still another embodiment of the post assembly of FIG. 19 (with a bottom knob)
Figure 25:
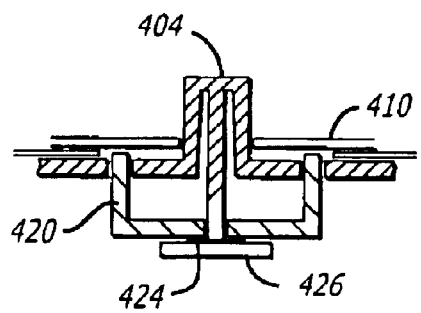
FIG. 25 is a cross-sectional view of the post assembly of FIG. 24 with the label applied to the disc.

FIG. 24 and FIG. 25 are cross-sectional views of still another embodiment of the present invention showing the post assembly 404 of FIG. 19 in different stages of compression by the article 410. This embodiment includes a plurality of pegs 420 and a base portion 418 biased by a spring 424. The spring 424 is coiled around a post 422 which is coupled on one end to the post assembly 404 and on another end to a bottom portion 426. When an article 410 is pushed down on the post assembly 404, the spring 424 compresses against the bottom portion 426. This prevents the plurality of pegs 420 and the base portion 418 from separating from the post assembly 404 when the article 410 compresses the plurality of pegs 420 below the top of the support surface 412. When an article 410 is not pressed down on the post assembly 404, the spring 424 supports the base portion 418 and plurality of pegs 420 and biases them in an upward position such that the plurality of pegs 420 extend through to the top of the support surface 412.

Figure 26:
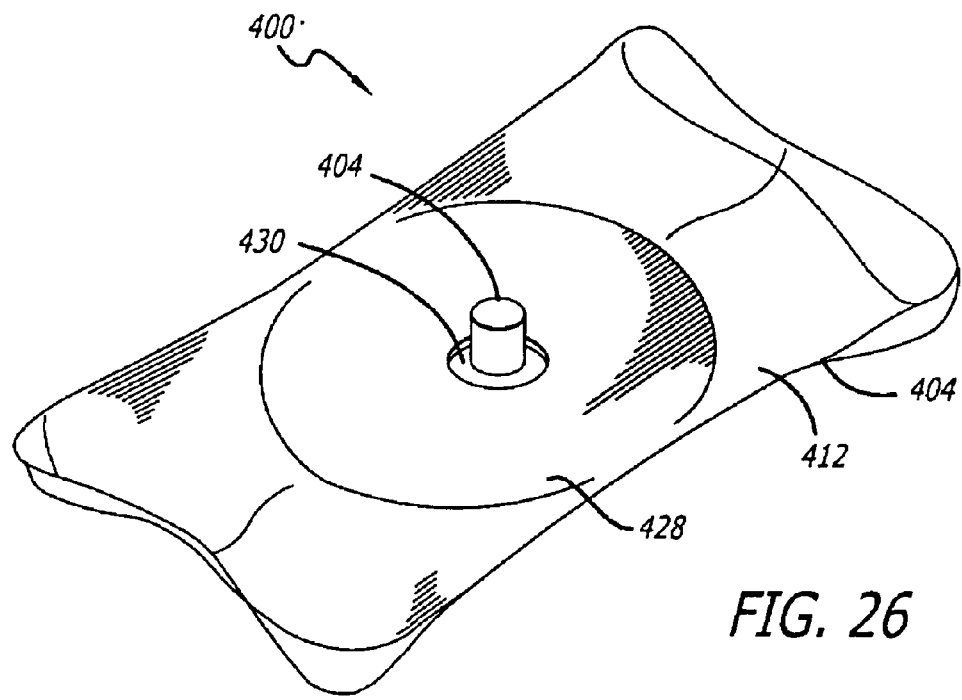
FIG. 26 is a perspective view of another embodiment of the present invention.
Figure 27:
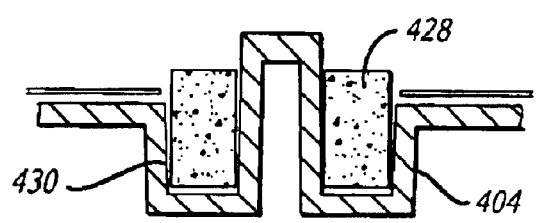
FIG. 27 is an enlarged cross-sectional view of the center of the embodiment of FIG. 26 with the compressible (foam) ring.
Figure 28:
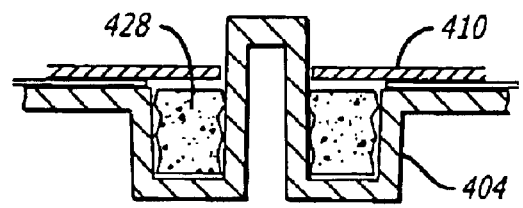
FIG. 28 is another cross-sectional view similar to FIG. 27 showing a label applied to the disc.

FIG. 26 is a perspective view of another embodiment of the present invention in which the applicator includes a recess 430 and a compressible material 428, such as a foam padding, employed in the recess to support an article 410 placed on the post assembly 404. FIG. 27, and FIG. 28 are cross-sectional views of the embodiment of FIG. 26 and show the foam padding in the recess 430 encircling the post assembly 404. FIG. 27 shows the foam padding in an uncompressed, or normal state, prior to an article 410 being pushed down on the post assembly 404. FIG. 28 shows the foam padding in a compressed state with an article 410 being pushed down on the post assembly 404 and compressing the foam padding. In the embodiments of FIG. 26, 27 and 28, the foam padding allows a user to center the article 410 on the applicator for ease in applying a label to the article 410.

Figure 29:
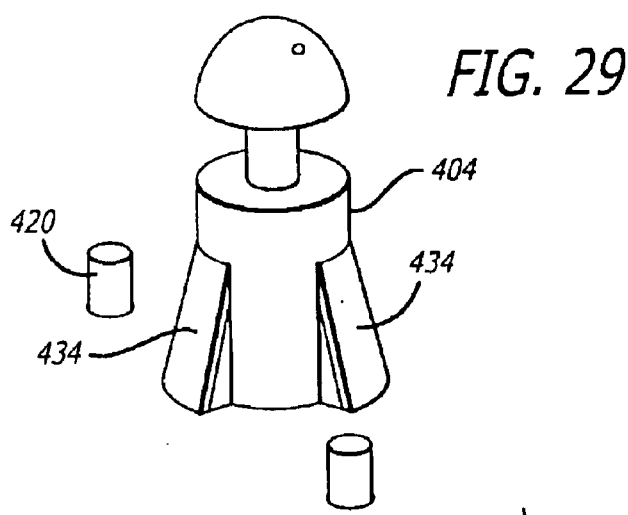
FIG. 29 is a perspective view of a spindle to a post assembly of a label applicator of the present invention.
Figure 30:
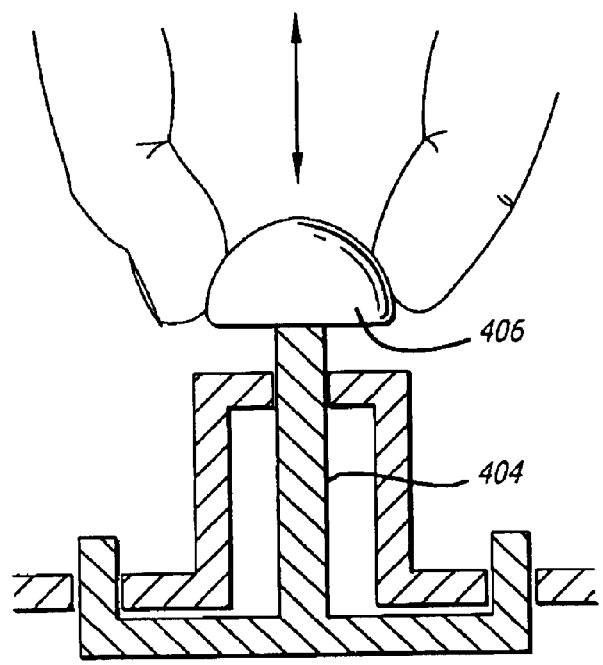
FIG. 30 is an enlarged cross-sectional view of the post assembly of FIG. 29 shown in isolation.
Figure 31:
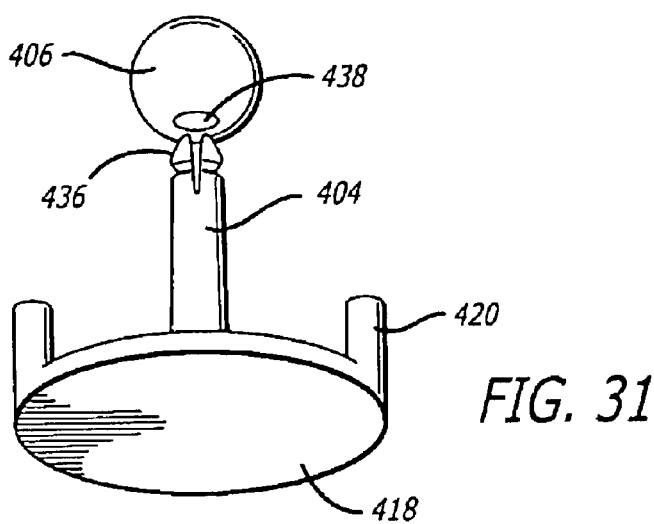
FIG. 31 is a bottom perspective view of the post assembly of FIG. 29 shown in isolation; the post assembly has a top snap-fit knob.

FIG. 29 shows a portion of post assembly 404 in which a spindle 406 is coupled to the post assembly 404. The post assembly 404 also includes a plurality of leaves 434 extending out from the post assembly 404 for guiding the placement of an article 410 on the post assembly 404. The plurality of leaves 434 are coupled at one end to the post assembly 404 and include foam between the plurality of leaves 434 and the post assembly so that the plurality of leaves 434 compress inward toward the post assembly. FIG. 30 is a cross-sectional view of the post assembly 404 showing the spindle 406 and post assembly 404 to be moveable. A user grasps the spindle (or knob) 406 to move the post assembly 404 up and down. FIG. 31 is a perspective view of the post assembly 404 showing the spindle 406 being coupled to the post assembly, the post assembly 404 having a top portion 436 which snaps into a housing 438 of the spindle 406 to secure the spindle 406 to the post assembly.

FIG. 32 is a top view of an applicator 400 of the present invention. The applicator 400 includes a support surface 412, a central area 416, and a post assembly 404. The applicator of FIG. 32 is shown in a substantially compressed configuration from an overhead view. FIG. 33 is a side view of the applicator 400 of the present invention in a compressed state, such as would occur when an article 410 is pressed down on the post assembly by a user. FIG. 34 is also a side view of the applicator 400 of the present invention, showing the applicator in an uncompressed state. FIG. 35 is a perspective view of an applicator 400 of the present invention, showing a post assembly 404 having a spindle 406 biased by a coiled spring 440 and held in place by a flat spring 442. The flat spring 442, coiled spring 440 and spindle 406 are mounted on the bottom of the applicator 400, such that the post assembly 404 remains in an upright, static position as an article 410 is placed on the post assembly 404 and pushed down. FIG. 33 and FIG. 34 show the spindle 406 applied from the bottom of the applicator 400 as shown in FIG. 35.

Figure 36:
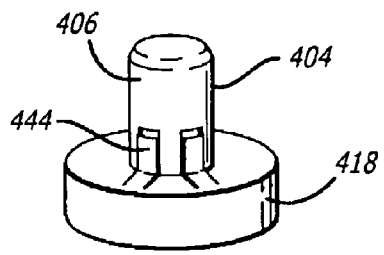
FIG. 36 is a perspective view of a post assembly according to another embodiment of the present invention, the CD supporting fingers bend downwardly relative to the post.
Figure 37:
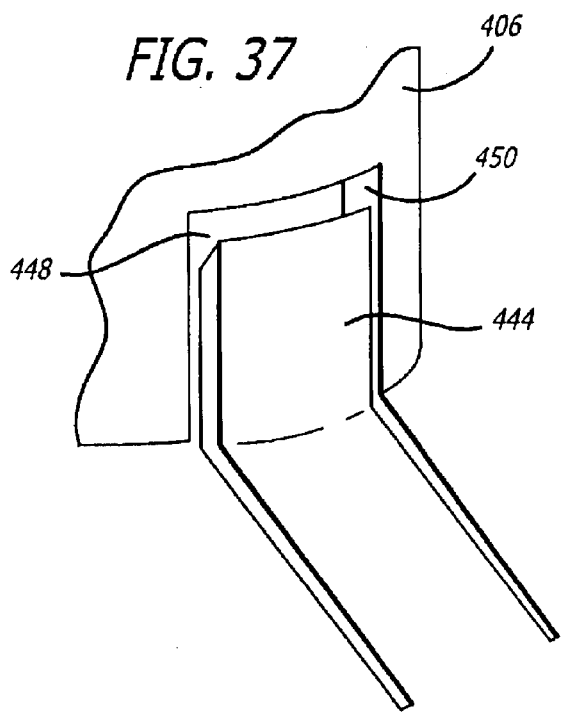
FIG. 37 is an enlarged perspective view of a flexible locator piece of the spindle of FIG. 36.
Figure 38:
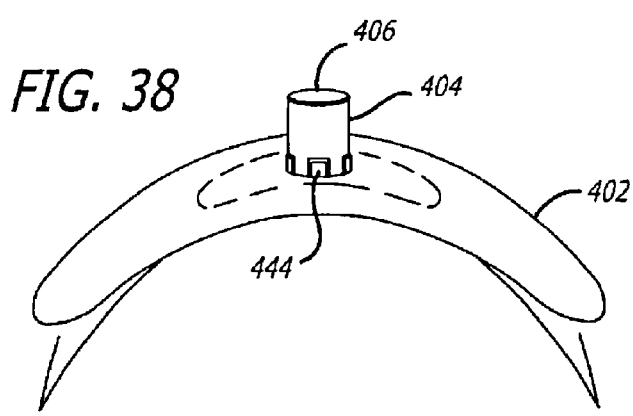
FIG. 38 is a side view of an applicator including the post assembly of FIG. 36.
Figure 39:
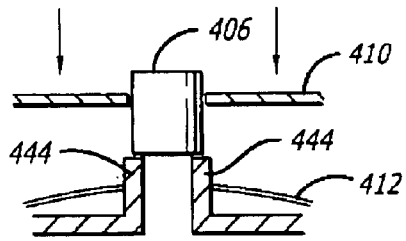
FIG. 39 is a side cross-sectional view of a post assembly according to FIGS. 36 and 38.
Figure 40:
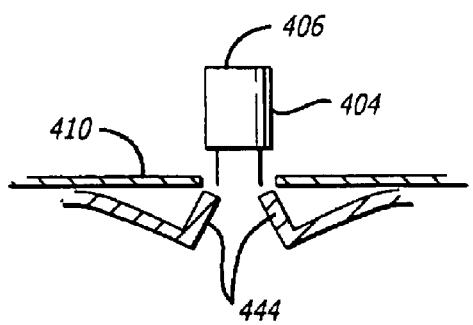
FIG. 40 is a view similar to that of FIG. 39 showing the label applied to the disc.

FIG. 36 is a perspective view of a post assembly 404 having a spindle 406, a base portion 418, and a plurality of flexible locator pieces 444 coupled to the base portion 418. The plurality of flexible locator pieces 444 each have an end positioned in a groove 448 on the spindle 406, and an edge 450 on the end extending slightly away from the spindle 406 to receive an article 410 being positioned on the post assembly 404. As an article 410 is placed on the post assembly 404 and pushed down, the plurality of flexible locator pieces 444 move down and away from the spindle 406. FIG. 37 is a close-up perspective view of one of the flexible locator pieces 444 with an edge 450 on an end extending slightly away from the spindle 406. FIG. 38 is a side view of an applicator 400 of the present invention including a spindle 406 having the plurality of flexible locator pieces 444 positioned thereon. FIG. 39 and FIG. 40 show an article 410 being applied to the post assembly 404. In FIG. 39, the flexible locator pieces 444 are in their normal position prior to the article 410 being applied. In FIG. 40, the flexible locator pieces 444 are pushed down and away from the post assembly 404 as the article 410 is pushed down on the post assembly 404.

FIG. 41 is a perspective view of a post assembly 404 for use in an applicator 400 of the present invention. The post assembly 404 includes a spindle 406, a base portion 460, and a plurality of extensions 452 on the base portions 460 perpendicularly positioned relative to the flat surface of the base portion 460. The spindle 406 includes a series of grooves 454 which accept the plurality of extensions 452 when the spindle 406 is pushed down onto the base portion 418, causing the spindle 406 to snap into and be secured by the base portion 460. FIG. 42 shows the spindle 406 placed on and snapped into the base portion 460. The plurality of extensions 452 also guide the placement of the article 410 on the post assembly 404. As an article 410 is placed on the post assembly 404 and over the plurality of extensions 452, the plurality of extensions 452 compress inwardly in the grooves 454 of the spindle 406 to allow the article 410 to be fully pressed down on to a label 432 placed on the support surface 412.

FIG. 43 is a perspective view of one embodiment of the applicator 400 of the present invention. The support surface 412 includes a beaded edge 456 running around the entire edge of the support surface 412. The support surface 412 itself is made of a material having a light texture on the surface. A foam pad forming the central area 416 is placed on the support surface 412. The applicator body 402 includes a pair of ends 458 that may include gradual depressions that form feet for supporting the applicator 400. FIG. 44 is a side of the applicator 400 according to the embodiment of FIG. 43, in which the applicator 400 has been pressed down to a substantially horizontal position by the application of an article 410 to the post assembly 404. The post assembly of FIG. 43, which can be used with all applicator embodiments of the present invention, is disclosed in U.S. Pat. No. 5,951,819 (Hummell et al.).

Figure 45:
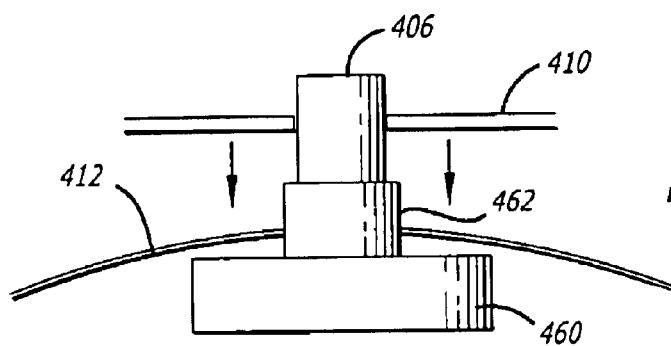
FIG. 45 is an enlarged side view of a post assembly according to one embodiment of the present invention.
Figure 46:
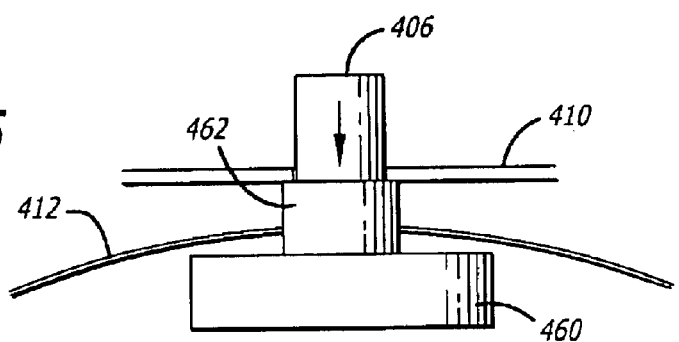
FIG. 46 is another side view of the post assembly of FIG. 45.
Figure 47:
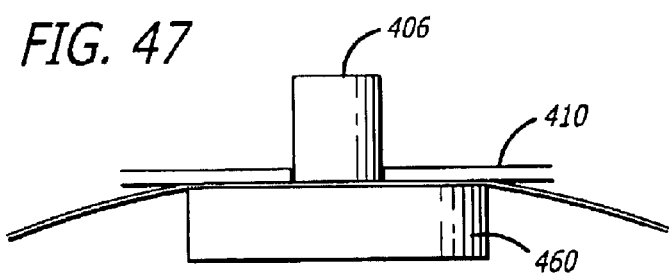
FIG. 47 is a further side view of the post assembly of FIG. 45 in a fully compressed position.

The post assembly 404 of FIGS. 43 and 44 includes a spindle 406 and a base portion 460. The base portion 460 is retractable upon the application of an article 410 to the post assembly 404, as shown in FIG. 44. An article 410 placed on the post assembly 404 first rests on the base portion 460 and then, as more force is applied, the article 410 causes the base portion 460 to retract to a position underneath the top of the support surface 412 as shown in FIG. 44. The retractable feature of the post assembly 404 of this embodiment is further shown in FIGS. 45, 46, and 47. In FIG. 45, the post assembly 404 includes a spindle 406, a tiered portion 462, and a base portion 460. The base portion 460 is positioned beneath the support surface 412. As an article 410 is placed on the spindle 406 of the post assembly 404, it rests initially on the top of the tiered portion 462, as shown in FIG. 46. When a downward force is applied to the article 410, the tiered portion 462 retracts into the base portion 460, such that when the article 410 is pushed fully to the support surface 412, the tiered portion 462 retracts fully into the base portion 460 as shown in FIG. 47.

Figure 48:
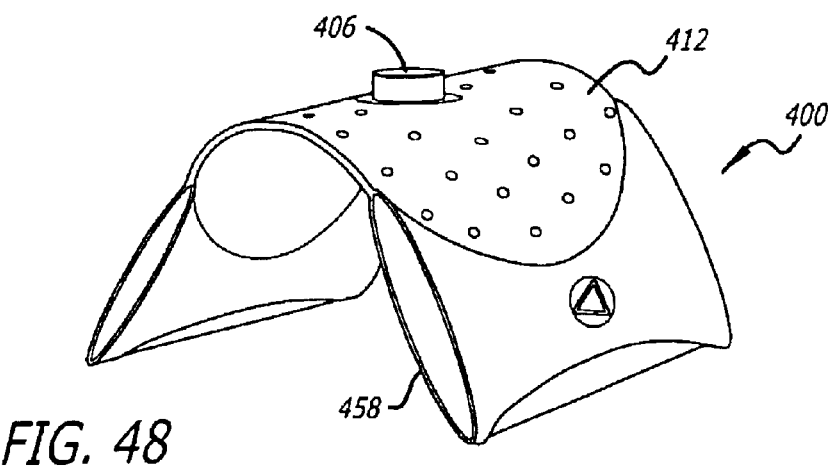
FIG. 48 is a perspective view of an applicator according to a further embodiment of the present invention with a flexible (foam) center and rigid (molded) legs.

FIG. 48 shows another embodiment of the applicator 400 of the present invention in which the support surface 412 is an elongate, flexible body having a pair of rigid, molded edges 458. The support surface 412 may also include a series of holes. A pair of springs 464 may also be positioned under the support surface 412 for biasing the support surface 412 in a slightly curved position, so that the rigid, molded edges 458 form legs for the support surface 412 when in the slightly curved position.

Figure 49:
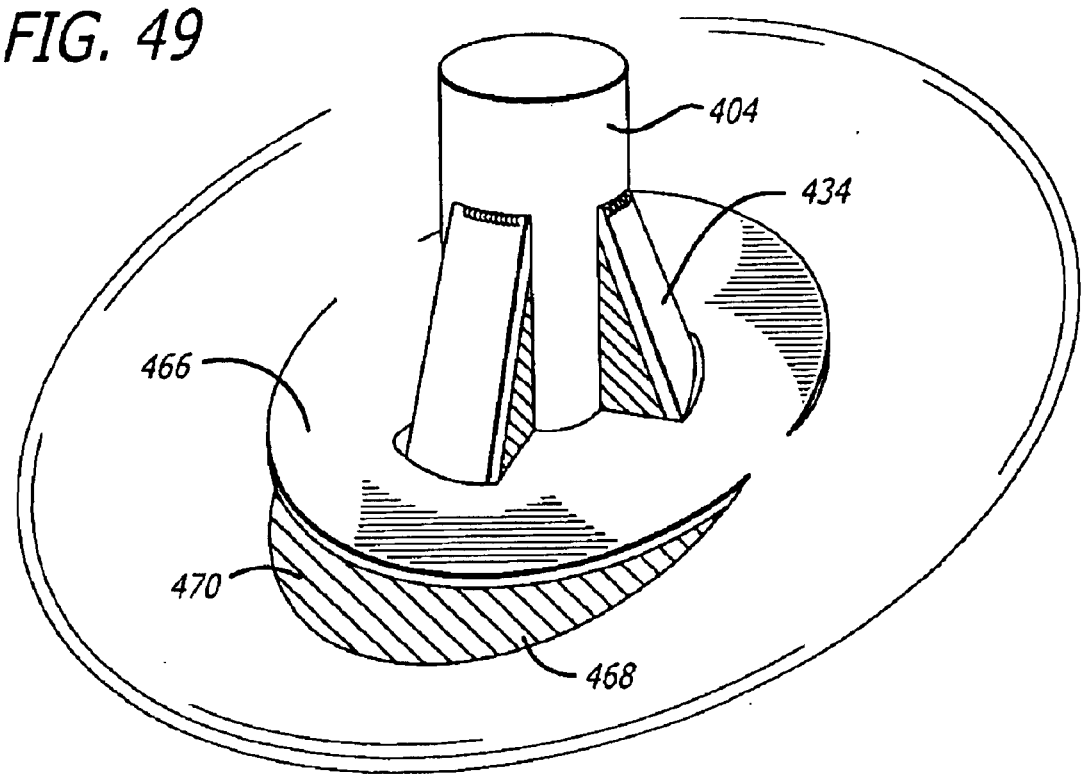
FIG. 49 is a perspective view of a post assembly according to one embodiment of the present invention with the flaps part of the body and foam sandwiched thereunder and defining a label large hole centering means.
Figure 50:
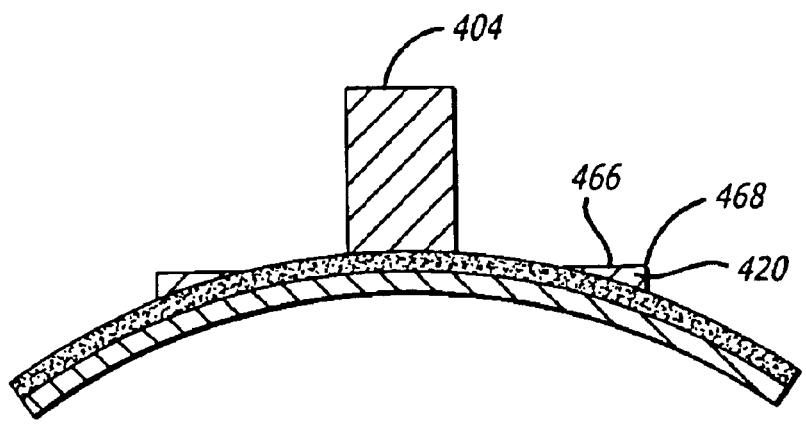
FIG. 50 is a side cross-sectional view of the post assembly of FIG. 49.

FIG. 49 is a perspective view of a post assembly 404 for use with an applicator 400 of the present invention. The post assembly 404 includes a spindle 406 and a plurality of leaves 434 extending out from the post assembly 404 for guiding the placement of an article 410, as shown in FIG. 29. FIG. 49 also shows a pair of surface flaps 466 coupled to the support surface 412 and having an opening 468 at substantially parallel positions relative to the support surface 412. The surface flaps 466 each include a foam portion 470 at the opening 468 so that the surface flaps 466 are compressible against the support surface 412 when an article 410 is positioned on the post assembly 404 and pushed down against the support surface 412. FIG. 50 is a side view of the post assembly 404 and applicator 400 of FIG. 49.

Figure 51:
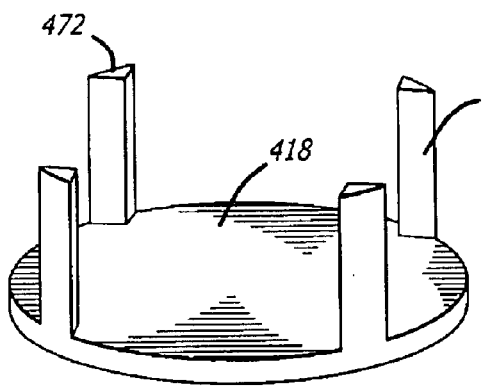
FIG. 51 is a perspective view of a post, peg or prong (or adapter) assembly according to one embodiment of the present invention shown in isolation; the prongs thereof are tapered to provide a friction fit.
Figure 53:
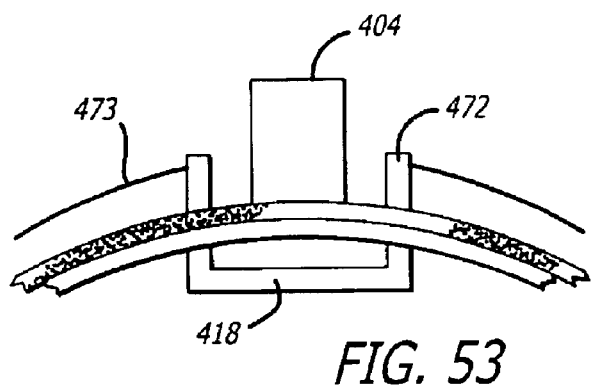
FIG. 53 is a first cross-sectional side view of the post assembly of FIG. 52.
Figure 52:
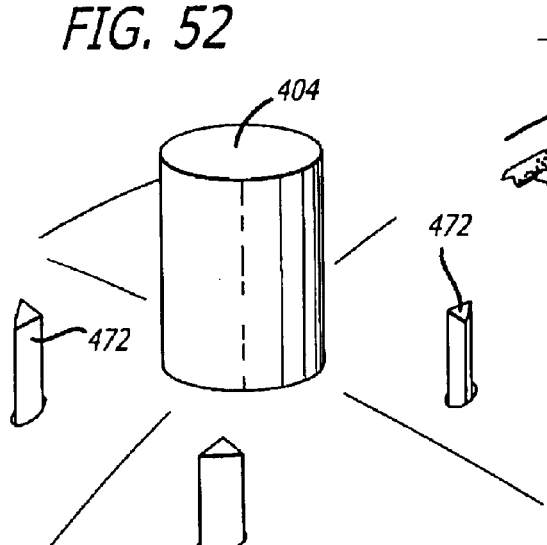
FIG. 52 is perspective view of the post assembly according to FIG. 51 installed in a label applicator.
Figure 54:
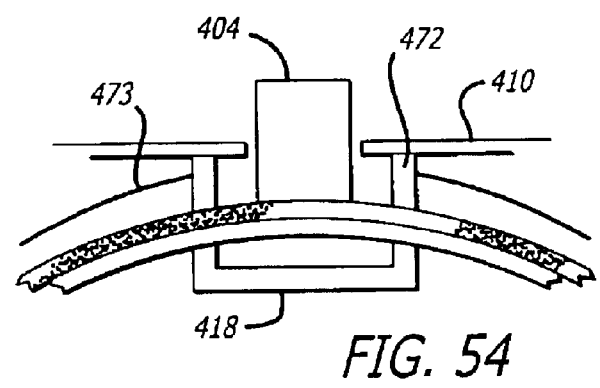
FIG. 54 is a second cross-sectional side view thereof with the CD supported by the post.
Figure 55:
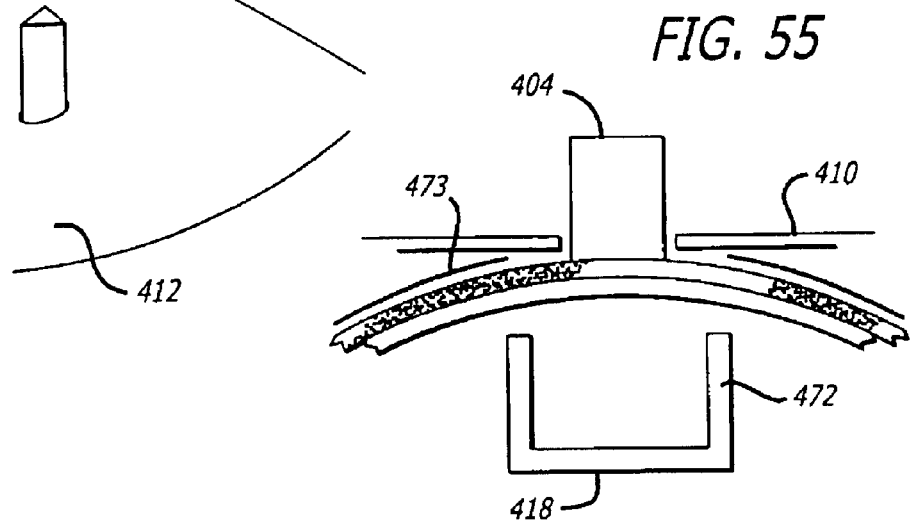
FIG. 55 is a third cross-sectional side view thereof showing a label applied to a disc.

FIG. 51 is a perspective view of a post assembly 404 according to one embodiment of the present invention. The post assembly 404 of FIG. 51 includes a base portion 418 and a plurality of tapered pegs 472. The base portion 418 is positioned below the support surface 412 such that the tapered pegs 472 extend through holes to the top surface of the support surface 412, as shown in FIG. 52. As an article 410 is placed on the post assembly 404, as in FIG. 53, and pushed down on the tapered pegs 472 towards label 473, as in FIG. 54, the tapered aspect of the pegs 472 deters the pegs from completely passing through the holes in the support surface 412. In yet another embodiment, the post assembly 404 may be removable and securable to the applicator. FIG. 55 is a side view of the post assembly 404 freed from the applicator as an article 410 is pushed all the way down on the post assembly 404, with the tapered pegs 472 allowed to pass through the support surface 412 such that the post assembly 404 is released from the applicator 400.

Figure 56:
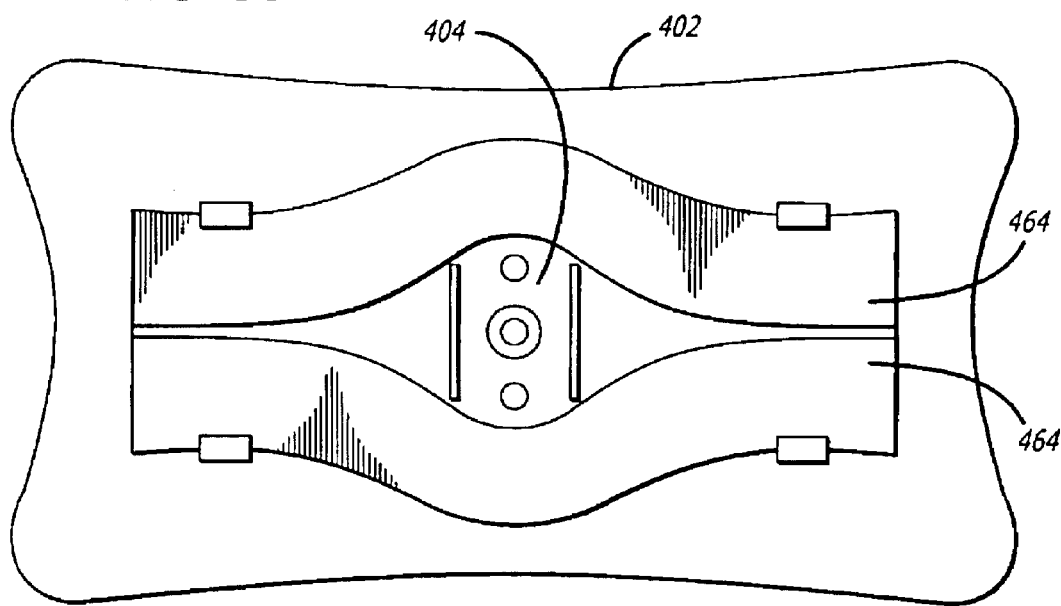
FIG. 56 is a bottom view of an applicator according to one embodiment of the present invention.
Figure 57:
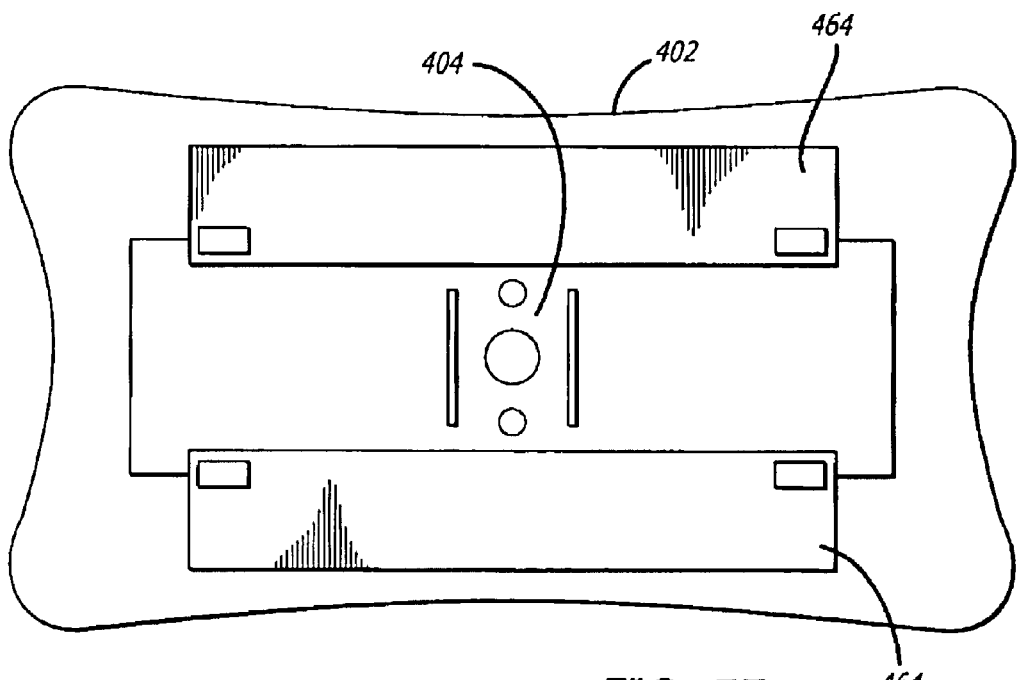
FIG. 57 is a bottom view of an applicator according to another embodiment of the present invention.

FIG. 56 is a bottom view of an applicator 400 according to one embodiment of the present invention. The applicator 400 of FIG. 56 includes a pair of springs 464 positioned under the support surface 412 for biasing the support surface 412 in a slightly curved position. The pair of springs 464 are positioned to be spaced apart relative to each other at their respective middle sections, and close together relative to each other at their respective end sections. FIG. 57 is a bottom view of an applicator 400 according to another embodiment of the present invention. The applicator 400 of FIG. 57 includes a pair of springs 464 positioned under the support surface 412 for biasing the support surface 412 in a slightly curved position. The pair of springs 464 are positioned substantially parallel relative to each other.

Figure 58:
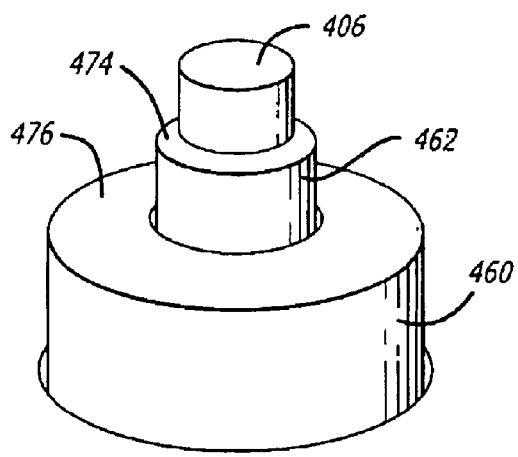
FIG. 58 is a perspective view of a post assembly according to one embodiment of the present invention for alternatively holding small and large hole labels.
Figure 59:
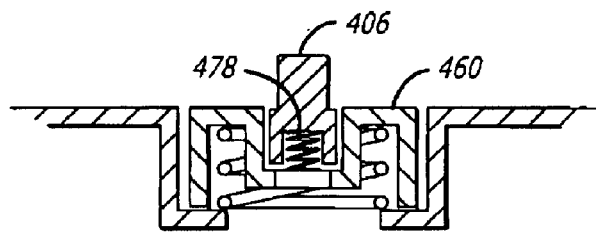
FIG. 59 is a cross-sectional view of the post assembly of FIG. 58 in a compressed position.
Figure 61:
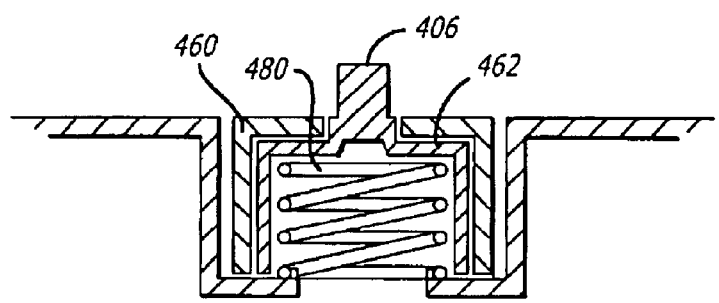
FIG. 61 is a cross-sectional view of the post assembly of FIG. 60 in a compressed position.
Figure 60:
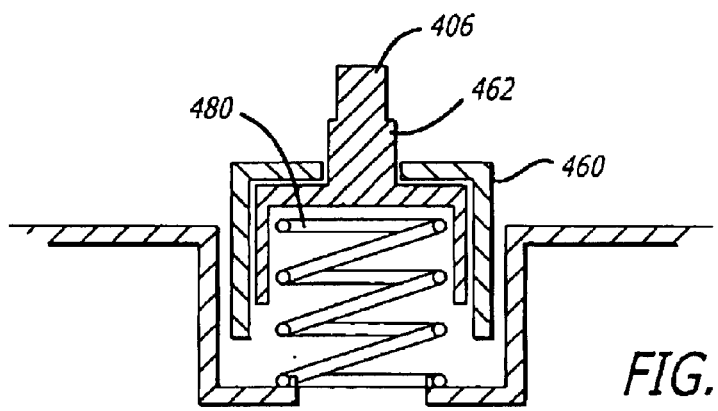
FIG. 60 is a cross-sectional view of a variation of the post assembly of FIG. 58 in a raised position.

FIG. 58 is a perspective view of a post assembly 404 according to one embodiment of the present invention. The post assembly 404 includes a spindle 406, a tiered portion 462 providing a first centering area 474, and a base portion 460 providing a second centering area 476. Labels 432 having a narrow central opening are centered using first centering area 474. Labels 432 having a wide central opening are centered using the second centering area 476. FIG. 59 is a cross-sectional view of the embodiment of FIG. 58, wherein the spindle 406 and tiered portion 462 are biased against the base portion 460 by a first spring 478. A second spring 480 biases the base portion 460 against the post assembly 404. FIG. 60 is a cross-sectional view of another embodiment, wherein a single spring 482 biases the spindle 406, tiered portion 462, and base portion 460 against the post assembly 404. As an article 410 is pushed down on the tiered portion 462 of the post assembly 404, the tiered portion 462 compresses inside the base portion 460, which compresses down beneath the top of the support surface 412. FIG. 61 is a further cross-sectional of the embodiment of FIG. 60, in which the base portion 460 is compressed down beneath the support surface 412 as an article 410 is pushed down on the post assembly 404.

Figure 62:
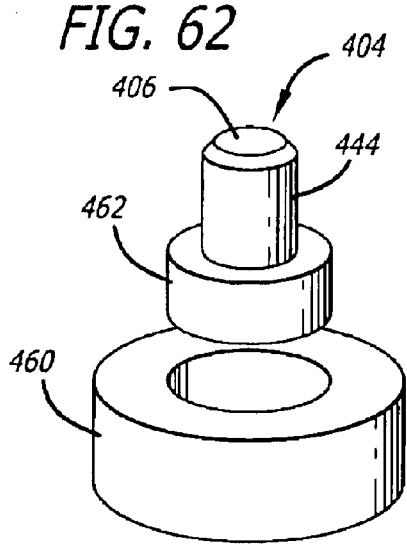
FIG. 62 is an exploded perspective view of a post assembly according to one embodiment.
Figure 63:
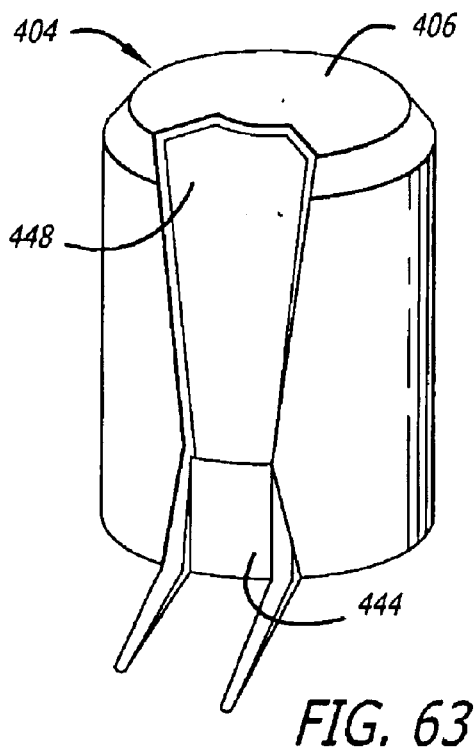
FIG. 63 is a perspective view of a first variation of the post assembly of FIG. 62.
Figure 65:
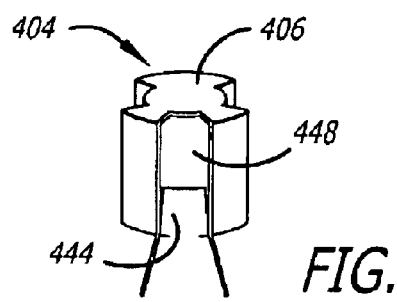
FIG. 65 is a perspective view of a third variation of the post assembly of FIG. 62, the bottom CD supporting bead bends in and out.

FIG. 62 is a perspective view of a post assembly 404 according to one embodiment, where the post assembly 404 includes a spindle 406, a tiered portion 462, and a base portion 460. FIGS. 63 and 65 are views of a spindle 406 having a leaf 444 extending out from the post assembly 404 for guiding the placement of an article 410 on the post assembly 404, similar to that shown in FIG. 29.

Figure 64:
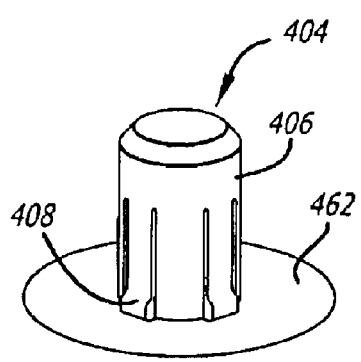
FIG. 64 is a perspective view of a second variation of the post assembly of FIG. 62.
Figure 66:
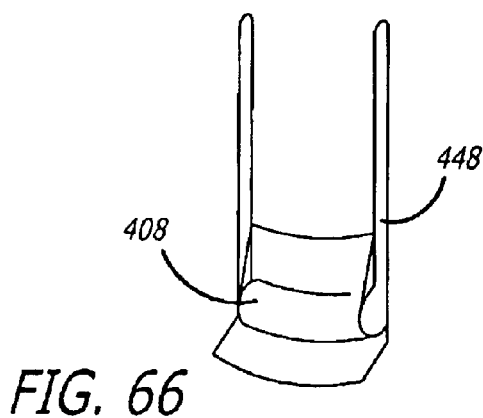
FIG. 66 is a perspective view of a fourth variation of the post assembly of FIG. 62.

FIG. 64 is a perspective view of a post assembly 404 according to one embodiment, the post assembly 404 including a spindle 406, a base portion 460, and a plurality of ridges 408 coupled to the spindle 406 and positioned in grooves 448 on the spindle 406. The plurality of ridges 408 each have an edge extending slightly away from the spindle 406 to receive the article 410 being positioned on the spindle 406. When the edge receives the article 410, the plurality of ridges 408 are compressed toward the spindle 406 within the grooves 448 as the article 410 is pushed down on the post assembly 404. FIG. 66 is an enlarged view of a spindle 406 having a ridge 408 as shown in FIG. 64.

Figure 67:
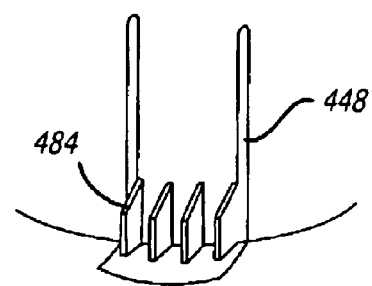
FIG. 67 is an enlarged view of a fifth variation of the post assembly which is a variation of the assembly of FIG. 66.

FIG. 67 is an enlarged view of one embodiment of the present invention, in which a spindle 406 includes a plurality of fins 484 coupled to the spindle 406 and positioned in grooves 448 on the spindle 406. The plurality of fins 484 extend from the spindle 406 to receive the article 410 positioned on the spindle 406. When the plurality of fins 484 receive the article 410, the plurality of fins 484 are compressed within the grooves 448 of the spindle 406 as the article 410 is pushed down on the post assembly 404. FIG. 68 is a perspective view of another embodiment of the applicator 400 of the present invention in which the support surface 412 is an elongate, flexible body having a pair of rigid, molded edges 458. A pair of springs 464 may also be positioned under the support surface 412 for biasing the support surface 412 in a slightly curved position, so that the rigid, molded edges 458 form legs for the support surface 412 when in the slightly curved position. Each of the edges 458 may also include a first side 486, a second side 488, and a pocket 490 passing through the applicator body 400 from the first side 486 to the second side 488. The pocket 490 is capable of having a support bar 492 inserted from one of the first 486 or second side 488 to the other side for supporting the legs of the applicator body 400.

Figure 74:
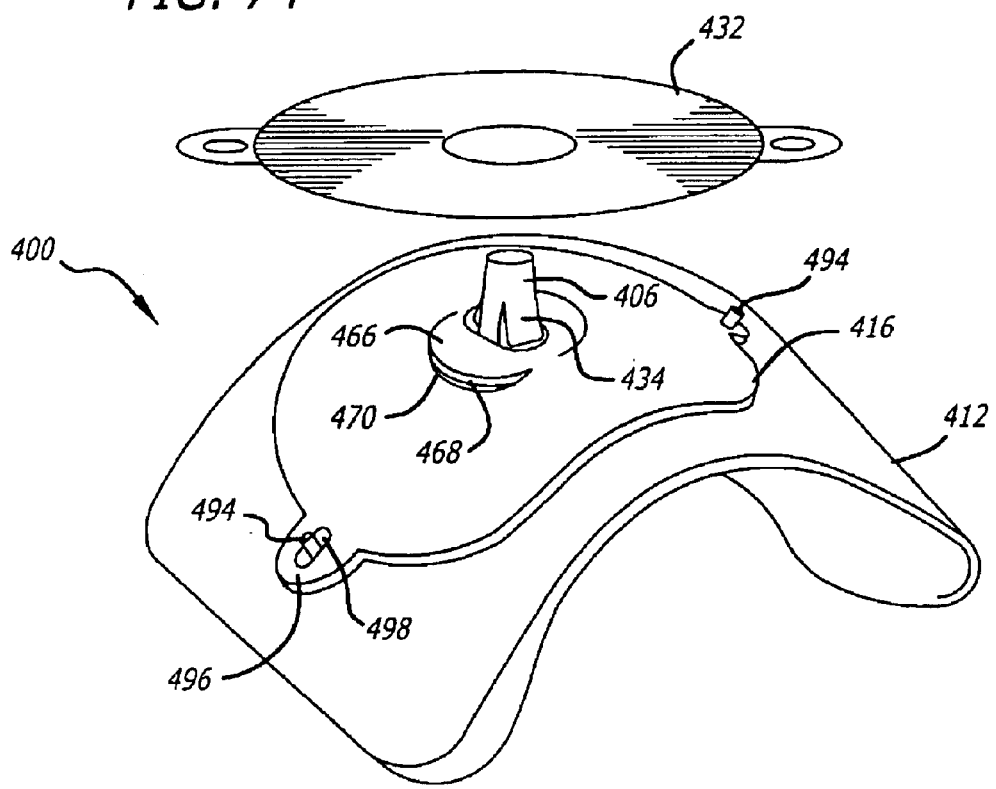
FIG. 74 is a perspective view of another applicator embodiment of the present invention with a label illustrated and having a disappearing locator similar to FIG. 49.
Figure 75:
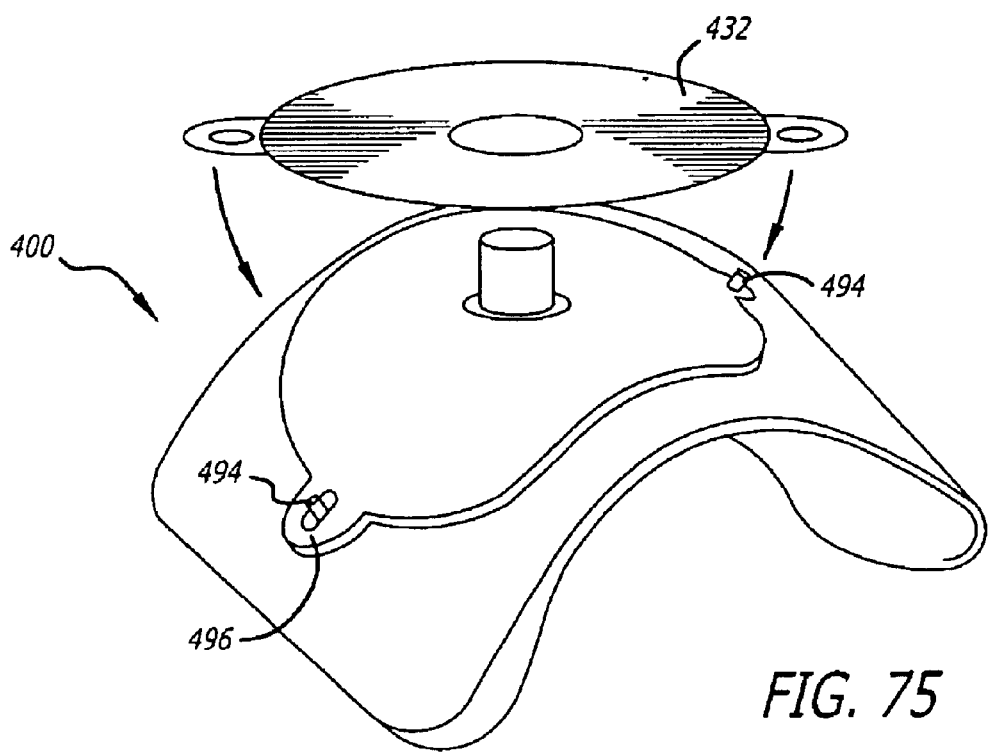
FIG. 75 is alternative embodiment to that shown in FIG. 74.

FIG. 69 is a top view of the embodiment of FIG. 68. FIG. 70 is a side view of the embodiment of FIG. 68, showing the applicator 400 biased in a curved position prior to having an article 410 pushed down on the post assembly 404. FIG. 71 is an additional side view of the embodiment of FIG. 68, showing the applicator 400 in substantially flat position after having an article 410 pushed down on the post assembly 404. FIG. 72 is an additional perspective view of the embodiment of FIG. 68, showing support bars 492 inserted into the pockets 490 on the edges of the applicator 400. FIG. 73 is close-up perspective view of a component of the applicator of FIG. 68, showing a leg of the applicator having a plurality of suction cups attached thereto, FIG. 74 is a perspective view of an applicator 400 showing a label 432 prior to be placed on the post assembly 404. The applicator 400 includes a support surface 412, a central area 416, and a pair of posts 494. The central area 416 includes ends 496 having holes 498 in the ends 496, the holes 498 placed over the posts 494. The label 432 also includes ends having holes in the ends, for placement over the posts 494 for alignment on the central area 416. The ends of the label 432 are also used for handling the label 432 for placement over the central area 416. FIG. 74 also shows the post assembly 404 having a plurality of leaves 434 extending out from the post assembly 404 for guiding the placement of an article 410 on the post assembly 404. FIG. 74 also shows a pair of surface flaps 466 coupled to the support surface 412 and having an opening 468 at substantially parallel positions relative to the support surface 412. The surface flaps 466 each include a foam portion 470 at the opening 468 so that the surface flaps 466 are compressible against the support surface 412 when an article 410 is positioned on the post assembly 404 and pushed down against the support surface 412. FIG. 75 is alternate embodiment to that shown in FIG. 74, without the plurality of leaves 434 on the post assembly 404 and the surface flaps 466 on the support surface 412. The embodiments of FIGS. 74 and 75 may be used with any other embodiments described herein.

Figure 79:
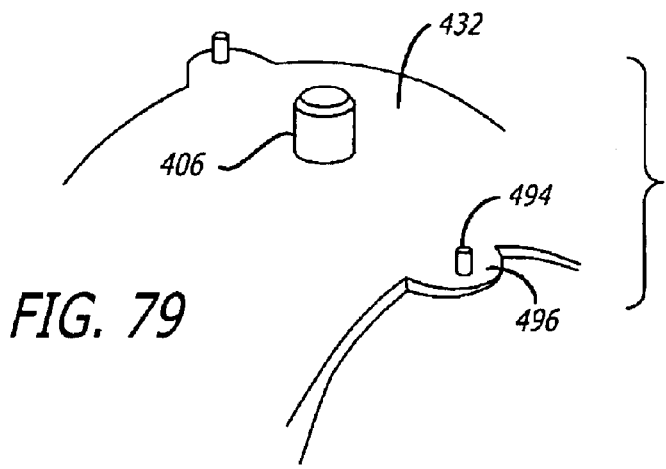
FIG. 79 is a perspective view of a portion of another applicator embodiment according to the present invention.
Figure 77:
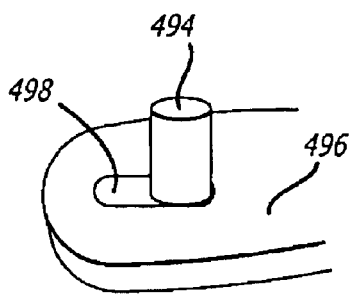
FIG. 77 is a second close-up view.
Figure 76:
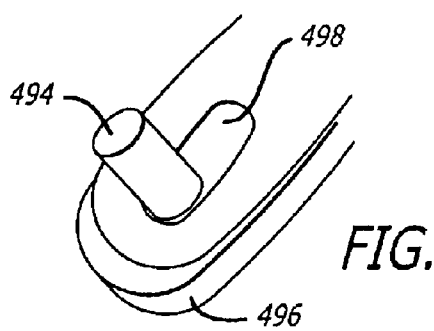
FIG. 76 is a first close-up view of one of the pegs of the applicator of FIG. 74.
Figure 78:
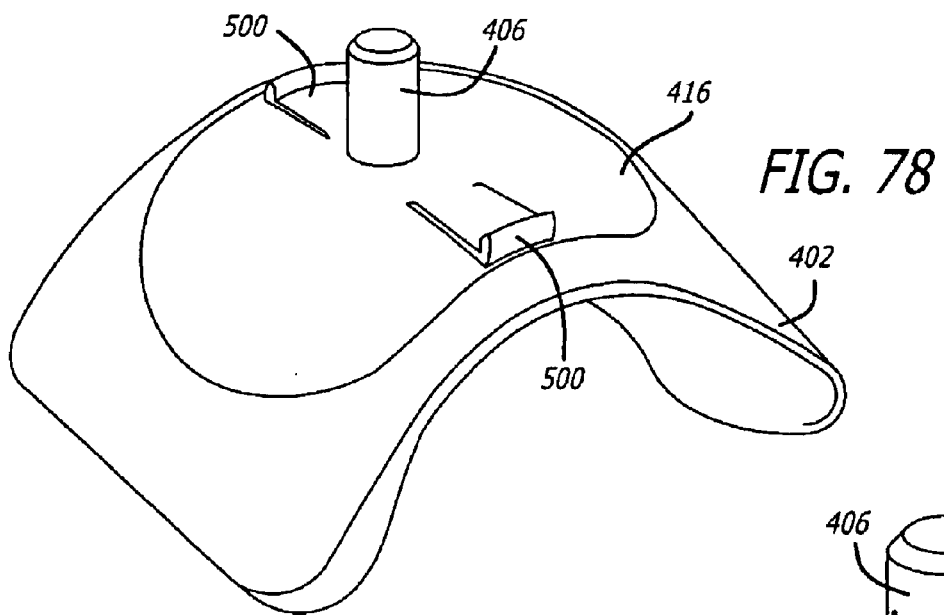
FIG. 78 is a perspective view of another applicator embodiment according to the present invention and an alternative of that of FIG. 79, with peripheral side ribs for centering small or large hole labels.
Figure 80:
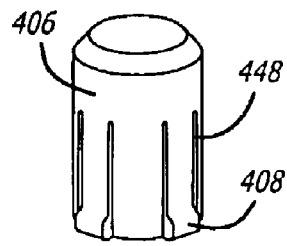
FIG. 80 is a close-up view of a post assembly according to another embodiment of the present invention.

FIGS. 76 and 77 are close-up views of the posts 494 positioned on the support surface 412 as shown in FIG. 74. FIG. 76 and FIG. 77 show that the support surface 412 of an applicator 400 of the present invention can accommodate labels 432 of different sizes. The slots in the central area 416 the label 432 are elongated to align the posts 494 at different positions. FIG. 78 and FIG. 79 show different embodiments of the applicator 400, in which the posts 494 of the support surface 412 are aligned to hold a label 432 in a lateral manner as opposed to the longitudinal manner as shown in FIG. 74. The support surface 412 in this embodiment may include posts 494, as shown in FIG. 78, or by a pair of flex ribs 500 positioned at outer, longitudinal edges of the central area 416 as shown in FIG. 79. The flex ribs 500 allow the label 432 to compress longitudinally when an article 410 is pushed down on the post assembly 404. FIG. 80 shows a post assembly 404 having a spindle 406 with a plurality of ridges 408 positioned in grooves 448 on the spindle 406. The plurality of ridges 408 each have an edge extending slightly away from the spindle 406 to receive the article 410 being positioned on the spindle 406. This embodiment can be used with any of the embodiments described herein.

FIG. 81 is a perspective view of yet another embodiment for holding in place a label 432 positioned on the support surface 412. FIG. 81 shows a pair of flex ribs 500 coupled to the support surface 412 at points along elongated sides. The flex ribs 500 each include an alignment wall 502 having two sides angled relative to each other along a crease line 504. FIG. 82 shows a particular label 506 for use with the embodiment of FIG. 81. The label 506 of FIG. 82 includes a first pair of ends 508 for handling the label 506, and a second pair of pointed ends 510 for positioning the label 506 on the applicator 400 as shown in FIG. 81. The label 506 also includes a central area 512, which may be substantially round, circular, oval, elliptical, square, rectangular, or any other shape commonly used for labels, a pair of tabs 508 having a hole in each tab and extending out from the central area 512 such that they are oppositely oriented relative to each other, and a pair of alignment ends 510 extending out from the central area 512 and oppositely oriented relative to each other along a perpendicular axis relative to the pair of tabs 508.

FIG. 83 is a perspective view of an applicator 400 having a pair of surface flaps 466 coupled to the support surface 412 and having openings 468 at substantially parallel positions relative to the support surface 412, the surface flaps 466 each a plurality of fins 514 and a foam portion 516 between each fin in the plurality of fins 514. The surface flaps 466 are compressible against the support surface 412 when the article 410 is positioned on the spindle 406 and pushed down against the support surface 412. FIG. 84 shows an alternate embodiment of the surface flap 466 aspect of the present invention.

Figure 85:
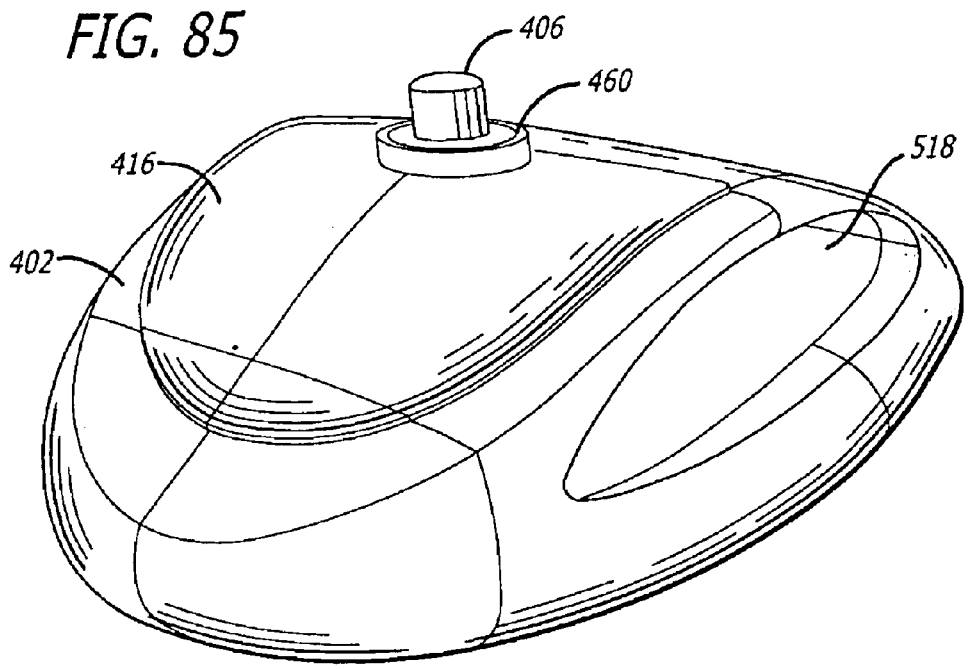
FIG. 85 is a perspective view of another applicator of the present invention.
Figure 86:
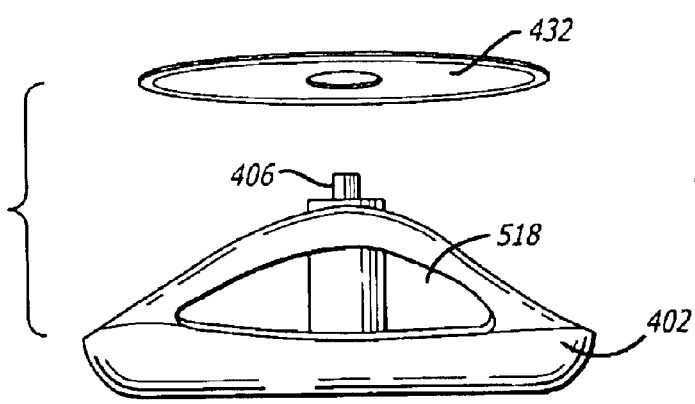
FIG. 86 is a side of the applicator of FIG. 85 showing a disc being applied.
Figure 87:
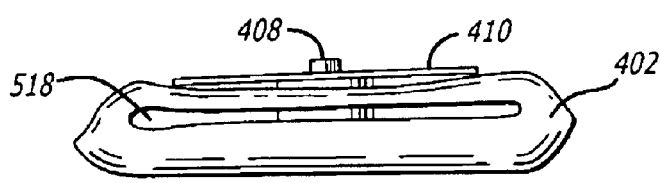
FIG. 87 is a side view of the applicator of FIG. 85 in a disc compressed position.

FIG. 85 is a perspective view of another embodiment of the applicator 400 of the present invention. The applicator 400 in FIG. 85 includes a foam body 402 having a gap 518, such that the foam body 402 compresses when the article 410 is pushed down against the support surface 412. FIG. 86 is a side view of the applicator of FIG. 85, showing the foam body 402, the gap 518, and a post assembly 404 having a portion visible through the gap 518. The applicator of FIG. 86 is in an uncompressed state, showing an article 410 prior to being placed on the post assembly 404. The applicator of FIG. 87 is in a substantially compressed state, showing the article 410 placed on the post assembly 404 and pushed down onto the support surface 412.

Figure 88:
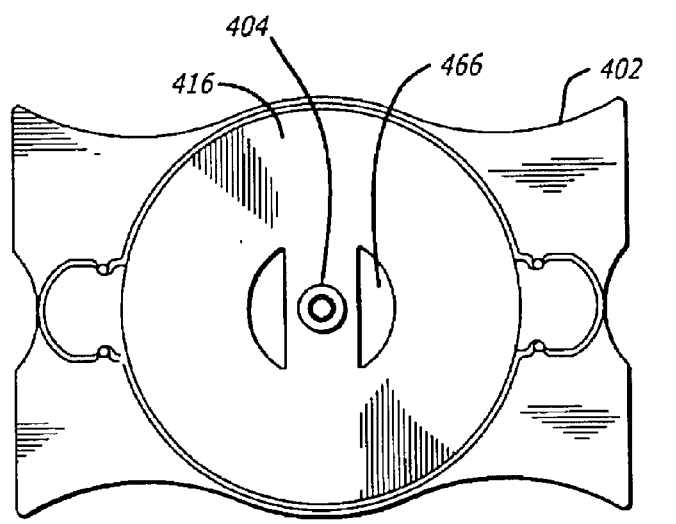
FIG. 88 is a top view of an applicator according to the present invention; the body or plate of the applicator can be made of an engineered plastic eliminating the need for bottom leaf springs to maintain a curved biased configuration thereof.
Figure 89:
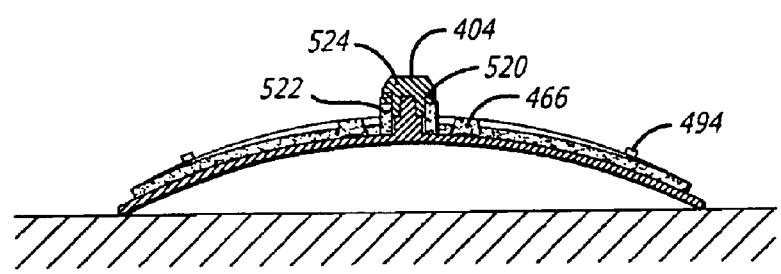
FIG. 89 is a cross-sectional side view of an applicator with a small hole label applied.

FIG. 88 is a top view of an applicator 400 according to one embodiment of the present invention, showing an applicator body 402, a support surface 412, a central area 416, a post assembly 404, and a pair of compressible surface flaps 466 positioned in the central area 416. FIG. 88 shows the applicator 400 without a label 432 placed on the support surface 412. FIG. 89 is a cross-sectional side view of an applicator 400 according to another embodiment of the present invention. The applicator of FIG. 89 includes a post assembly 404 having a ring 520 coupled to a foam sleeve 522 and a cap 524 capable of being screwed into and out of the foam sleeve 522. The ring 520 supports the article 410 placed on the post assembly 404 and is capable of moving up and down with the foam sleeve 522 as the post assembly 404 is moved up and down. FIG. 89 includes a label 432 having a narrow central opening placed on the support surface 412, covering but not compressing the support flaps 466. Both FIG. 88 and FIG. 89 show the applicator prior to having an article 410 being placed on the support surface 412.

Figure 90:
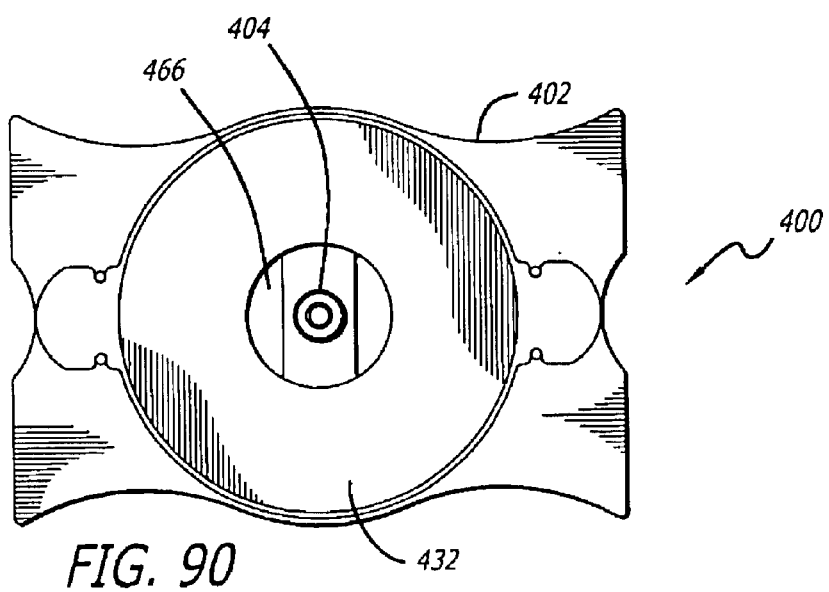
FIG. 90 is a top view of the applicator of FIG. 88 with a large hole label applied.
Figure 91:
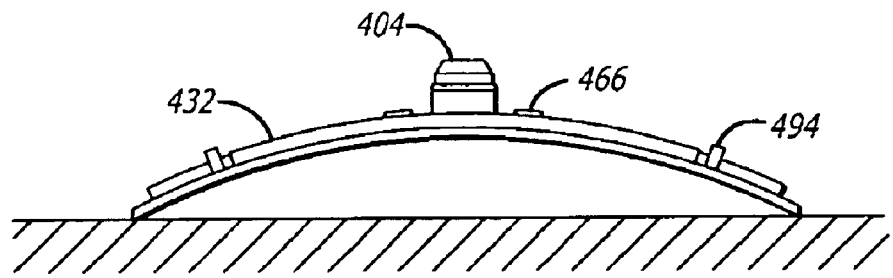
FIG. 91 is a side view of the applicator of FIG. 90.

FIG. 90 is a top view of an applicator 400 according to another embodiment of the present invention, showing an applicator body 402, a support surface 412, a central area 416, a post assembly 404, a pair of compressible surface flaps 466 positioned in the central area 416, and a label 432 placed on the support surface 412 and having a wide central opening such that both surface flaps 466 are showing. FIG. 91 is a side view of the applicator of FIG. 90, showing the label having the wide central opening placed thereon.

Figure 92:
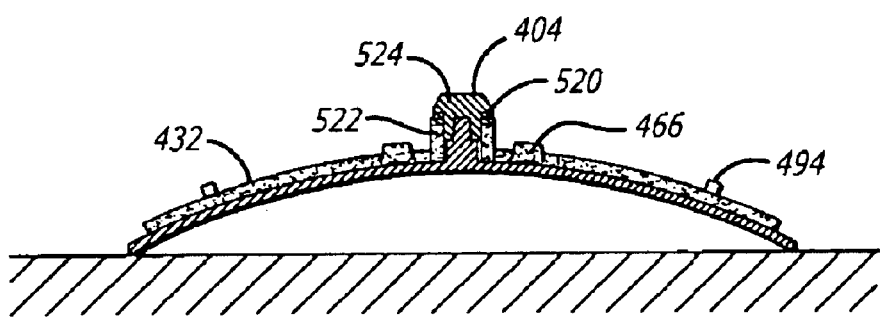
FIG. 92 is a side cross-sectional side view of the applicator of FIG. 90.

FIG. 92 is a cross-sectional side view of an applicator 400 according to the present invention, showing the surface flaps 466 in their raised position relative to the support surface 412, and with a label 432 having a wide central opening placed on the support surface 412. FIG. 92 shows the applicator 400 prior to an article 410 being pushed down to substantially compress the surface flaps 466 against the support surface 412. The applicator of FIG. 92 includes a post assembly 404 having a ring 520 coupled to a foam sleeve 522 and a cap 524 capable of being screwed into and out of the foam sleeve 522. The ring 520 supports the article 410 placed on the post assembly 404 and is capable of moving up and down with the foam sleeve 522 as the post assembly 404 is moved up and down.

Figure 93:
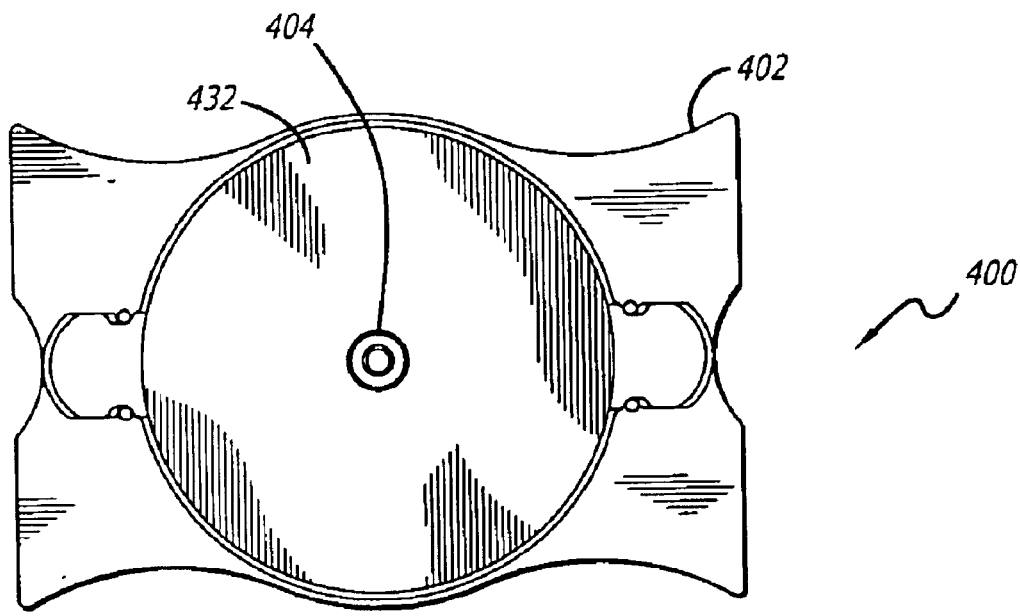
FIG. 93 is a top view of the applicator of FIG. 88 with a small hole label thereon.
Figure 94:
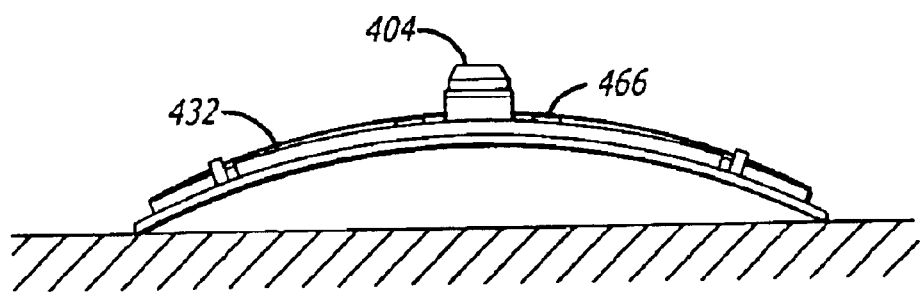
FIG. 94 is a side view of the applicator of FIG. 93.

FIG. 93 is an overhead, compressed view of an applicator 400 according to another embodiment of the present invention, showing an applicator body 402, a support surface 412, a central area 416, a post assembly 404, a pair of compressible surface flaps 466 positioned in the central area 416, and a label 432 placed on the support surface 412 and having a narrow central opening such that both surface flaps 466 are not showing when the label 432 is placed on the support surface 412. FIG. 94 is a side view of the applicator of FIG. 93, showing a label 432 having a narrow central opening and placed on the support surface 412. The label 432 placed on the applicator of FIG. 94 covers the surface flaps 466 located on the support surface 412. FIG. 94 shows the applicator 400 prior to having an article 410 placed thereon and pushed to compress the applicator.

Figure 95:
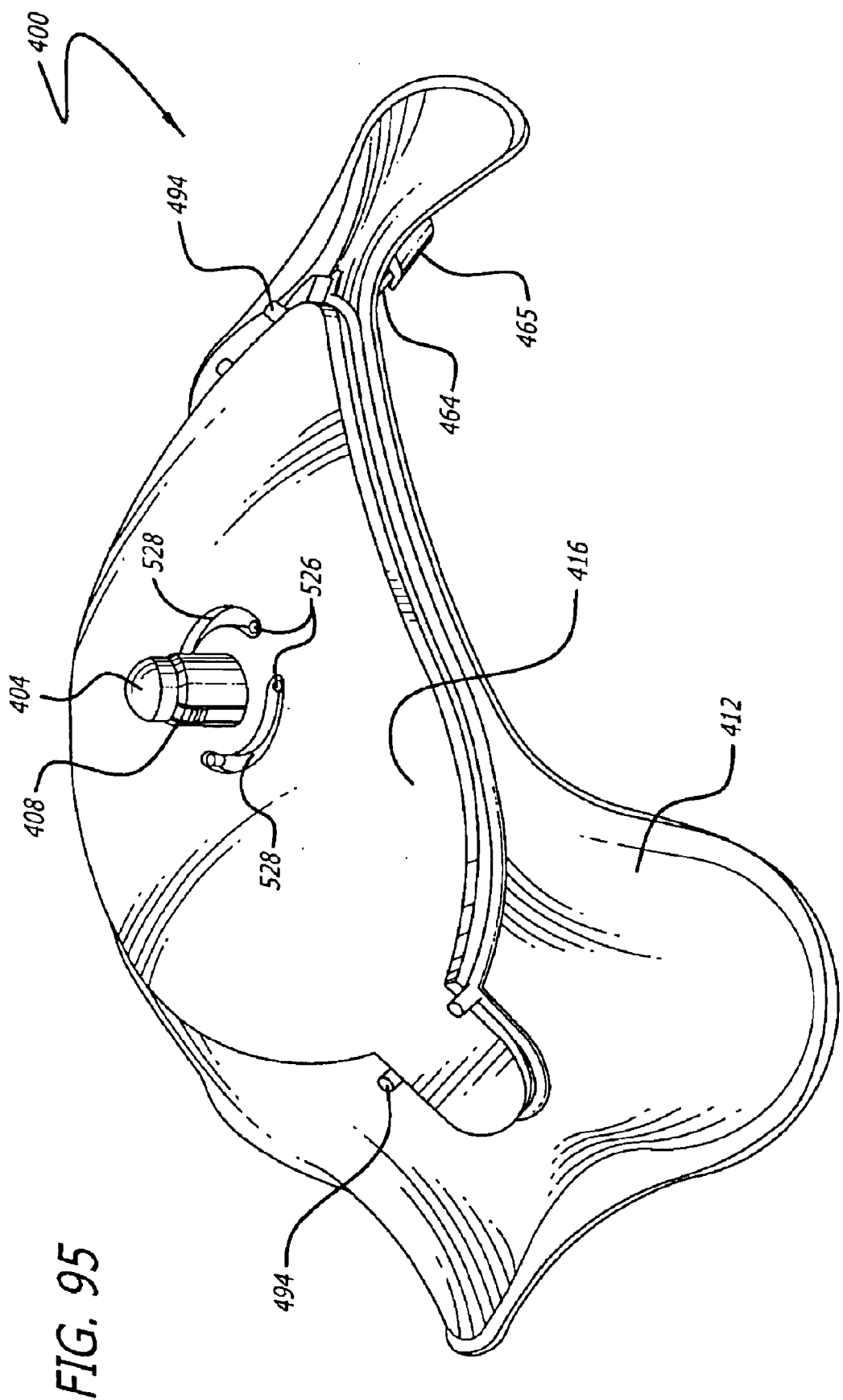
FIG. 95 is a perspective view of another applicator of the present invention.

FIG. 95 is a perspective view of another embodiment of an applicator 400 of the present invention, the applicator having an applicator body 402, a support surface 412, a post assembly 404, a foam pad located in a central area 416 of the support surface 412, and a pair of centering pegs 526, part of the post assembly 404, that are positioned in recesses 528 in the support surface 412 for centering a label 432 placed on the support surface 412. The two recesses 528 may be parenthetically shaped and oppositely oriented relative to each other. The spindle 406 also may include ridges 408 that extend slightly from the spindle 406 to receive an article 410 placed on the spindle 406. The ridges 408 are positioned in grooves on the spindle 406, and recess into the grooves when the article 410 is pushed down on the spindle 406. The applicator 400 of FIG. 95 is capable of accepting labels 432 having a narrow central area 416, and labels 432 having a wide central area 416. FIG. 96 is an overhead, compressed view of the applicator of FIG. 95, showing the recesses 528 and centering pegs 526 in the support surface 412.

Figure 100:
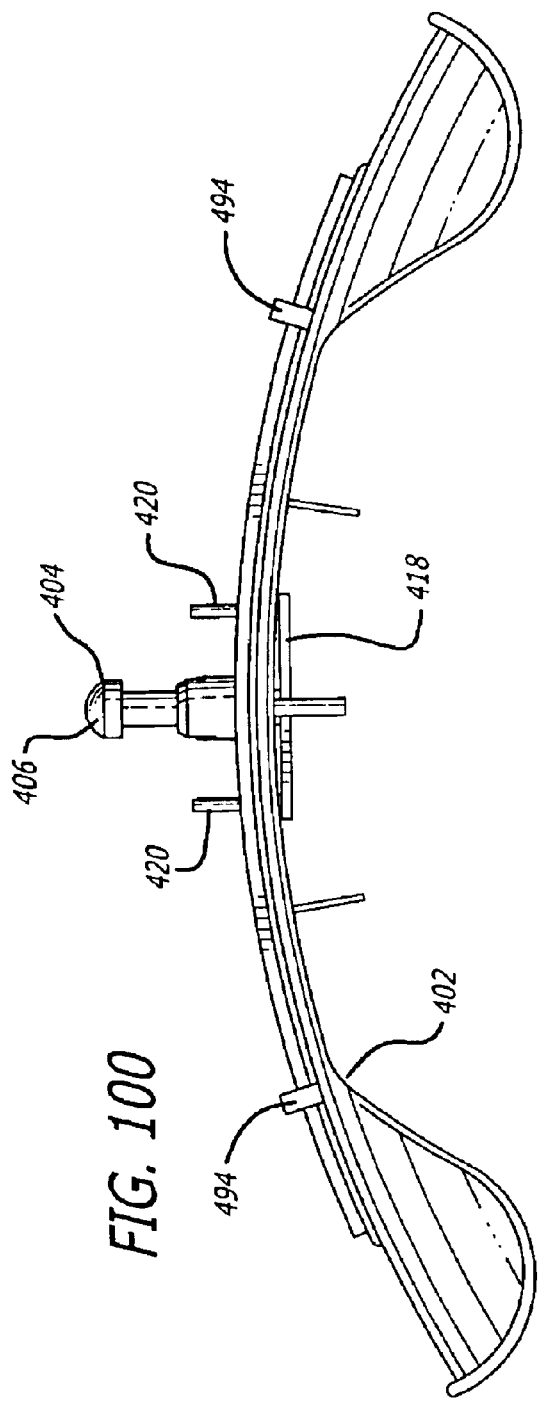
FIG. 100 is a side elevational view of an applicator of FIG. 95 with the post assembly thereof in a raised position.

FIG. 97 is a side view of the applicator of FIGS. 95 and 96. The post assembly 404 includes a base portion 418 positioned underneath the support surface 412. The centering pegs 526 are coupled to the base portion 418 and extend through the applicator body 402 in the recesses 528 when the post assembly 404 is in an extended upward position. The post assembly 404, which includes a spindle 406 also coupled to the base portion 418, can be pushed or pulled by pushing or pulling the spindle 406. This causes the base portion 418 to move up and down, which causes the centering pegs 526 to either extend up from the recesses 528, or rest inside the recesses 528 without extending above the support surface 412. The applicator 400 of FIG. 97 is biased to a curved position by at least one spring 464, not shown in FIG. 97, positioned underneath the support surface 412. FIG. 100 is an additional side view of the applicator 400, showing the post assembly 404 in a raised position by pulling the spindle 406 upward.

Figure 101:
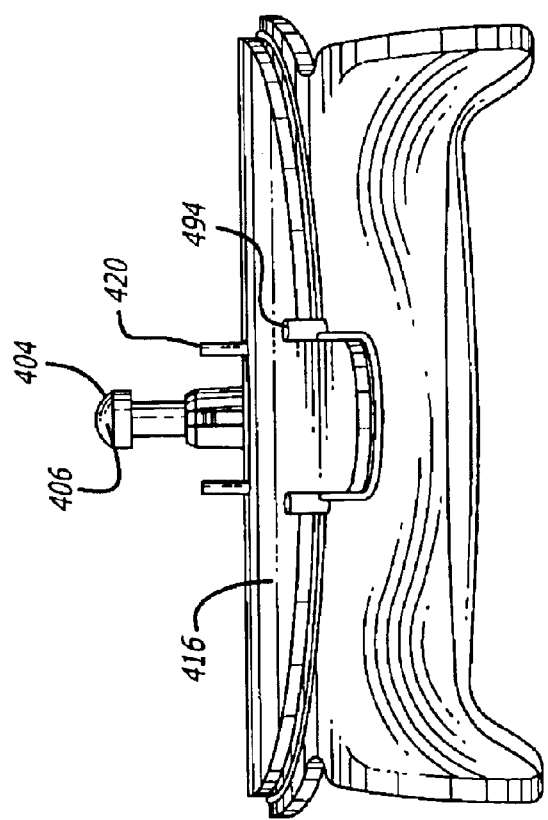
FIG. 101 is an end elevational view of the applicator of FIG. 100.

FIG. 98 shows a bottom, compressed view of the applicator 400 of FIGS. 95–97. FIG. 98 shows a pair of springs 464 that bias the applicator 400 in a curved position when in an uncompressed state. The pair of springs 464 may be held in place by sliding the ends of the pair of springs 464 through slots, or slightly curved extensions 465 of applicator body 402. FIG. 99 is an alternate side view of the applicator of FIG. 95, showing the tab end of the foam pad on the support surface 412 of the applicator. FIG. 101 is a similar side view as that of FIG. 98, showing the post assembly 404 in a raised position by pulling the spindle 406 upward.

FIG. 102 is an end view of the applicator body 402 with the support surface 412 facing down, showing the body without biasing by springs 464. A post assembly 404 is also shown in FIG. 102. FIG. 103 is a perspective view of the applicator body 402, shown with the support surface 412 facing up, again in an unbiased state. FIG. 104 is a cross-sectional view of the applicator body 402, showing the post assembly 404 in a raised position.

FIG. 105 is a top view of the applicator body 402 of FIG. 103. FIG. 106 is a side view of the applicator body 402 of FIG. 103. FIG. 107 is a bottom view of the applicator body 402, showing a pair of springs 464 used to bias the applicator body 403 in a curved position. FIG. 108 is a cross-sectional side view similar to that of FIG. 106.

Figure 110:
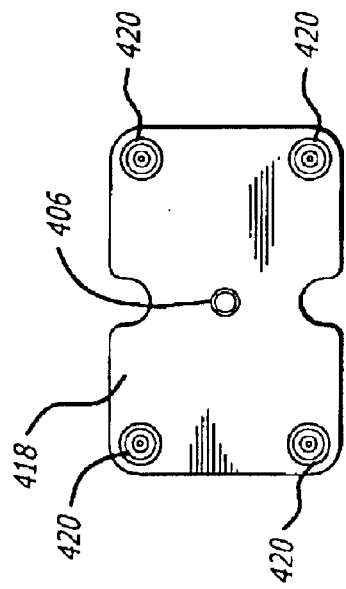
FIG. 110 is a bottom view of the post assembly.
Figure 113:
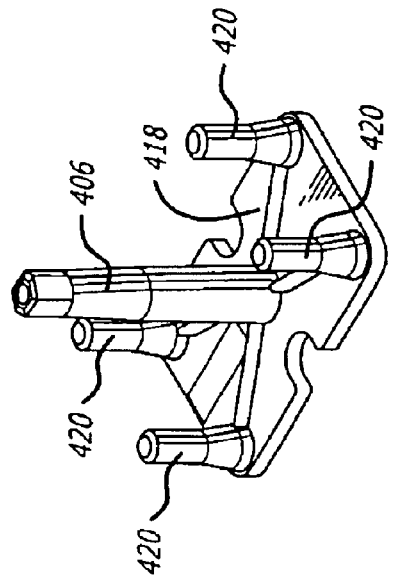
FIG. 113 is a top perspective view of the post assembly.
Figure 111:
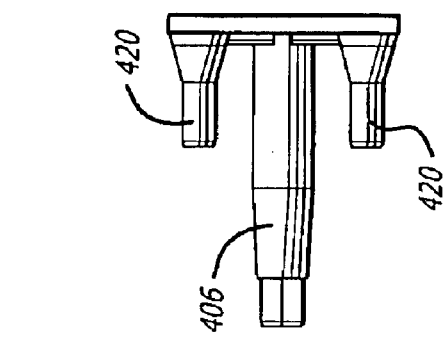
FIG. 111 is an end view of the post assembly.
Figure 109:
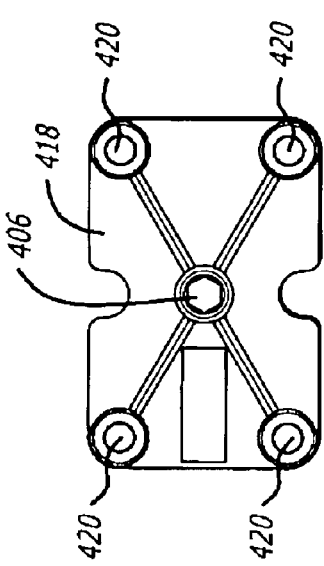
FIG. 109 is a top view of a post assembly of the application of claim 95 shown in isolation.
Figure 112:
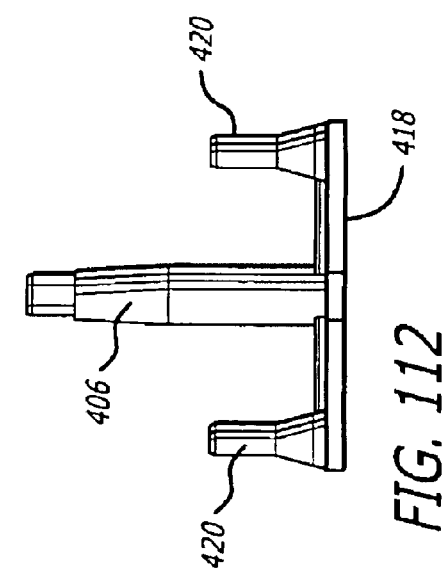
FIG. 112 is a side view of the post assembly.

FIG. 109 is a top view of a post assembly 404 component of the applicator 400 of the present invention. FIG. 109 shows the spindle 406 and a plurality of pegs 420 coupled to the base portion 418. FIG. 110 is a bottom view of the post assembly 404. FIG. 111 is a side view of the post assembly 404, showing the base portion 418, the spindle 406, and the plurality of pegs 420. FIG. 112 is an additional side view. FIG. 113 is a perspective view of the post assembly 404.

FIG. 114 is an additional side view of the applicator 400 of the present invention. FIG. 115 is yet another side view, showing a pair of springs 464 positioned beneath support surface 412. FIG. 116 is a bottom view of the applicator 400, showing the pair of springs 464 placed beneath the support surface 412. FIG. 117 and FIG. 118 are close-up views of the coupling of the pair of springs 464 to the applicator body 402. FIG. 119 is an overhead view of one of the pair of springs 464 used to bias the applicator body 402 in a curved position. FIG. 120 is a side view of the spring of FIG. 119. FIG. 121 is a perspective view of the spring of FIG. 119.

Figure 122:
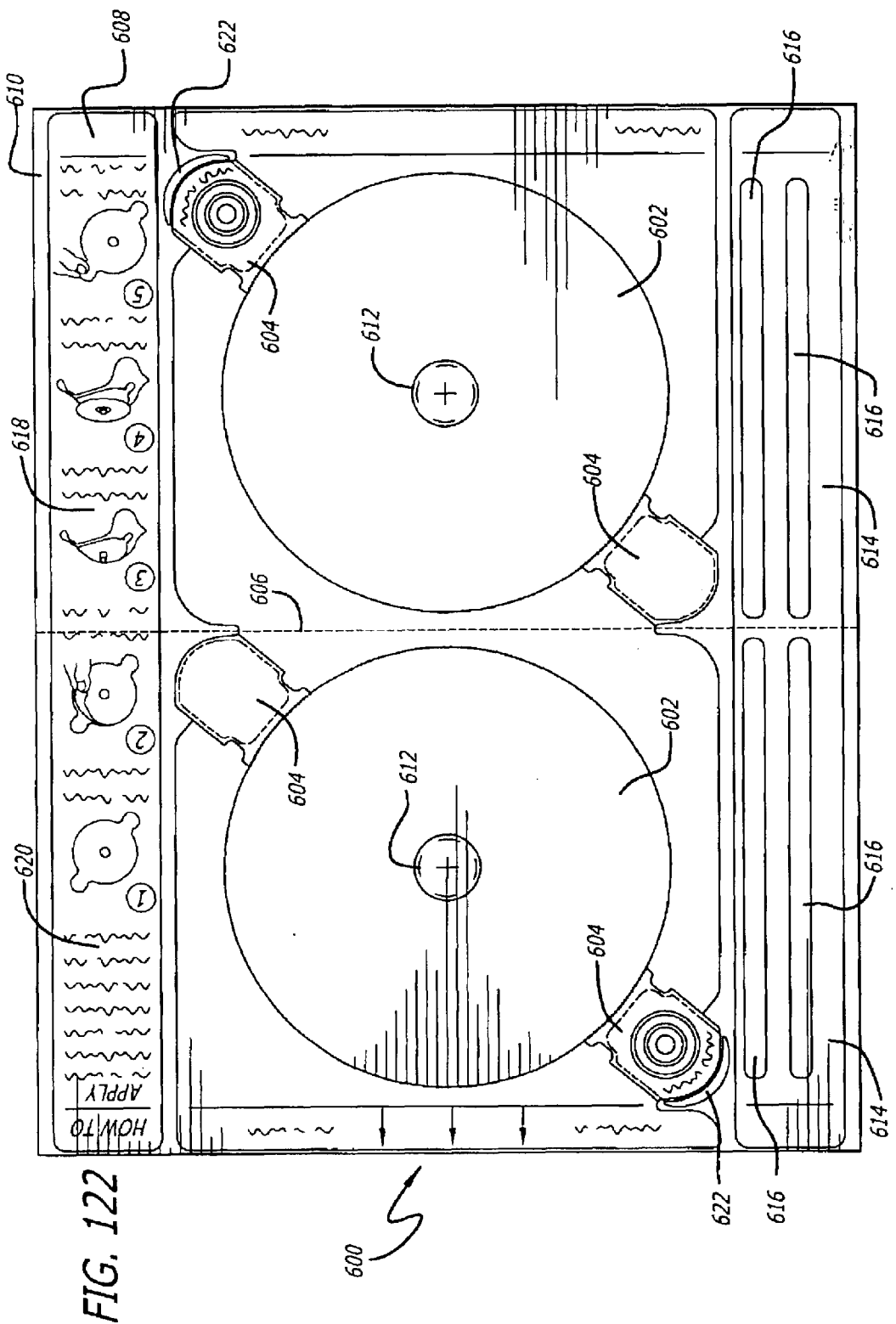
Figure 123:
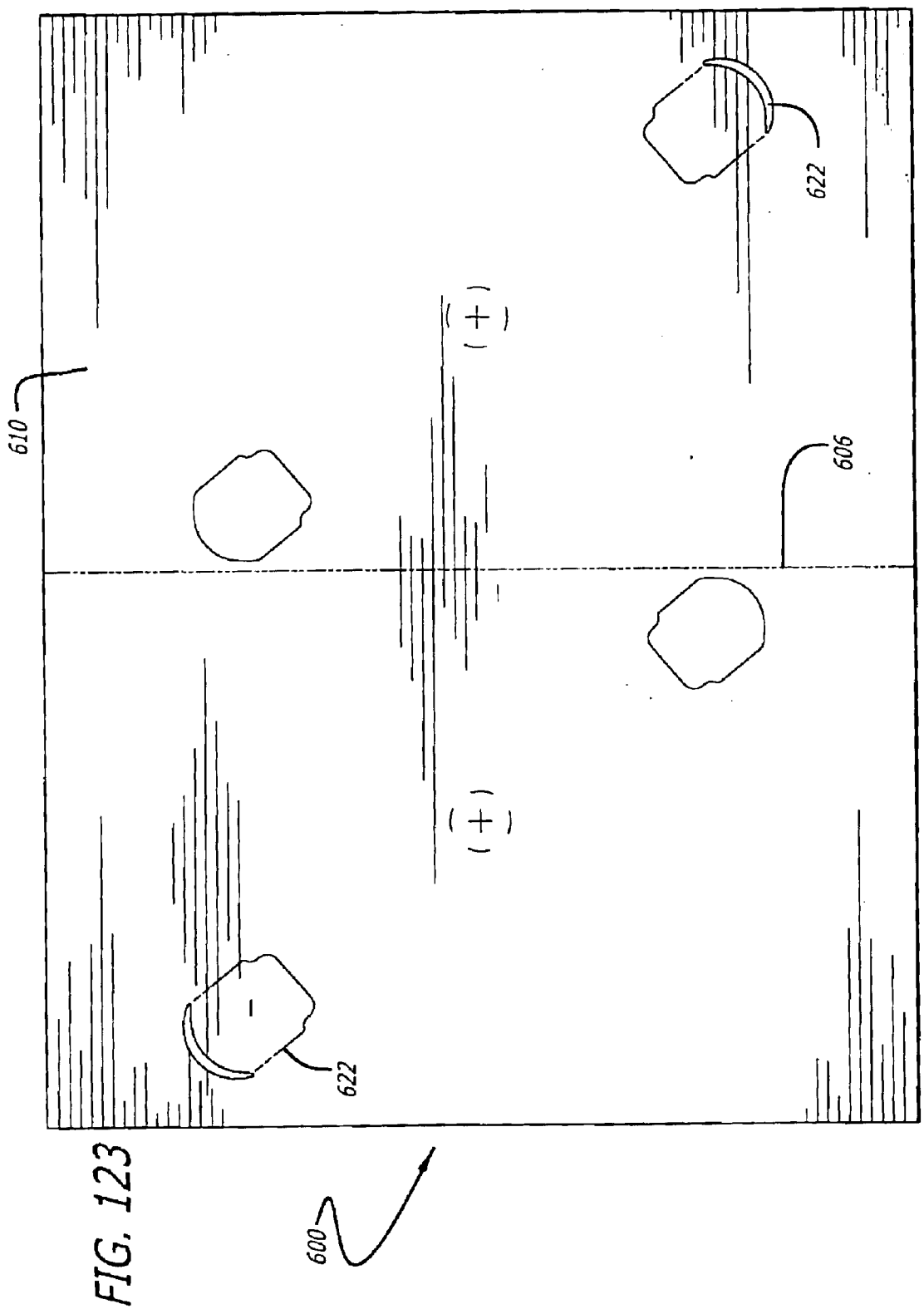

Referring in particular to FIGS. 122 and 123, another embodiment of the present invention is illustrated generally at 600. Referring thereto it similarly includes two labels 602 each with diametrically opposed tabs 604; a weakened line 606, such as a perforated line, extends through both the facestock 608 and the liner 610 separating the sheet into two generally equal portions with a label on each portion. A small circular portion 612 is cut at the center of the label. Each portion similarly includes a strip 614, including a pair of case spine labels 616.

The tabs can have "ties" away from the label to insure that the tabs remain flat while passing through desktop printers. In other words, the backing (liner sheet) can be perfed along some portions of the cut, while being cut through in other portions. As described and illustrated in detail elsewhere in this disclosure, the tabs are used for handling (guiding and placement) of the label during application thereof. The tab side notches are used to accurately secure the label to the applicator device.

On the right side of the sheet extending the length is a facestock strip 618 having thereon printed label application instructions 620. Crescent shaped openings 622 are provided. Other indicia can be printed on the facestock of the label as well as on the back of the liner. For example, the printed indicia on the back of the liner can be the logo of the manufacturer or distributor. The printed arrows 624 at the top end of the sheet indicate the feed direction for the sheet into the printer or copier. Alternatively, no printing or other indicia can be provided on the sheet construction. The liner extends a short distance out from the perimeter of the facestock, as discussed in greater detail elsewhere in this disclosure.

A paper facestock sheet embodiment includes holes rounded and spaced from a strip. If the matrix is too wide for the MYLAR and foil stock embodiments printer error can result. Narrowing the matrix allows the full width of the sheet to be sensed and printed. The paper facestock of the label sheet construction can be thirty to seventy pounds per ream and between two and six mils thick. The polyester film or MYLAR can either just be clear or it can be metallized smooth to form a high gloss smooth metallized film. Alternatively, it can be embossed with a holographic film. This film can be between 1.5 and three mils with a preferred thickness being two mils, not including the inkjet printable top coating. The metallic labels can use a paper/foil laminate, which also can be two to six mils thick.

The paper label can be used for most types of label printing. It can have a matte finish or a smooth, photo glossy finish. Although the matte labels may or may not have an inkjet receptive coating, the glossy labels generally must have an inkjet receptive top coating according to a preferred embodiment. The foil/paper laminate labels (metallic) are used when a higher end or unique look to the CDs is desired as can be provided by the metallic facestock. Further, a metallic label using plain clear polyester film with metallic undercoat can be used.

The holographic laminate labels (clear polyester embossed on the backside with a holographic pattern and metallized) are for users who want a higher end or unique look to their CDs that is provided by the holographic facestock.

The clear polyester labels are provided for users who want a higher end or unique look to their CDs that is afforded by the clear facestock, which will nearly disappear and will give an effect similar to printing directly on the CD. This is how most professional and mass produced CDs are given their graphic presentation.

The label sheet constructions, for example, are preferably produced on a "converting press," pursuant to the following steps.

a. A facestock/adhesive/silicon coated liner laminate is placed in roll form on the unwind of the converting press.

b. The laminate material or web is fed through a series of rollers in the converting press whereby the material passes by a web guide that aligns the material in the press. It then passes through a printing station that may or may not print text and/or graphics on one side of the web material. The web then may or may not pass through a device such as a "turnbar," that turns the web over. The web then passes through a second print station that may or may not print on the other side of the web.

c. The web may or may not be inverted by a series of idler rollers. The web next passes though the die station in order to make die cuts in the liner. The die station includes a steel roller (an "anvil roll"), which is smooth, highly concentric, and very flat in the cross machine direction, and a rotary die, which is a steel cylinder with a flat cylindrical surface on either side ("bearers") and a pattern of sharp blades across the middle and around the circumference of the die (corresponding to where the liner of the label sheet has cuts). The die is positioned either directly above or directly below the anvil roll, and the die comes in contact with the anvil roll at the bearers on either side of the die. The blades are made such that they are a distance away from the anvil roll that corresponds to a percentage of the facestock thickness (typically about 70%). As a result, when the web passes between the anvil roll and the die (the bearers are on either side of the web and do not touch the web), the blades cut through the liner and the adhesive and press against the face stock (which is slightly compressible), but do not cut through the facestock.

d. The web may or may not be inverted by another series of idler rollers. The web then passes through an additional die station to make the die cuts in the face material.

e. The web then may pass though a matrix removal area, wherein a portion of the face material is removed from the web by pulling a portion of the face material away from the web and around one or more rollers or fixed bars, after which it is either wound up into a roll or transported by vacuum into a waste container. Alternatively, the matrix can be removed immediately at the face material die station. The die cut sections of liner that are directly and wholly underneath the facestock material that is removed will be adhesively bonded to the face material and will also be removed with the face material, leaving a hole through the liner in that location.

f. The web then goes into a cutoff or "sheeter" station that has a die and anvil. The die contains a single continuous cross machine blade (usually the blade is removable and can be easily replaced) which contacts the anvil roll on each revolution, and thereby cuts the web into individual sheets.

g. The sheets then are transported by belts and pulleys away from the sheeter station and are stacked either by allowing them to fall one upon another in a continuous stream or by feeding them into wheels ("starwheels") that have spiral shaped cuts that receive and decelerate the sheets, which turn as the sheets are received. In the latter design, there are fixed posts between the starwheels, whereby the sheets hit the posts and are stripped out of the starwheels and drop into a vertical stack. This vertical stack is then ejected on a periodic basis and fed onto secondary conveyor belts, where they are either removed for hand packing or fed into a secondary packaging machine, which places the product into packets or boxes.

Other manufacturing processes as would be apparent to those skilled in the art from this disclosure are also within the scope of the present invention and included herein. For example, the ordering of the steps or stations can be changed, such as the facestock cutting station being before the liner cutting station. Or stations, such as the printing station, eliminated. The process can be varied as would be apparent to those skilled in the art from other manufacturing disclosures in this document.

The user designs on his personal computer the indicia to be printed on the label portions of the labels, as previously described. The label sheet constructions are then fed into a printer or copier, and the desired indicia 624 printed on the labels. Alternatively, the label sheet constructions can be separated along their weakened center line to divide the sheets into two portions.

Figure 14:
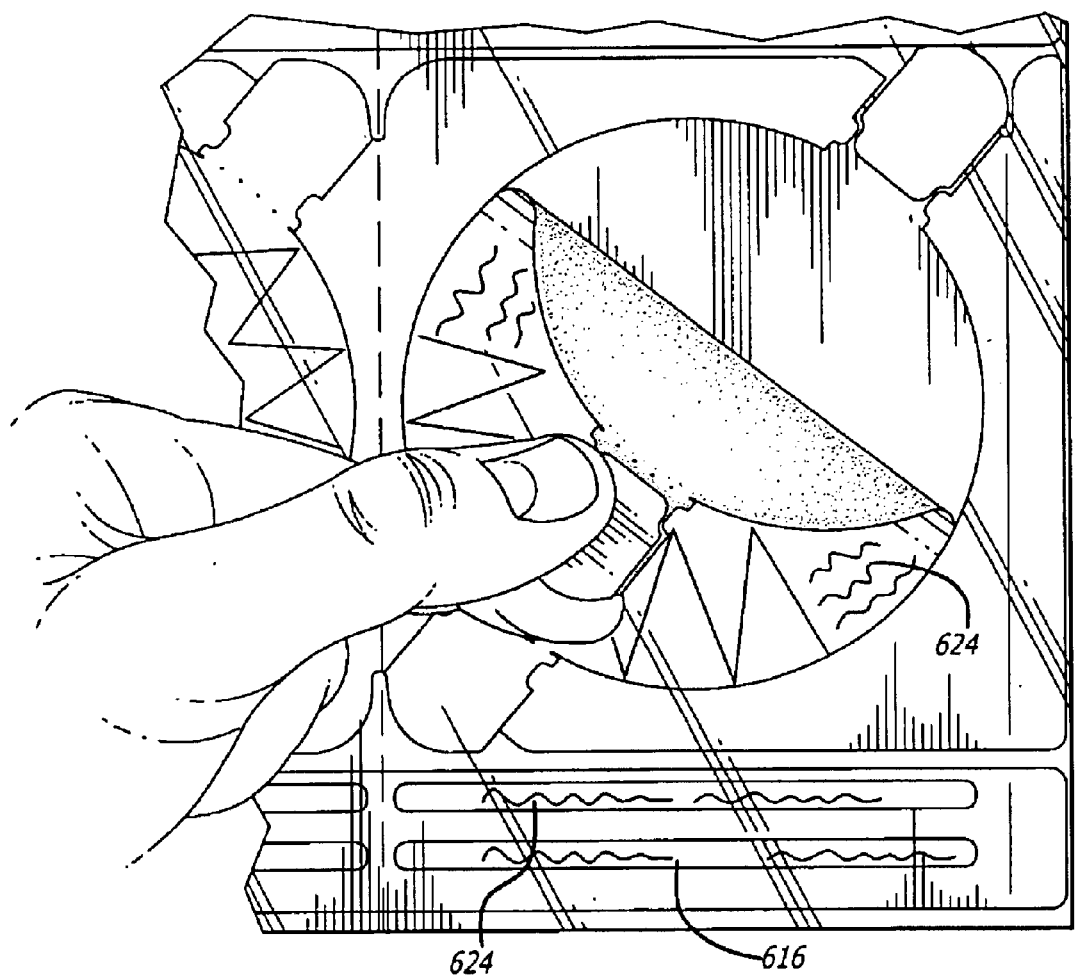
FIG. 14 is a top view of a portion of a label sheet construction (such as that of FIG. 122) showing a printed label being removed therefrom.

After the printing, the user grasps the end of the tab using the crescent shaped hole and the patch and peels the label and two tabs off of the sheet, as shown in FIG. 14. Holding the two tabs and patches in his right and left hands, the label is moved into position on the CD label applicator device (as previously described) or directly on the CD. With the printed label subsequently adhesively adhered to the non-data side of the CD, the tabs are torn off along the perforated edges.

The spine labels on the label sheet construction can also be printed by the user by his printer with custom indicia 624. The printed spine label is then peeled off of the underlying liner. The user applies the removed label with indicia 624 to the spine of a jewel case.

Thus, from the foregoing detailed description, it will be evident that there are a number of changes, adaptations and modifications of the present invention which come within the province of those skilled in the art. The scope of the invention includes any combination of the elements from the different species, variations or embodiments disclosed herein. For example, the applicator can instead of the above-described post assembly use a plunger arrangement. However, it is intended that all such variations not departing from the spirit of the invention be considered as within the scope thereof.

We claim:

1. A label applicator, comprising:

a support surface;

the support surface having a central area; and a post assembly extending up from the central area such that a label having a label through-hole can be positioned in a support position generally on the support surface with the post assembly extending up through the label through-hole and an adhesive face of the label facing up and such that an article having an article through-hole can be positioned over the post assembly so that a flat surface of the article can be pressed and guided against the adhesive face of the positioned label;

wherein the support area curves downwardly in opposite directions from the post assembly when the support area is in a rest position and is pushed downwardly to a flatter orientation during a label application procedure;

a spring which biases the support area from the flatter orientation to the rest position; and wherein the spring includes at least one leaf spring operatively connected to the support area.

2. The applicator of claim 1 wherein the at least one leaf spring includes a pair of leaf springs.

3. A label applicator, comprising:

a support surface;

the support surface having a central area;

a post assembly extending up from the central area such that a label having a label through-hole can be positioned in a support position generally on the support surface with the post assembly extending up through the label through-hole and an adhesive face of the label facing up and such that an article having an article through-hole can be positioned over the post assembly so that a flat surface of the article can be pressed and guided against the adhesive face of the positioned label;

wherein the support area curves downwardly in opposite directions from the post assembly when the support area is in a rest position and is pushed downwardly to a flatter orientation during a label application procedure; and at least one leaf spring which biases the support area from the flatter orientation to the rest position.

4. The applicator of claim 3 wherein the at least one leaf spring is operatively connected to the support area.

5. The applicator of claim 4 wherein the at least one leaf spring includes a pair of leaf springs.

6. The applicator of claim 3 further comprising a flexible curved body member having an upper surface defining the support area and a curved lower surface, and the at least one leaf spring being attached to the curved lower surface.

7. The applicator of claim 6 further comprising at least one clip for holding the at least one leaf spring to the curved lower surface.

8. The applicator of claim 3 wherein the at least one leaf spring includes a single leaf spring having an opening positioned beneath the post assembly.

9. A label applicator, comprising:

a support surface;

the support surface having a central area;

a post assembly extending up from the central area such that a label having a label through-hole can be positioned in a support position generally on the support surface with the post assembly extending up through the label through-hole and an adhesive face of the label facing up and such that an article having an article through-hole can be positioned over the post assembly so that a flat surface of the article can be pressed and guided against the adhesive face of the positioned label; and a body member on which the support surface is disposed, the support surface being downwardly curving relative to the post assembly, the body member having a lower surface, a stop member extending down from the lower surface and having a lower end, the lower end being spaced above a body member support surface with the body member in a rest position and engaging the body member support surface when the body member is in a pressed down position during a label application procedure.

10. The applicator of claim 9 further comprising a spring connected to the body member and biasing the body member up from the pressed down position to the rest position.

11. The applicator of claim 10 wherein the spring comprises a leaf spring which is connected at ends thereof to the body member lower surface.

12. The applicator of claim 10 further comprising a pair of clips which connect the spring to the body member.

13. The applicator of claim 12 further comprising the body member including a locator pin which is positioned in a hole in the leaf spring.

14. The applicator of claim 11 further comprising the body member including a lower surface rib which guides the leaf spring.

15. A label applicator, comprising:

a support surface;

the support surface having a central area;

a post assembly extending up from the central area such that a label having a label through-hole can be positioned in a support position generally on the support surface with the post assembly extending up through the label through-hole and an adhesive face of the label facing up and such that an article having an article through-hole can be positioned over the post assembly so that a flat surface of the article can be pressed and guided against the adhesive face of the positioned label;

a body member on which the support surface is disposed, the body member being compressible between a rest position wherein the support surface is convex and a pressed-down label application position wherein the support surface is substantially flat; and at least one stop member extending down from a lower surface of the body member and constructed to engage an applicator support surface to define the pressed-down label application position.

16. The applicator of claim 15 wherein the at least one stop member includes a stop post and a stop fin.

17. A label applicator, comprising:

a support surface;

the support surface having a central area;

a post assembly extending up from the central area such that a label having a label through-hole can be positioned in a support position generally on the support surface with the post assembly extending up through the label through-hole and an adhesive face of the label facing up and such that an article having an article through-hole can be positioned over the post assembly so that a flat surface of the article can be pressed and guided against the adhesive face of the positioned label;

a body member on which the support surface is disposed, the body member being compressible between a rest position wherein the support surface is convex and a pressed-down label application position wherein the support surface is substantially flat; and a large-hole label locator assembly positionable by a user between an operative position generally above the support surface and radially outward from the post assembly and an inoperative position.

18. The applicator of claim 17 wherein the inoperative position is generally below the support surface.

19. The applicator of claim 17 wherein the locator assembly includes a post extending through the post assembly and movable by a user to move the locator assembly between the operative and inoperative positions.

20. A label applicator, comprising:
a support surface;
the support surface having a central area;
a post assembly extending up from the central area such that a label having a label through-hole can be positioned in a support position generally on the support surface with the post assembly extending up through the label through-hole and an adhesive face of the label facing up and such that an article having an article through-hole can be positioned over the post assembly so that a flat surface of the article can be pressed and guided against the adhesive face of the positioned label;
a body member on which the support surface is disposed, the body member being compressible between a rest position wherein the support surface is convex and a pressed-down label application position wherein the support surface is substantially flat;
wherein the body member when in the rest position has a footprint having a width of approximately 5.25 inches and a length of approximately 8.125 inches, and has a height of approximately 2.875 inches; and
wherein the body member when in the label application position has a footprint having a width of approximately 5.25 inches and a length of approximately 9.125 inches, and has a height of approximately 1.5 inches.

21. A label applicator, comprising:
a label support surface having a central area;
a post assembly extending up from the central area such that a label having a label through-hole can be positioned in a support position generally on the support surface with the post assembly extending up through the label through-hole and an adhesive face of the label facing up, such that an article having an article through-hole can be positioned over the post assembly so that a flat surface of the article can be pressed and guided against the adhesive face of the positioned label; and
at least one spring positioned under the support surface, the spring biasing the support surface in a downwardly curved position.

22. A label applicator, comprising:
a label support surface having a central area;
a post assembly extending up from the central area such that a label having a label through-hole can be positioned in a support position generally on the support surface with the post assembly extending up through the label through-hole and an adhesive face of the label facing up, such that an article having an article through-hole can be positioned over the post assembly so that a flat surface of the article can be pressed and guided against the adhesive face of the positioned label; and
wherein the support surface and includes a textured material, a foam pad for supporting a label placed thereon, and a pair of edges having gradual depressions forming feet at each of the pair of edges.

23. The label applicator of claim 22, further comprising at least one spring positioned under the support surface, the spring biasing the support surface in a downwardly curved position.

24. The label applicator of claim 23, wherein the post assembly includes a spindle and a base portion, the spindle and base portion being positioned on a top of the support surface.

25. The label applicator of claim 24, wherein the base portion is retractable into the support surface when an article positioned on the post assembly contacts an upper surface of the base portion and is pushed down.

26. A label applicator, comprising:
a label support surface having a central area;
a post assembly extending up from the central area such that a label having a label through-hole can be positioned in a support position generally on the support surface with the post assembly extending up through the label through-hole and an adhesive face of the label facing up, such that an article having an article through-hole can be positioned over the post assembly so that a flat surface of the article can be pressed and guided against the adhesive face of the positioned label; and
a pair of springs positioned under the support surface, the pair of springs biasing the support surface in a downwardly curved position, wherein the pair of springs are positioned to be spaced apart relative to each other at their respective middle sections, and close together relative to each other at their respective end sections.

27. A label applicator, comprising:
a label support surface having a central area;
a post assembly extending up from the central area such that a label having a label through-hole can be positioned in a support position generally on the support surface with the post assembly extending up through the label through-hole and an adhesive face of the label facing up, such that an article having an article through-hole can be positioned over the post assembly so that a flat surface of the article can be pressed and guided against the adhesive face of the positioned label; and
a pair of springs positioned under the support surface, the pair of springs biasing the support surface in a downwardly curved position, wherein the pair of springs are positioned substantially parallel relative to each other.

28. A label applicator, comprising:
a label support surface having a central area;
a post assembly extending up from the central area such that a label having a label through-hole can be positioned in a support position generally on the support surface with the post assembly extending up through the label through-hole and an adhesive face of the label facing up, such that an article having an article through-hole can be positioned over the post assembly so that a flat surface of the article can be pressed and guided against the adhesive face of the positioned label;
wherein the support surface is an elongate, flexible body having a pair of rigid, molded edges; and
a pair of springs positioned under the support surface for biasing the support surface in a slightly curved position, wherein the rigid, molded edges form legs for the support surface when in the curved position.

29. The label applicator of 28, wherein each of the edges includes a first side, a second side, and a pocket passing through each edge from the first side to the second side, the pocket capable of having a support bar inserted from one of the first or second side to the other side for supporting the legs of the support surface.

30. A label applicator, comprising:
a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes upright flexible tabs attached at upper and lower ends thereof and having a rest position, wherein portions thereof extend outwardly relative to a vertical axis of the post assembly and define stops for holding the article in a rest position on the post assembly spaced above a label in the support position, the flexible tabs being flexible inwardly upon downward pressure against the article to allow the article to be pressed down against a label in the support position.

31. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

a flexible, curved body member having an upper surface and a lower surface, the support surface being disposed on the upper surface of the flexible, curved body member; and a spring which biases the support surface and the flexible, curved body member towards the first position, the spring being coupled to the lower surface of the flexible, curved body member.

32. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

a flexible, curved body member having an upper surface and a lower surface, the support surface being disposed on the upper surface of the flexible, curved body member;

at least one peg extending up from the flexible, curved body member to engage the label in the support position;

wherein a tab extends outwardly from the label, and the at least one peg engages the tab with the label in the support position; and wherein the at least one peg includes a pair of pegs which engage the tab on opposite sides thereof.

33. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

a flexible, curved body member having an upper surface and a lower surface, the support surface being disposed on the upper surface of the flexible, curved body member;

at least one peg extending up from the flexible, curved body member to engage the label in the support position;

wherein a tab extends outwardly from the label, and the at least one peg engages the tab with the label in the support position; and wherein the tab defines a first tab, and a second tab extends outwardly from the label on a side of the label opposite the first tab, and the at least one peg includes a first pair of pegs engaging the first tab on opposite sides thereof and a second pair of pegs engaging the second tab on opposite sides thereof with the label in the support position.

34. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

a plurality of pins expendable up from the support surface to define at least in part a centering system for centering a label in the support position; and wherein each pin of the plurality of pins includes an upper end, and the plurality of pins are positionable between raised positions wherein the upper ends are above the support surface and lowered positions wherein the upper ends are generally below the support surface.

35. The applicator of claim 34 wherein the plurality of pins are connected together such that they move together between the raised and lowered positions.

36. The applicator of claim 35 further comprising a plate disposed below the support surface and to which the pins are connected.

37. The applicator of claim 36 further comprising a post connected to the plate for lifting and lowering the pins, wherein the post extends up through the post assembly and includes a knob at an upper end thereof for moving the post and thereby the pins to a raised operative position.

38. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

a flexible, curved body member having an upper surface and a lower surface, the support surface being disposed on the upper surface of the flexible, curved body member; and wherein the post assembly includes an article support portion positioned beneath the support surface, the article support portion including a pair of pegs capable of extending through openings in the support surface to support the article placed on the post assembly, the article support portion being coupled to the post assembly to prevent separation from the flexible curved body member when an article is pushed down on the post assembly.

39. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

a flexible, curved body member having an upper surface and a lower surface, the support surface being disposed on the upper surface of the flexible, curved body member; and wherein the post assembly includes an article support portion positioned beneath the support surface, the article support portion including a pair of curved pegs extending through openings in the support surface to support the article placed on the post assembly and for catching the post assembly to prevent separation from the flexible curved body member when an article is pushed down on the post assembly.

40. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes an article support portion and a spring portion positioned beneath the support surface, the article support portion including a pair of pegs capable of extending through openings in the support surface to support the article placed on the post assembly, and the spring portion positioned to prevent separation of the article support portion from the post assembly when the article is pushed down on the post assembly, such that the spring portion, in a biased position, maintains the article support portion in a raised position above the support surface when the article is not pushed down on the post assembly.

41. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a spindle positioned under the support surface and supported by a spring assembly including a flat spring and a coiled spring, the flat spring holding the coiled spring against the spindle and biasing the spindle in a raised position such that at least a portion of the spindle extends through the support surface.

42. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a spindle, a base portion, and at least one flexible locator piece coupled to the base portion and having an end positioned in a groove on the spindle, the end of the at least one flexible locator piece having an edge extending slightly away from the spindle to receive the article being positioned on the post assembly, wherein when the edge receives the article, the at least one flexible locator piece moves down and away from the spindle as the article is pushed down on the post assembly.

43. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a spindle having a plurality of grooves and a base portion having a plurality of extensions perpendicularly positioned relative to the base portion, the spindle being positionable on the base portion by aligning the plurality of grooves with the plurality of extensions such that the spindle snaps into the base portion and is secured by the extensions.

44. The applicator of claim 43 wherein as the article is placed on the spindle and pushed down, the extensions compress inward into the plurality of grooves, allowing the article to be positioned on the support surface.

45. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a base portion, a tiered portion, and a spindle, the tiered portion being retractable into the base portion when the article positioned on the post assembly contacts an upper surface of the tiered portion and is pushed down.

46. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and a pair of surface flaps coupled to the support surface and having an opening at substantially parallel positions relative to the support surface, wherein the surface flaps each include a foam portion at the opening, the surface flaps being compressible against the support surface when the article is positioned on the spindle and pushed down against the support surface.

47. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a locator portion having a plurality of posts extending from under the support surface through a plurality of holes, the plurality of posts being tapered to restrict the movement of the plurality of posts through the plurality of holes as the article is positioned on the plurality of posts and pushed down.

48. The applicator of claim 47 wherein the plurality of posts are capable of passing entirely through the plurality of holes to separate from the support surface as the article is pushed down on the plurality of posts, the post assembly being storable under the support surface when separated from the support surface.

49. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a spindle, a base portion, and a plurality of ridges coupled to the spindle and positioned in grooves on the spindle, the plurality of ridges each having an edge extending slightly away from the spindle to receive the article being positioned on the spindle, wherein when the edge receives the article, the plurality of ridges are compressed toward the spindle within the grooves as the article is pushed down on the post assembly.

50. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the post assembly includes a spindle, a base portion, and a plurality of fins coupled to the spindle and positioned in grooves on the spindle, the plurality of fins extending from the spindle to receive the article positioned on the spindle, wherein when the fins receive the article, the plurality of fins are compressed within the grooves of the spindle as the article is pushed down on the post assembly.

51. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position;

wherein the support surface is an elongate, flexible body having a pair of rigid, molded edges; and a pair of springs positioned under the support surface for biasing the support surface in a slightly curved position, wherein the rigid, molded edges form legs for the support surface when in the curved position.

52. The applicator of claim 51 wherein each of the edges includes a first side, a second side, and a pocket passing through each edge from the first side to the second side, the pocket being capable of having a support bar inserted from one of the first or second side to the other side for supporting the legs of the support surface.

53. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the central area of the support surface positions the label in a lateral position by a pair of flex ribs positioned at outer, longitudinal edges of the central area, the flex ribs allowing the label to compress longitudinally when an article is pushed down on the post assembly.

54. A label applicator, comprising:

a support surface having a central area, the support surface being positionable in a first position which is curved downward from the central area and in an alternative second position which is substantially flatter than the first position;

a post assembly extending up from the central area for positioning a label in a support position generally on the support surface, the post assembly extending up through a label through-hole of the label and an adhesive face of the label facing up when the label is positioned in the support position; and wherein the support surface positions the label in a lateral position by a pair of flex ribs positioned at outer, longitudinal edges, the flex ribs being coupled to the support surface at points along elongated sides and including a raised edge opposite the coupling points.

55. The applicator of claim 54 wherein the pair of flex ribs each include an alignment wall having two sides angled relative to each other along a crease line.

56. A label applicator, comprising:

a flexible body member having a support surface;

a post assembly extending up from a central area of the support surface;

when a label is in a support position generally on the support surface, the post assembly extends up through a label through-hole of the label and an adhesive face of the label faces up;

the flexible body member when in a rest position curves down in a longitudinal direction from the post assembly and flexes downwardly at the central area to a flatter orientation during a label application procedure with the label in the support position;

at least one stopper member extending downwardly from the flexible body member and having at least one lower end;

the at least one lower end engaging an applicator-support surface when the flexible body member is in the flatter orientation; and the at least one lower end being spaced a distance above the applicator-support surface when the flexible body member is in the rest position.

57. The applicator of claim 56 wherein the at least one stopper member includes at least one fin stopper and at least one post stopper.

58. The applicator of claim 56 wherein the post assembly includes upright flexible tabs attached at upper and lower ends thereof and having a rest position wherein portions thereof extend outwardly relative to a vertical axis of the post assembly and define stops for holding an article in a rest position on the post assembly spaced above a label in the support position and are flexible inwardly upon downward pressure against the article to allow the article to be pressed down against the label.

59. A label applicator, comprising:

a flexible body member having a support surface;

a post assembly extending up from a central area of the support surface;

when a label is in a support position generally on the support surface, the post assembly extends up through a label through-hole of the label and an adhesive face of the label faces up;

the flexible body member when in a rest position curves down in a longitudinal direction from the post assembly and flexes downwardly at the central area to a flatter orientation during a label application procedure with the label in the support position;

the flexible body member having a longer footprint when in the flatter orientation than when in the rest position;

spring means for biasing the flexible body member from the flatter orientation to the rest position; and wherein the spring means includes at least one leaf spring.

60. A label applicator, comprising:

a flexible body member having a support surface;

a post assembly extending up from a central area of the support surface;

when a label is in a support position generally on the support surface, the post assembly extends up through a label through-hole of the label and an adhesive face of the label races up;

the flexible body member when in a rest position curves down in a longitudinal direction from the post assembly and flexes downwardly at the central area to a flatter orientation during a label application procedure with the label in the support position;

the flexible body member having a longer footprint when in the flatter orientation than when in the rest position; and wherein the flexible body member has opposite end feet and an arched central portion extending between the feet.

61. The applicator of claim 60 wherein the end feet have rounded bottom surfaces to provide for easier slide-flexing of the flexible body member.

62. A label applicator, comprising:

a flexible body member having a support surface;

a post assembly extending up from a central area of the support surface;

when a label is in a support position generally on the support surface, the post assembly extends up through a label through-hole of the label and an adhesive face of the label faces up;

the flexible body member when in a rest position curves down in a longitudinal direction from the post assembly and flexes downwardly at the central area to a flatter orientation during a label application procedure with the label in the support position;

the flexible body member having a longer footprint when in the flatter orientation than when in the rest position; and the post assembly includes upright flexible tabs attached at upper and lower ends thereof and having a rest position wherein portions thereof extend outwardly relative to a vertical axis of the post assembly and define stops for holding an article in a rest position on the post assembly spaced above a label in the support position and are flexible inwardly upon downward pressure against the article to allow the article to be pressed down against the label.

* * * * *